(12) United States Patent
Tsuchiya

(10) Patent No.: US 7,641,310 B2
(45) Date of Patent: Jan. 5, 2010

(54) IMAGE PROCESSING APPARATUS, PRINTING APPARATUS AND IMAGE PROCESSING METHOD

(75) Inventor: Okinori Tsuchiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/752,545

(22) Filed: May 23, 2007

(65) Prior Publication Data

US 2007/0273738 A1 Nov. 29, 2007

(30) Foreign Application Priority Data

May 29, 2006 (JP) ............................. 2006-148730

(51) Int. Cl.
*B41J 2/21* (2006.01)
(52) U.S. Cl. .......................... 347/43; 347/15
(58) Field of Classification Search .................. 347/14, 347/15, 43
See application file for complete search history.

(56) References Cited

U.S. PATENT DOCUMENTS

| | | | |
|---|---|---|---|
| 5,870,530 A | 2/1999 | Balasubramanian | 358/1.9 |
| 5,907,337 A * | 5/1999 | Tajika et al. | 347/40 |
| 6,980,326 B2 | 12/2005 | Tsuchiya et al. | 358/1.9 |
| 7,009,734 B2 | 3/2006 | Suwa et al. | 358/1.9 |
| 7,136,523 B2 | 11/2006 | Fukao et al. | 382/167 |
| 7,408,676 B2 * | 8/2008 | Yazawa et al. | 358/1.9 |
| 2002/0154326 A1 | 10/2002 | Tsuchiya et al. | 358/1.9 |
| 2003/0234947 A1 | 12/2003 | Tsuchiya | 358/1.9 |
| 2004/0223172 A1 * | 11/2004 | Yoshizawa et al. | 358/1.8 |
| 2006/0061785 A1 | 3/2006 | Nagoshi et al. | 358/1.9 |
| 2006/0245016 A1 | 11/2006 | Fukao et al. | 358/518 |
| 2007/0273906 A1 | 11/2007 | Tsuchiya | 358/1.9 |

FOREIGN PATENT DOCUMENTS

| | | |
|---|---|---|
| JP | A 8-085219 | 4/1996 |
| JP | A 10-112809 | 4/1998 |
| JP | A 2002-033930 | 1/2002 |
| JP | A 2003-039714 | 2/2003 |
| JP | A 2004-314490 | 11/2004 |
| JP | A 2005-059362 | 3/2005 |
| JP | A 2005-217978 | 8/2005 |
| JP | A 2005-335191 | 12/2005 |

* cited by examiner

*Primary Examiner*—Thinh H Nguyen
(74) *Attorney, Agent, or Firm*—Fitzpatrick, Cella, Harper & Scinto

(57) ABSTRACT

Lattice point data of each lattice point on W-C line in a color separation table reproducing primary color C is determined so that C ink monotonically increases from W point to C point. Also, particular color G for toning is used to monotonically increase from the halfway of W point to C point and lattice point data is determined so that the basic color C ink and the particular color G ink are mixed at C point. In a case where the reflection characteristics is made such that the basic color C ink thus produces the coloring closer to a blue color, the particular color G ink having high chroma and many portions overlapped in the zone of the C ink and the green color is used at a high density portion of the device primary color C. This realizes control of the hue shift and the high chroma both.

13 Claims, 45 Drawing Sheets

IMAGE PROCESSING APPARATUS, PRINTING APPARATUS AND IMAGE PROCESSING METHOD

BACKGROUND OF THE INVENTION

1. Field of the Invention

The present invention relates to an image processing apparatus, a printing apparatus and an image processing method, and in particular to color reproduction of a primary color such as cyan, magenta or yellow.

2. Description of the Related Art

An image forming apparatus that forms image information (including characters, symbols and the like) on a print medium is known as a printer, a copier, and a facsimile machine or an output device of information processed by a computer or a word processor. Such an image processing apparatus performs the printing based upon image information with use of a printing mechanism, on the print medium such as papers or plastic thin sheets (OHP sheet). Examples representative of these printing systems include an ink jet system, a wire dot system, a thermo-sensitive system, a thermal-transfer system, an electro-photographic system using a laser beam and the like, and the like.

Among these printing systems described above, the ink jet system ejects ink from a print head in the form of drop to be landed to the print medium for forming dots to generate an image thereon. An ink jet printer using this system is widely used recently as an output device for an information processing equipment such as a computer or the like.

In the ink jet printer, dyes or pigments are used as coloring materials contained in the ink as recording materials. Basic colors of cyan (C), magenta (M) and yellow (Y) as three primary colors of the subtractive color mixing are used as ink colors by the coloring materials. Also, a system using four colors containing further black (K) is generally used. This system can realize reduction in an ink applying amount to the print medium or the density improvement, by further using black. Further, in a system for a high image quality of a photographic image, the ink of light cyan (LC) and light magenta (LM), which have lower concentration than that of cyan and magenta inks, may be used in addition to the ink of the above four colors. This allows the image quality improvement such as reducing a granular feeling on a highlight part of the printed image. Also, print systems further using ink of gray (Gry) and light gray (light Gry) are known.

For obtaining an image with a desired image quality by using such various kinds of ink, color separation processing for defining what combination of ink is required for realizing the color represented by the image information becomes important.

Japanese Patent Laid-Open No. 2003-039714 and Japanese Patent Laid-Open No. 10-112809 (1998) discloses color separation processing in a case of using dark and light inks. Japanese Patent Laid-Open No. 2003-039714 discloses color separation which achieves color reproduction of a primary color such as cyan or magenta with both of the dark and light inks for the aim of decreasing deterioration of gradation sequence properties due to a change of an ink ejection amount at the time of switching ink between dark and light inks. In addition, Japanese Patent Laid-Open No. 10-112809 (1998) discloses color separation processing for reproducing a primary color with both of dark and light inks, for decreasing uneven gloss generated due to presence or absence of bronze in a case of using both light ink which easily causes a bronze phenomena and dark ink which hardly causes a bronze phenomena.

In the meantime, a demand for higher image quality is recently increasing along with wide use of a color printer. However, basic color recording materials of C, M and Y or quasi-basic color recording materials such as LC, LM, Gry, and K have limitations in reproducing colors, due to coloring characteristics of the recording materials and therefore it is hard to reproduce a brighter color. Consequently, the recording materials of particular colors such as red (R), orange (O), green (G), blue (B) and violet (V) in addition to the basic colors and the quasi-basic colors become to be more used.

Color separation processing for the case of using such particular colors is disclosed in the following documents.

Japanese Patent Laid-Open No. 10-112809 (1998) discloses that with regard to basic color recording materials produced by color separation, color separation in a system of using particular colors is made by exchanging two of the basic colors for the particular color obtained by mixing the two basic color recording materials.

Further, Japanese Patent Laid-Open No. 2004-314490, Japanese Patent No. 02711081, Japanese Patent Laid-Open No. 2005-335191, Japanese Patent Laid-Open No. 2005-059362 and Japanese Patent Laid-Open No. 2005-217978 disclose color separation (separation processing) which aims at reduction of a granular feeling generated in frequent use of particular colors in the case that basic colors of C, M, and Y, K, and quasi-basic colors (chromatic primary color) such as LC, LM, and particular colors (chromatic secondary color) are used. In particular, these documents disclose the color separation in which color reproduction property is effectively used while a particular color ink use amount in a light color reproduction region is suppressed.

Further more, Japanese Patent Laid-Open No. 2005-217987 and Japanese Patent Laid-Open No. 2002-033930 disclose the color separation in which, in the case of using particular color ink having the coloring property of high lightness and high-chroma, the particular color ink is used only in a high lightness region at which expanding of a color gamut is effectively made by the particular color ink, and reversely the particular color ink is not used in a low lightness region at which the particular ink causes a reduction in a color gamut.

In the mean time, as the characteristics of ink which is a recording material of the ink jet printer, various characteristics such as coloring characteristics and besides, an effect of bleeding to characters and ruled lines, long-term preservation stability, and ejection stability are considered. Here, the long-term preservation stability includes characteristics such as a resistance to exposure to ozone, a resistance to exposure to ultraviolet, and water resistant, and the ejection stability means that an ejection failure such as clogging do not occur. Such ink is required to be manufactured in consideration of not only the coloring characteristic but also various characteristics except for it. Therefore, there is frequently used the ink for which the requirement on the coloring characteristic is compromised to some degrees.

FIG. 1 is a diagram showing color reproduction properties of the inks for which the requirement on the coloring characteristics is compromised to some degrees. FIG. 1 shows a change in reproduction color in accordance with an ink applying amount of each of basic color ink of C, M and Y, quasi-basic color ink of LC and LM and particular color ink of R and G, which are orthogonally projected on an a* b* plane of a CIE-L* a* b* color space. As shown in FIG. 1, a chroma of each ink color increases from a paper white point W corresponding to the ground color of the paper in the vicinity of an origin of the a* b* plane, as an applying amount of each ink increases. The quasi-basic color inks LC and LM respectively reproduces nearly the same hue to that of the corresponding basic color inks C and M, but each reproduces lower chroma than that of the corresponding basic color ink C and M. The particular color ink G reproduces a color between color reproduction lines of Y ink and C (LC) ink, and the particular color R reproduces a color between color reproduction lines of Y ink and M (LM) ink. Further, Y ink realizes color reproduction in which the hue is maintained along the positive direction of a b* axis, while the chroma is increasing.

However, in an example shown in FIG. 1, color reproduction line 1201 by C ink and color reproduction line 1203 by M ink each have portions 1201A and 1203A where the hue largely bends (shifts) from cyan to blue in the portion 1201A and magenta to red in the portion 1203A, with an increase of the ink applying amount. Also, light color inks LC and LM in the same kind of colors as the C and M respectively have portions where the hue shifts likewise. However, the hue shift amount is relatively small in the case of the light color ink.

Hereinafter, the shift of the hue will be explained with reference to ink C as an example.

FIG. 2 is a diagram showing a color reproduction region of a device (for example, display) using color signals R, G and B as image information inputted to a printer. The device color shown in a combination of 8 bits of each of the color signals R, G and B is represented as one point in the cube shown in FIG. 2.

Consideration is made to a case where, with regard to color separation of a device color on the White-Cyan line 41 of the cube shown in FIG. 2, a single color of the ink C monotonically increases from W (white) point to C (Cyan) point. In this case, the color separation of the device color on B (blue)-C (Cyan)-G (Green) line shown in FIG. 2 is that, as shown in FIG. 4, an ink amount of C ink is constant from B point via C point to G point with respect to C ink. In addition, from B point to C point, M ink monotonically decreases and becomes 0 at C point, and from G point to C point, Y ink monotonically decreases and becomes 0 at C point.

FIG. 5 is a diagram showing a color reproduction region of a printer in a case of executing simple color separation processing shown in FIG. 3. FIG. 5 is a diagram similar to FIG. 1 and represents the color reproduction region in an orthogonal projection to the a* b* plane. FIG. 5 has L* axis showing lightness which is in a direction vertical to the plane of the drawing sheet, a* axis which is in a lateral direction in FIG. 5 and b* axis which is in a longitudinal direction. In FIG. 5, a solid line shows, among the color reproduction region of the printer, a color reproduction line in the lighter (W) side, and a broken line shows a color reproduction line in the darker (K) side. More specifically, in the cube shown in FIG. 2, the color reproduction line of each line for connecting W with each vertex C, G, Y, R, M and B is in the lighter side and the color reproduction line of each line for connecting K with each vertex C, G, Y, R, M and B is in the darker side.

As shown in FIG. 5, the color reproduction line 1201 from W to C has the characteristics in which the hue, as explained with reference to FIG. 1, largely shifts as C increases and the chroma reaches the maximum and thereafter decreases. On the other hand, the color reproduction line 1202 from C to K (black) has no large shift of the hue. This is because, on the color reproduction line 1202 between C and K, the lightness and the hue are adjusted at the same time by balance of complementary color components, such as M and Y, to C, and the hue shift on the line is restricted as compared to on the color reproduction line 1201 between W and C which is formed of the single color of C ink.

FIG. 6 shows the color reproduction region of a W-C-B plane among the color reproduction region shown in FIG. 5, which is surrounded by a bold solid line. In addition, FIG. 7 shows the color reproduction region of a C-B-K plane among the color reproduction region shown in FIG. 5, which is surrounded by a bold solid line. It is seen in these figures that an area of the upper side surface of the C-B line is largely different from an area of the lower side surface of the C-B line, and the W-C-K surface is largely distorted.

More specifically, the inventor of the present invention has found out that in a case of using basic color recording material for which the requirement on the coloring characteristics is compromised to some degrees and performing simple color separating, as described above, the following problem occurs. When a gradation image along the W-C-K line or a gradation image in contact with the W-C-K surface is printed, the region reproduced in a cyan color is mixed with the region reproduced in a blue color to generate a false gradation sequence in a color tone. Then, the inventor has found out that, for avoiding such false gradation sequence, it is required to compensate for color reproduction characteristics of the basic color recording material, on color reproduction of a device primary color line (for example, W-C line in FIG. 2 as described above) using a basic color recording material (for example, W-C line in FIG. 2 as described above).

In color separation described in each patent document described above, the above stated compensation is not sufficient or is not disclosed.

More specially, in a method of reproducing a device primary color using both of C ink and LC ink similar in a kind of color to C ink, which is described in Japanese Patent Laid-Open No. 2003-039714, color separation of the color on the W-C line 41 shown in FIG. 2 is such as is shown in FIG. 8. As shown in FIG. 8, LC ink increases from W point toward C point, and C ink monotonically increases as well as LC ink decreases nearly from the halfway between W point and C point where the granular feeling becomes not to be noticeable to reproduce the color of C point by using both of C ink and LC ink. In addition, with regard to the color separation of colors on B-C-G line shown in FIG. 2, C ink is, as shown in FIG. 9, constant from B point via C point to G point. In addition, LC ink increases and decreases like a mountain in the vicinity of C point. Further, M ink monotonically decreases from B point to C point and becomes 0 at C point, and Y ink monotonically decreases from G point to C point and becomes 0 at C point.

However, the color separation described in Japanese Patent Laid-Open No. 2003-039714 can make a slight color adjustment only, and can not compensate for a large hue shift in C line 1201 (refer to FIGS. 5 to 7). More specifically, in the case of manufacturing recording materials of the nearly same color such as C and LC, similar coloring materials are used in many cases. Therefore, in a case where the color reproduction in C ink generates the hue shift largely, the color reproduction in LC ink, although the shift degree is different, similarly generates the hue shift. As a result, the compensation effect for the hue shift is lowered.

The color separation using a basic color and a particular color, described in Japanese Patent Laid-Open No. 10-112809 (1998) does not consider compensation for the coloring characteristic of a coloring material itself of the basic color. In this case, the color separation of the device colors on W-C line 41 shown in FIG. 2 may have a monotonic increase of a single color of C ink from W point to C point. In this condition, when using the recording material for which the requirement on coloring characteristics is compromised to some degrees, a large hue shift on line 1201 shown in FIGS. 5 to 7 may occur.

Japanese Patent Laid-Open Nos. 2004-314490, 2005-335191, 2005-059362 and 2005-217987 disclose the color separation in which the particular color is not used in a highlight portion for reduction of a granular feeling in color reproduction of a device secondary color. These patent documents disclose the color separation of the device secondary color where the particular color is frequently used, but does not disclose the color separation of the device primary color at all.

Likewise, Japanese Patent Laid-Open Nos. 2005-217987 or 2005-059361 disclose the color separation in a case of using particular color ink of the coloring characteristics in which the lightness is high and the chroma is high in a device secondary color, but does not disclose the color separation of the device primary color at all. That is, these patent documents do not suggest teachings of compensation for the hue shift in the color separation of the device primary color.

On the other hand, a color separation in which a use amount of basic color ink is controlled to the extent that the hue shift does not occur can be considered as follows, as the color separation which is not disclosed in the patent documents described above.

In this color separation, though the color separation of W-C line 41 shown in FIG. 2 shows a monotonic increase of a single color of C ink from W point to C point, similarly to such as shown in FIG. 3, a C ink amount at C point becomes smaller than a printable ejection amount. In this case, the color separation of B-C-G line shown in FIG. 2, which forms the outermost portion of the color reproduction region, is that with respect to M and Y inks, similarly to that in FIG. 4, M ink monotonically decreases from B point to C point to become 0 at C point, and Y ink monotonically decreases from G point to C point to become 0 at C point. On the other hand, C ink has the printable limit amount by the single color of C ink at respective B and G points, and becomes smaller than the printable ink ejection amount at C point. In consequence, an ink use amount of C ink is shown in a constant line between B, C and G in FIG. 4, and on the other hand, in the present example, in a downwardly convex arc line from B point via C point which is a trough to G point. Such color separation realizes a color reproduction similar to that of the color reproduction line 1201 formed of C ink only on the a* b* plane shown in FIG. 10 or on the C* L* plane shown in FIG. 11, but the terminal of this line becomes point 1201B to the halfway of line 1201. In this case, as seen in FIG. 10, though an increase of the hue shift can be avoided, as shown in FIG. 11, a value of a reproducible chroma C* is reduced. That is, simple control of the use amount of the basic color ink thus does not prevent reduction in chroma of the device primary color, raising the problem that the color reproduction region becomes small.

Likewise, as color separation which is not disclosed in each patent document described above, it is considered that a basic color ink causing the hue shift in a high chroma portion is adjusted in color using the other basic color ink. In such a color separation of W-C line 41 shown in FIG. 2, as shown in FIG. 12, C ink monotonically increases from W point to C point, and Y ink starts to be used for color adjustment from the halfway of W-C line and monotonically increases. Then, C ink and Y ink are mixed at C point. It should be noted that, in the color separation of the B-C-G line in FIG. 2 of this case, as shown in FIG. 13, C ink is constant form B point via C point to G point. In addition, M ink monotonically decreases from B point to C point to become 0 at C point and Y ink monotonically decreases from G point to the halfway between C point and B point, and at C point C ink and Y ink are, as described above, mixed and becomes 0 in the halfway between C point and B point.

The color reproduction region of W-C line 41 by this color separation is shown in reproduction line 1602 (the end of the line is shown by a reference sign 1602A in FIG. 10) in FIG. 10 or 11. As seen in FIG. 10, the hue shift can be controlled, but as shown in FIG. 11, the chroma is largely reduced as compared to reproduction line 1201 in the case of using the single color of C ink. That is, in a case of reproducing the device primary color by mixing a plurality of basic color ink, there occurs the problem that the chroma of the device primary color is reduced to make the color reproduction region small.

SUMMARY OF THE INVENTION

An object of the present invention is to provide an image processing apparatus, a printing apparatus and an image processing method which are capable of controlling a hue shift and realizing high chroma.

In the first aspect of the present invention, there is provided a printing apparatus performing printing on a print medium by using respective basic color recording materials corresponding to three primary colors and a particular color recording material that expresses a color having a hue different from respective colors each having hue expressed with the basic color recording materials, wherein a color to be expressed with a maximum applying amount of one basic color recording material, among the basic color recording materials corresponding to three primary colors, to a unit area of the print medium is reproduced by using the one basic color recording material and a particular color recording material that expresses a color having a hue between respective hues of the one basic color recording material and one other basic color recording material.

In the second aspect of the present invention, there is provided an image processing apparatus executing color separation processing for determining amounts of recording materials to reproduce colors expressed by using respective basic color recording materials corresponding to three primary colors and a particular color recording material that expresses a color having a hue different from respective colors each having hue expressed with the basic color recording materials, the apparatus comprising: color separation means for determining the respective amounts of the basic color recording material and the particular color recording material, so that a color to be expressed with a maximum applying amount of one basic color recording material, among the basic color recording materials corresponding to three primary colors, to a unit area of the print medium is reproduced by using the one basic color recording material and the particular color recording material that expresses a color having a hue between respective hues of the one basic color recording material and one other basic color recording material.

In the third aspect of the present invention, there is provided an image processing apparatus executing color separation processing for determining amounts of recording materials to reproduce a color specified by color signals, the apparatus comprising: color separation means for determining the respective amounts of a basic color recording material and a particular color recording material, so that a predetermined primary color specified by the color signals is reproduced by using the basic color recording material corresponding to one of three primary colors and the particular color recording material that expresses a color having a hue between colors having respective hues of the one basic color recording material corresponding to the one primary color and one other basic color recording material.

In the fourth aspect of the present invention, there is provided an image processing method of executing color separation processing for determining amounts of recording materials to reproduce colors expressed by using respective basic color recording materials corresponding to three primary colors and a particular color recording material that expresses a color having a hue different from respective colors each having hue expressed with the basic color recording materials, the method comprising: a color separation step of determining the respective amounts of the basic color recording material and the particular color recording material, so that a color to be expressed with a maximum applying amount of one basic color recording material, among the basic color recording materials corresponding to three primary colors, to a unit area of the print medium is reproduced by using the one basic color recording material and the particular color recording material that expresses a color having a hue between respective hues of the one basic color recording material and one other basic color recording material.

According to the configuration as described above, for reproducing a primary color, a basic color recording material and a particular color recording material, which reproduces a color having the hue between respective hues reproduced with the basic color recording material and other basic color recording material positioned neighboring in hue to the basic color recording material, are used. This makes, for example in the case where a basic color recording material has the coloring characteristics which is biased in a certain direction in hue, the particular color recording material, which has a high chroma reproducibility and a coloring characteristic which are overlapped in a certain region with those of the basic color recording material, be used in a primary color, particularly in a high density portion thereof. As a result, it is possible to control the hue shift and realize the high chroma.

Further features of the present invention will become apparent from the following description of exemplary embodiments (with reference to the attached drawings).

DESCRIPTION OF THE EMBODIMENTS

Embodiments of the present invention will be hereinafter described with reference to the accompanying drawings.

Definition of Terms

First, terms used in the present specification will be defined as follows.

(Primary Color and Secondary Color)

A color corresponding to each of three primary colors of color signals used by a device such as a display or a printer is called a device primary color and a color formed by mixing any two colors among the three device primary colors is called a device secondary color. These are a narrow defined primary color and a narrow defined secondary color respectively as explained below.

In a display coloring by additive color mixing, a color of each R, G and B is a device primary color and a color of each C (=G+B), M (=R+B), and Y (=R+G) is a device secondary color. Among colors specified by an input color signal (R, G or B) to a color correction processing section 101 in an image processing arrangement to be described later in FIG. 23, a color of each R, G or B is a device primary color and a color of each C, M or Y is a device secondary color.

In addition, in a printer coloring by a subtractive color mixing, a color of each C, M and Y is a device primary color and a color of each R (=M+Y), G (=C+Y), and B (=C+M) is a device secondary color. Among colors specified by an input color signal (R, G or B) to a color conversion processing section 102 to be described later in FIG. 23, a color of each C, M and Y is a device primary color and a color of R, G and B is a device secondary color.

On the other hand, in a broad sense, an elementary color which a device has, that is, a color which the device can reproduce by a single color printing is a primary color and a mixed color formed by mixing any two colors among these basic colors is a secondary color.

In the present specification, for avoiding mix-up of the primary colors in a narrow definition and in a broad definition, and of the secondary colors in a narrow definition and in a broad definition, the primary and secondary colors in a narrow definition are called device primary and secondary colors respectively, and the primary and secondary colors in a broad definition are called simply primary and secondary colors respectively.

Figure 2:
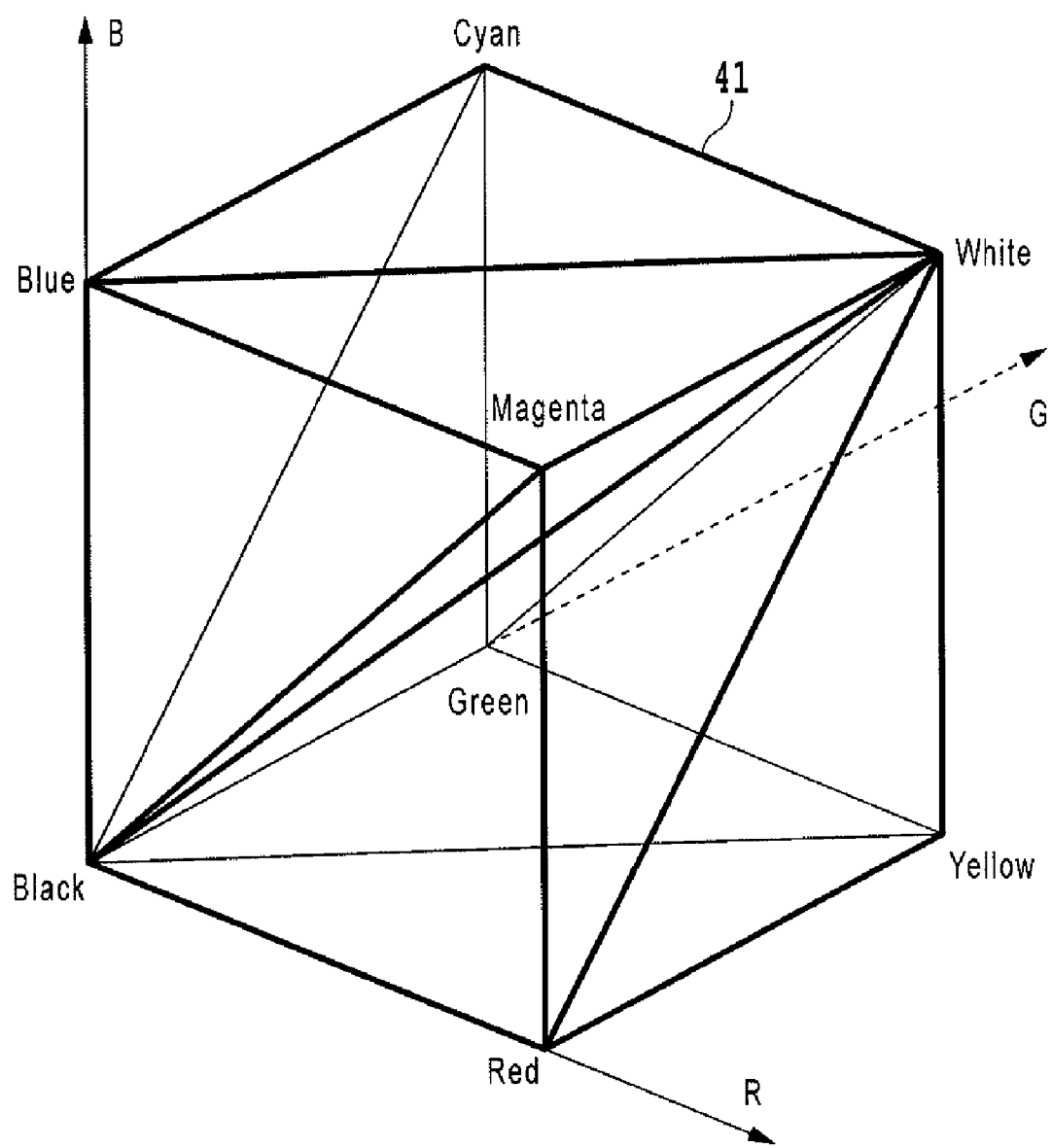
FIG. 2 is a diagram showing a cube of a color separation table in a device RGB color space in a printer.

Further, in the present specification describing color separation processing for generating an output data of ink in a printer, colors specified by color signals defining points (including lattice points) on a W-C-K line, a W-M-K line and a W-Y-K line in FIG. 2 on a color separation table can be defined to be device primary colors. Likewise, colors specified by color signals of points (including lattice points) on a W-R-K line, a W-G-K line, and a W-B-K line can be defined to be device secondary colors.

(Basic Color Ink (Recording Material) and Quasi-basic Color Ink (Recording Material))

In the present specification, ink of three colors of C, M and Y as three basic colors of a subtractive color mixing is called basic color ink, and ink of LC, LM, Gry, LGry, and K, which is the same kind of color as these or an achromatic color, is called quasi-basic color ink.

(Color Space in Accordance with Visual Feature of Humans)

In the present specification, for comparing the color reproduction regions or specifying the hue, a CIE-L* a* b* space is used as a color space in accordance with the visual feature of humans, but is not limited to this space. For example, an arbitrary color space such as XYZ, L* u* v*, a Munsell color system, Yxy, and L* C* h* may be used. A portion defined by a CIE-L* a* b* color space described in the present specification may be defined by using the above-mentioned color space other than the CIE-L* a* b* color space.

(Light Ink)

In an ink jet printer, for reducing a granular feeling due to dots at a highlight portion which is low in a dot filling ratio on a print medium, there is used ink which has the same kind of color as regular ink (dark ink) regularly used and which is low in coloring material concentration. Light cyan (LC) to cyan (C) and light magenta (LM) to magenta (M) are generally used, and light gray (LGry) to gray (Gry) maybe used. With regard to an ink composition of each of dark ink and light ink, the coloring material concentration only may be different from each other, or the coloring material itself may be different from each other. In consequence, the dark ink and the light ink both belong to the same kind of color, but the color may be slightly different from each other. Light ink may be called photo ink.

(Particular Color)

In the present specification, "particular color" denotes a color which has different hue from a hue of yellow, magenta or cyan as a basic color recording material, in a broad sense. In addition, in a narrow definition, in a CIE-L* a* b* color space, "particular color" denotes a color which can express lightness higher than a color reproduction region expressed on a print medium by combination of two arbitrary recording materials among basic color recording materials of magenta, yellow and cyan, and which shows a hue angle within the color reproduction region expressed by combination of the above two arbitrary recording materials. Alternately, in a CIE-L* a* b* color space, "particular color" denotes a color which can express chroma higher than a color reproduction region expressed on a print medium by combination of two arbitrary recording materials among basic color recording materials of magenta, yellow and cyan, and which shows a hue angle within the color reproduction region expressed by combination of the above two arbitrary recording materials.

It is preferable to use a recording material as "particular color" in a narrow definition described above in a case of an application of the present invention, but a recording material as "particular color" in a broad sense may be used. In addition, in the present specification, an example of a particular color ink may include particular color G ink of the hue between Y and C, particular color B ink and particular color V ink between C and M, and particular color R ink or particular color O ink of the hue between M and Y. Here, G ink denotes green ink, B ink denotes blue ink, V ink denotes violet ink, R ink denotes red ink and O ink denotes orange ink.

(Ejection Amount)

In the present specification, "ejection amount" denotes an ink applying amount that is determined as an amount of a single color of ink applied to a unit area of a print medium. A total ejection amount denotes a sum of the ejection amounts of all ink kinds used in accordance with a color separation table. It should be noted that (ink) duty, (ink) applying amount, and (ink) coating amount are used in the same way.

The total ink ejection amount which can be accommodated by a print medium has the upper limit, and has a different value depending on an ink amount applied per unit area and unit time, ink properties and print medium properties. This upper limit has a tendency of becoming smaller, in general as the print resolution is higher, as an ink applying amount per unit time becomes larger because of high-speed printing, as permeability as the ink properties is lower, or as an ink accommodating layer as print medium properties is thinner.

(Color Mixture and Blending)

In the present specification, "color mixture" denotes a state where inks of plural colors are printed on a print medium by means of an area modulation system. For example, in a case of performing printing in which next ink is printed before the ink previously printed, which is of dye, dries up, the expression of this "color mixture" is appropriate. In contrast, in a case where the next ink is printed on the ink previously printed as in the case of a pigment ink, so that the previously printed ink is covered with the later printed ink, the expression of "layer" is appropriate. In the present specification, these expressions are selectively used in accordance with the content to be described.

In addition, in the present specification, "blended" ink denotes ink of a state where plural kinds of ink are blended in an ink drop state. This is the meaning similar to "color mixture" for the case of the above-mentioned dye ink system, but since a coloring material to be used is not limited to dye in the present specification, "color mixture" and "blending" ink are distinguished intentionally.

(Name of Color)

In the present specification, names of colors are used as follows and are selectively used in accordance with the contents to be described respectively.

White, W, and white denote a white color. Black, Bk, K and black denote a black color. Cyan and C denote cyan. Magenta and M denote magenta. Yellow, Y and yellow denote a yellow color. Red, R and red denoted a red color. Green, G and green denote a green color. Blue, B and blue denote a blue color. Orange, O and orange denote an orange color. Violet, V and violet denote a violet color. Light Cyan, LC, PC, light cyan, and photo cyan denote light cyan. Light Magenta, LM, PM, light magenta and photo magenta denote light magenta. Gray, Gry, and gray denote a gray color. Light Gray, Light Gry, LGry, light gray and photo gray denote a light gray color.

Matter Concerning Color Engineering

Next, some matters concerning color engineering used in the present specification will be explained briefly.

(Coloring of Reflection Copy and Perception Mechanism)

Figure 14:
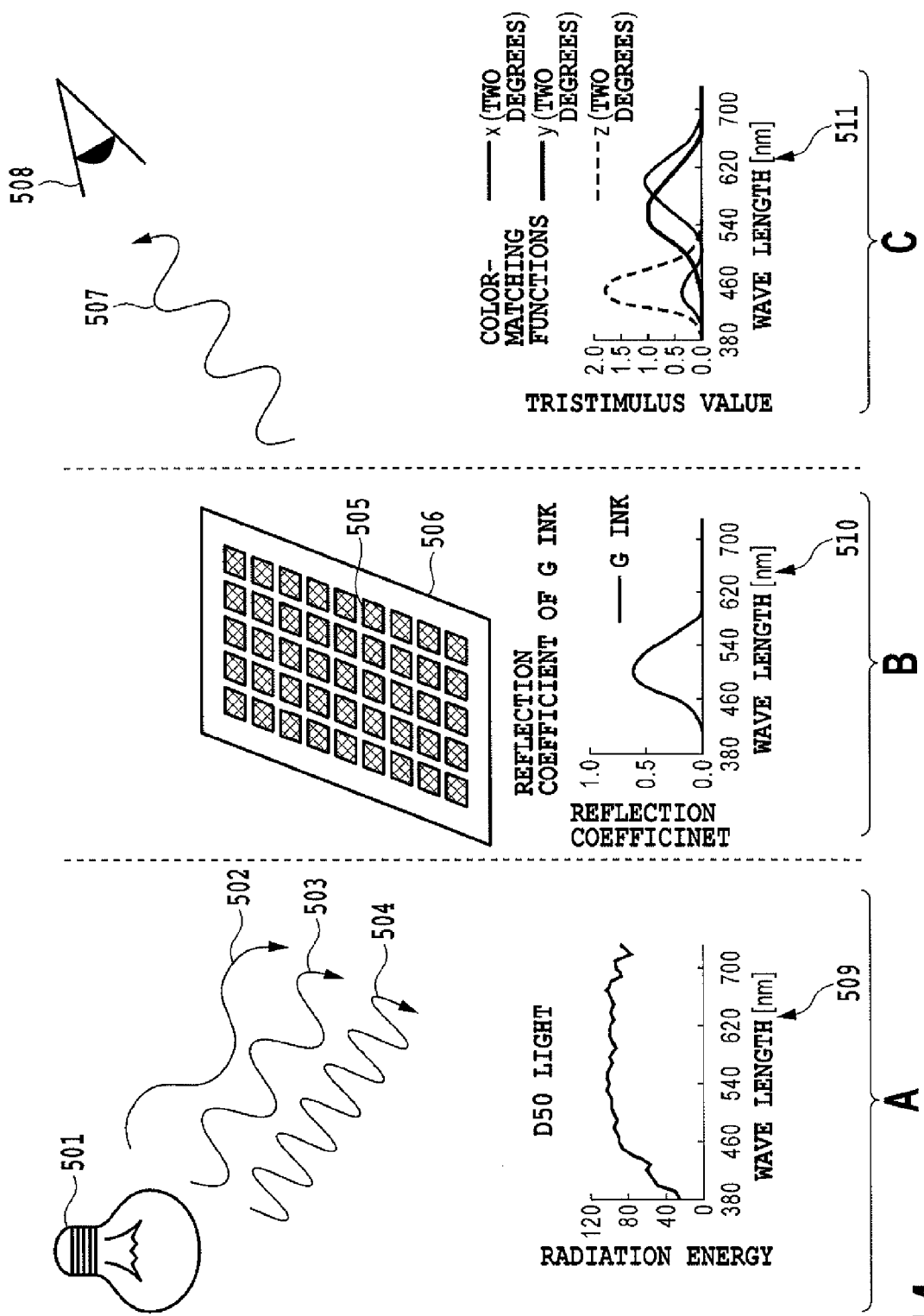
FIG. 14 is a schematic diagram for explaining coloring of a reflection copy and the perception mechanism.

FIG. 14 is a schematic diagram for explaining a perception mechanism of colors in the reflection copy. Each of regions A, B and C shown in FIG. 14 corresponds to irradiation of light, absorption of light by a copy and reflection of a partial zone, and visual recognition of humans. Hereinafter, in a case of observing under a white color light the reflection copy on which a patch for measuring a green color is printed, the coloring and the perception mechanism will be explained.

Visible light (red color light) of long wavelength 502, visible light (green color light) of medium wave length 503 and visible light (blue color light) of short wave length 504 are radiated in a mixed state from a white color light source 501.

Light from a white color light source 501 enters onto an object patch 505 of the reflection copy 506, and light 502 of long wave length and light 504 of short wave length, which are part of the above light, are absorbed. On the other hand, light of medium wave length 503 which is not absorbed is reflected from the copy and reaches eyes of humans 508 as reflection light 507.

Figure 15:
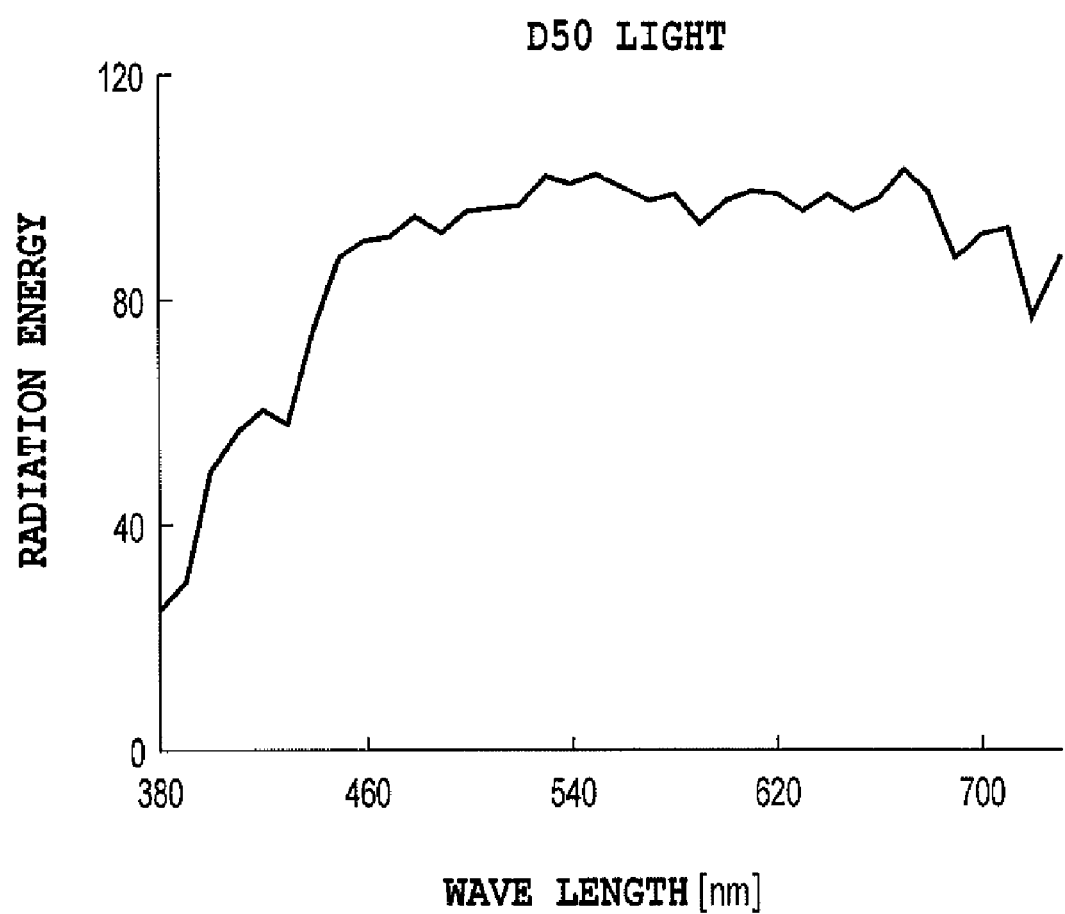
FIG. 15 is a diagram showing a spectrum of a white color light D 50.
Figure 16:
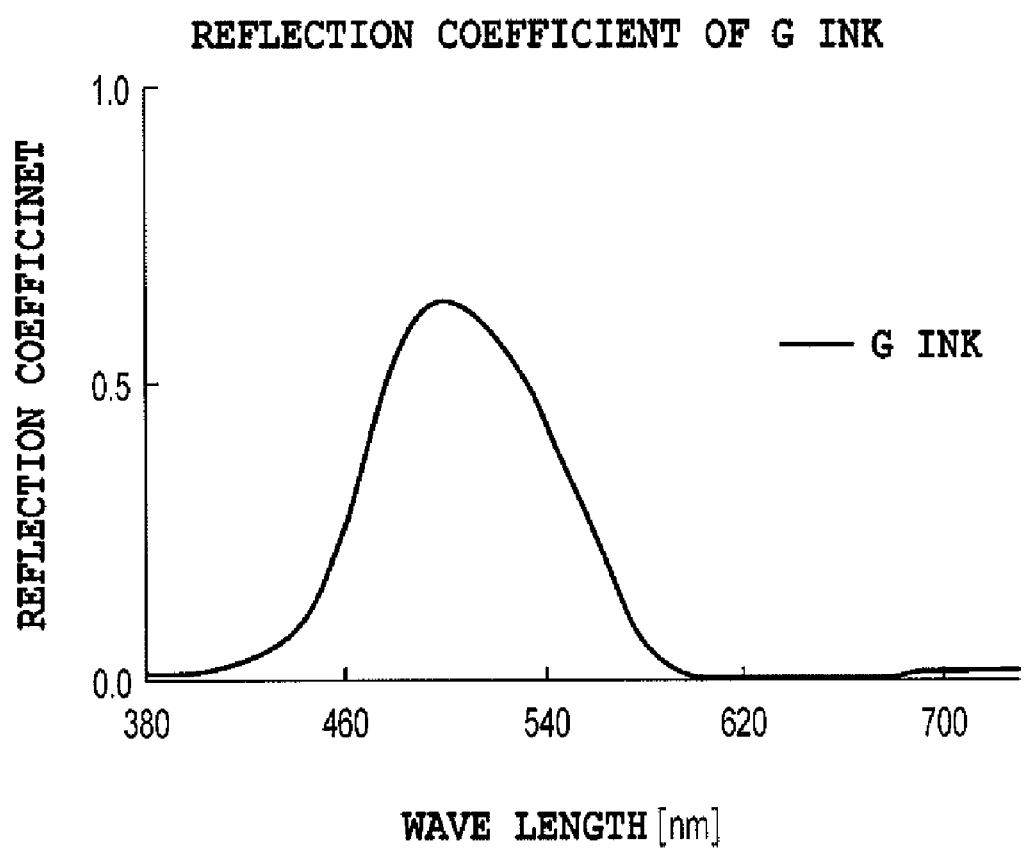
FIG. 16 is a diagram showing a spectrum of one example of G ink.

The white color light is radiated in the entire zone of the wave length from 380 nm to 730 nm that are perceived by the human eye, as shown in a graph 509 and FIG. 15 showing the detail of the graph 509. On the other hand, the reflective characteristics of the patch portion is formed as a band pass filter where a short wave length and a long wave length are cut and a medium wave length is transmitted, as shown in a graph 510 and in FIG. 16 showing the detail of the graph 510. In consequence, with respect to the white color light 505, a short wave length 904 and a long wave length 902 are cut by the characteristics 510 of the band pass filter and a medium wave length (region of a green color) 907 only remains to reach eyes of humans 508.

Figure 17:
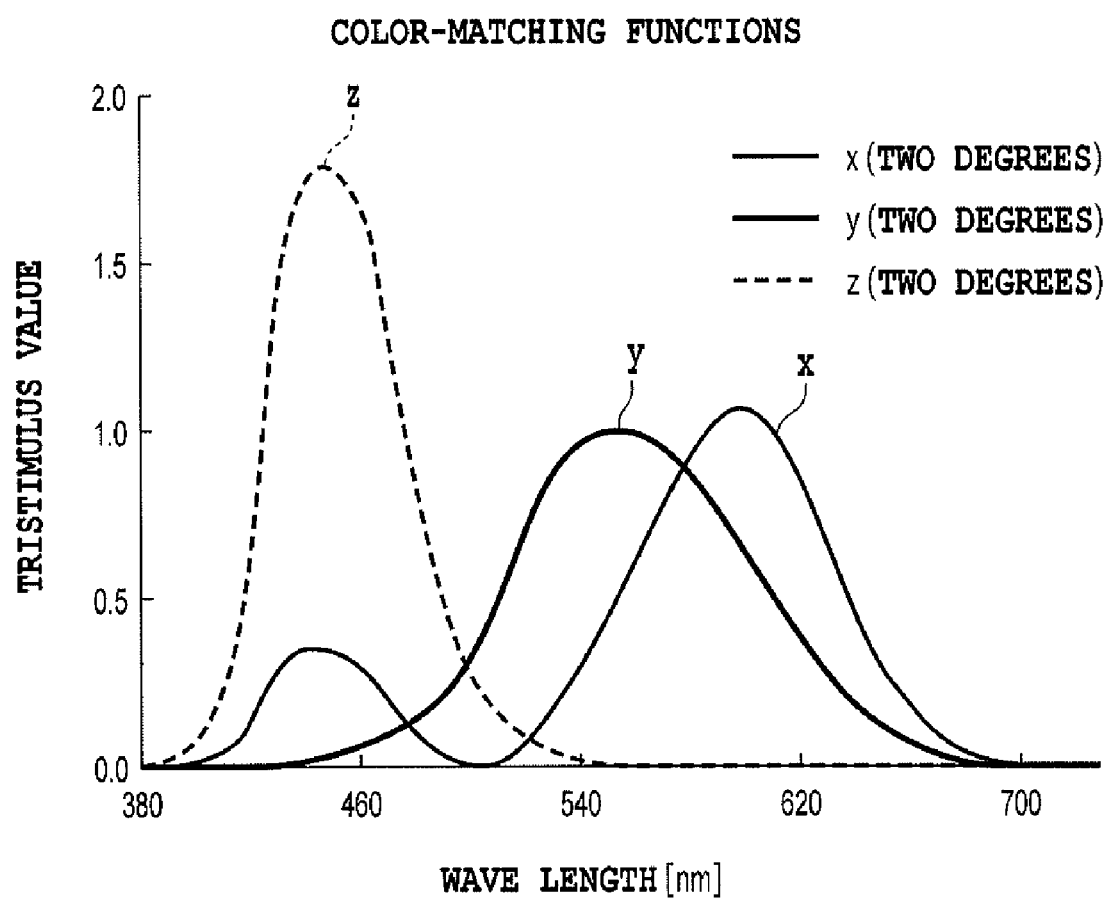
FIG. 17 is a diagram for explaining color-matching functions.

The light which has entered onto the eyes of humans 508 is perceived according to color-matching functions having three kinds of different response characteristics which are shown in a graph 511 and FIG. 17 showing the detail of the graph 511. Light of the medium wave length 507 is, since it has a peak in the vicinity of 500 nm, not nearly perceived in a z color-matching function, but is strongly perceived in a y color-matching function and in an x color-matching function.

The processes of irradiation and reflection and recognition in these lights are represented according to the following formulas of formula 1, formula 2 and formula 3 by using an integration of a wave length λ.

[Formula 1]

$$X = 100 \frac{\int R(\lambda)P(\lambda)\bar{x}(\lambda)d\lambda}{\int P(\lambda)\bar{y}(\lambda)d\lambda} \quad \text{Formula 1}$$

$$Y = 100 \frac{\int R(\lambda)P(\lambda)\bar{y}(\lambda)d\lambda}{\int P(\lambda)\bar{y}(\lambda)d\lambda} \quad \text{Formula 2}$$

$$Z = 100 \frac{\int R(\lambda)P(\lambda)\bar{z}(\lambda)d\lambda}{\int P(\lambda)\bar{y}(\lambda)d\lambda} \quad \text{Formula 3}$$

In summary, an X value responds mainly to light of a red region, a Y value responds mainly to light of a green region and a Z value responds mainly to light of a blue region. In particular, the Y value shows lightness, too.

Further, a coordinate value (L*, a* and b*) modified to form a uniform color space where an Euclidean distance in a color space corresponds to a color difference is represented according to the following formulas of formula 5, formula 6 and formula 7 by using formula 4.

[Formula 2]

$$f(\chi/\chi_n) = \begin{cases} (\chi/\chi_n)^{1/3} & 0.008856 < (\chi/\chi_n) \\ 7.787(\chi/\chi_n) + 16/116 & (\chi/\chi_n) \leq 0.008856 \end{cases} \quad \text{Formula 4}$$

(x is X, Y or Z)

$$L^* = 116 f(Y/Y_n) - 16 \quad \text{Formula 5}$$

$$a^* = 500[f(X/X_n) - f(Y/Y_n)] \quad \text{Formula 6}$$

$$b^* = 200[f(Y/Y_n) - f(Z/Z_n)] \quad \text{Formula 7}$$

(Spectrum and Color Reproduction)

Figure 18:
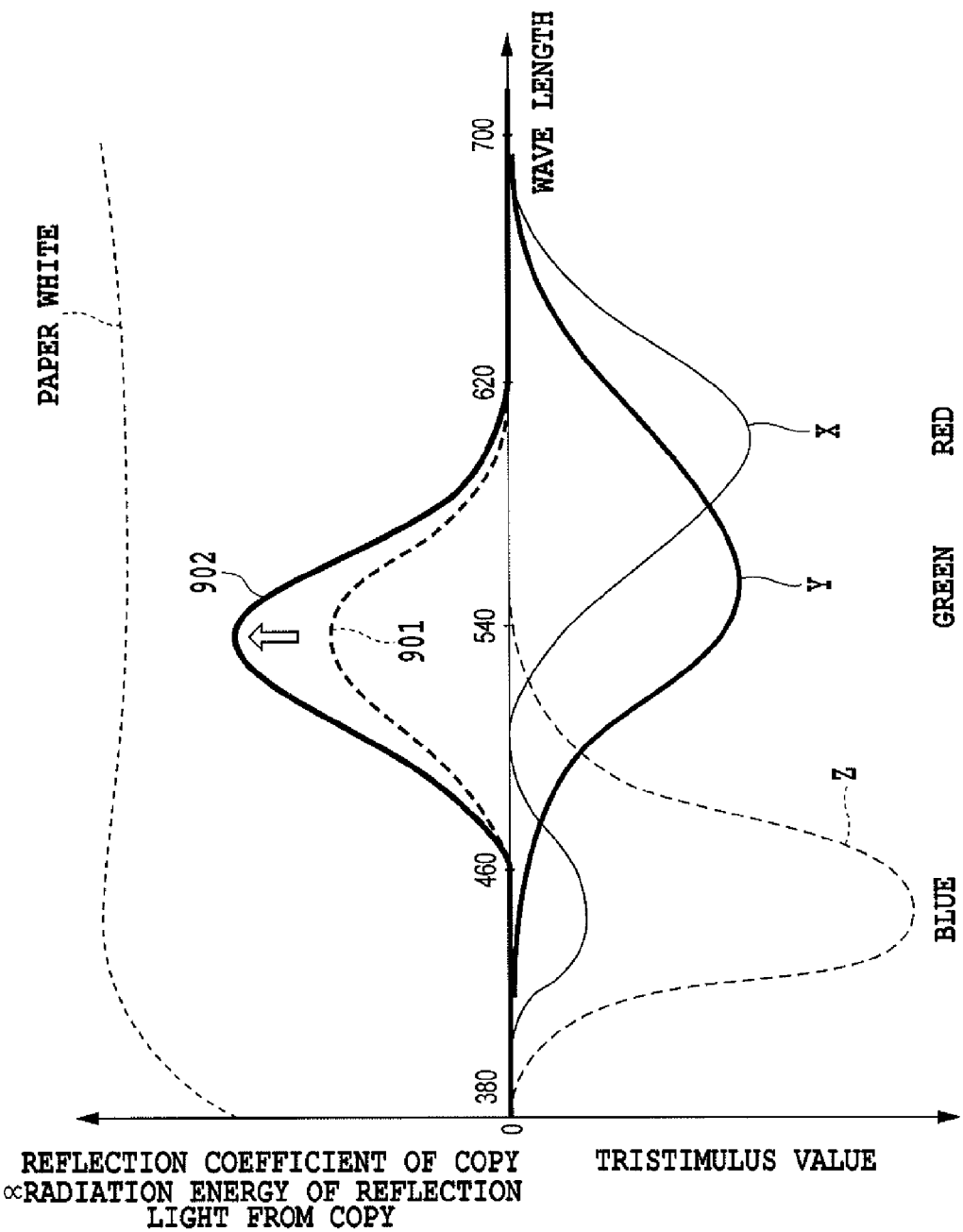
FIG. 18 is a diagram for explaining a relation between spectrum and lightness.
Figure 19:
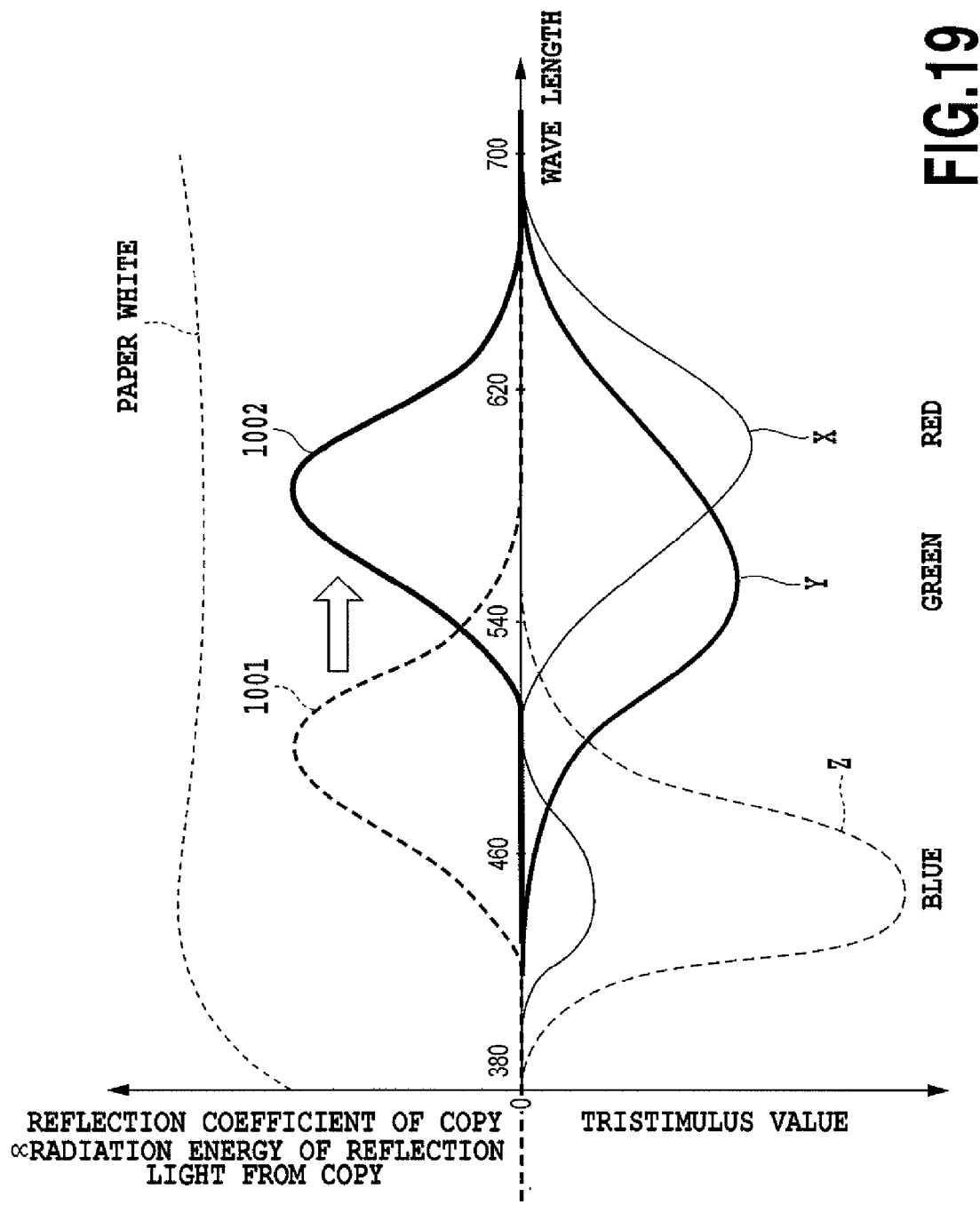
FIG. 19 is a diagram for explaining a relation between spectrum and hue.
Figure 20:
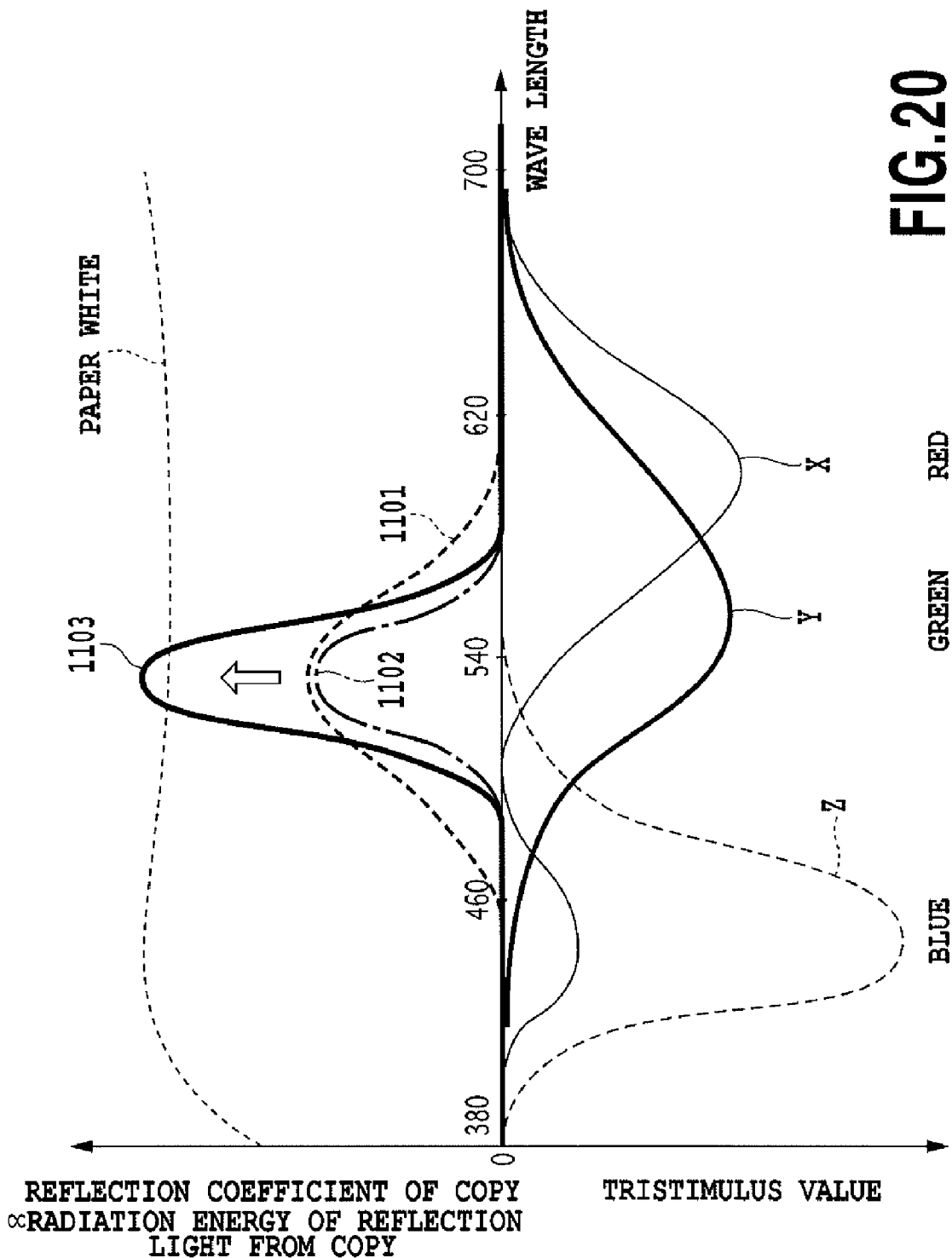
FIG. 20 is a diagram for explaining a relation between spectrum and chroma.

FIGS. 18, 19 and 20 are diagrams showing a comparison of xyz color-matching functions with reflected lights from the reflection copy (in the case of a white color light source, showing the tendency similar to a spectral reflection coefficient of the copy) for each wave length. With respect to the lateral axis of the figure, the lower side shows a tristimulus value and the upper side shows a radiation energy of the reflected light (∝ spectral reflection coefficient). It should be noted that the state of non-reflected light shows a black color and "paper white" shown in the figure shows a white color.

(Spectrum and Lightness)

Lightness is represented by a Y value. For increasing (brightening) the Y value shown in Formula 2, light of larger amplitude is entered into a zone where the response of the y color-matching function is active. Accordingly, when the wave length zone is the same in FIG. 18, the reflected light 901 of a small amplitude is small is dark and the light 902 of a large amplitude is bright. It should be noted that lightness is represented by L* in an L* a* b* coloring system.

(Spectrum and Hue)

A hue showing coloring depends on an irradiation zone (wave length) of reflected light. When the amplitude and the wave length zone width are the same in FIG. 19, reflected light 1001 in the short wave length region shows a blue color, the reflection light is shifted to a green color and a yellow color as the wave length becomes longer, and reflected light 1002 in the longer wave length region shows a red color. It should be noted that the hue is specified by a hue angle θ of the following formula 9 in the L* a* b* coloring system.

[Formula 3]

$$\theta \cong (180/\pi)\tan^{-1}(b^*/a^*)[\text{deg}] \quad \text{Formula 9}$$

(Spectrum and Chroma)

Chroma showing a vividness of color depends on narrowness of the zone width of reflected light and a height of amplitude of reflected light. When the amplitude is the same in FIG. 20, reflected light 1101 of the wide zone, since lights having more hues are overlapped, has low chroma and reflected light 1102 of the narrow zone has the high chroma. When the zone is the same, reflected light 1103 of a larger amplitude has a higher chroma than reflected light 1102 of a smaller amplitude. It should be noted that the chroma is represented by chroma C* of the following formula 8 in the L* a* b* coloring system.

[Formula 4]

$$C^* \cong \sqrt{(a^*)^2 + (b^*)^2} \quad \text{Formula 8}$$

(Color Mixture of Inks and Spectrum)

In a printing system of an area modulation type such as an ink jet printer, when the print medium is observed in a micro way, a portion where a paper white color as the ground color of the print medium is exposed as it is, a portion covered with first ink, a portion covered with second ink, a portion where the first ink and the second ink are mixed (color mixture) or overlapped (layer) on the print medium, and a portion where the ink mixed and the ink overlapped are overlapped, are present in a mixed way, so that the portion formed with ink does not entirely form a layer on the print medium. In addition, in a case of ink like dyestuff where a coloring material molecule is small and the permeability is high, the ink spreads in the depth direction of the print medium and the ink permeated deeply in the print medium has an influence on color reproduction. In contrast, the ink drop like a pigment where a coloring material molecule is large and the permeability is low remains relatively on the print medium and the color agent on the surface tends to be relatively predominant. Further, as seen from that the ink drop on the print medium generates an optical dot gain, besides the light irradiated on the printed ink dots, the light irradiated in the region where no ink dot exists may be transmitted on the print medium to be absorbed by the ink. Therefore, it is not easy to accurately understand the color reproduction of the ink dot on the print medium and the mechanism thereof.

However, for understanding a relation between the color mixture of the ink and the spectrum in summary, it can be thought that the light is filtered (absorbed) by ink of the first layer and thereafter, is filtered by ink of the second layer. It should be noted that here, since exactly speaking, the light absorbed by the first layer is not to be reflected from the print medium regardless of the characteristics of the second layer, in a case where the printed state on the print medium is formed in a layered state, the order of the layers is important.

A color separation processing according to embodiments of the present invention will be hereinafter described in detail. It should be noted that embodiments to be described are simply examples for explaining the present invention and do not limit the scope of the present invention.

First Embodiment

Figure 21:
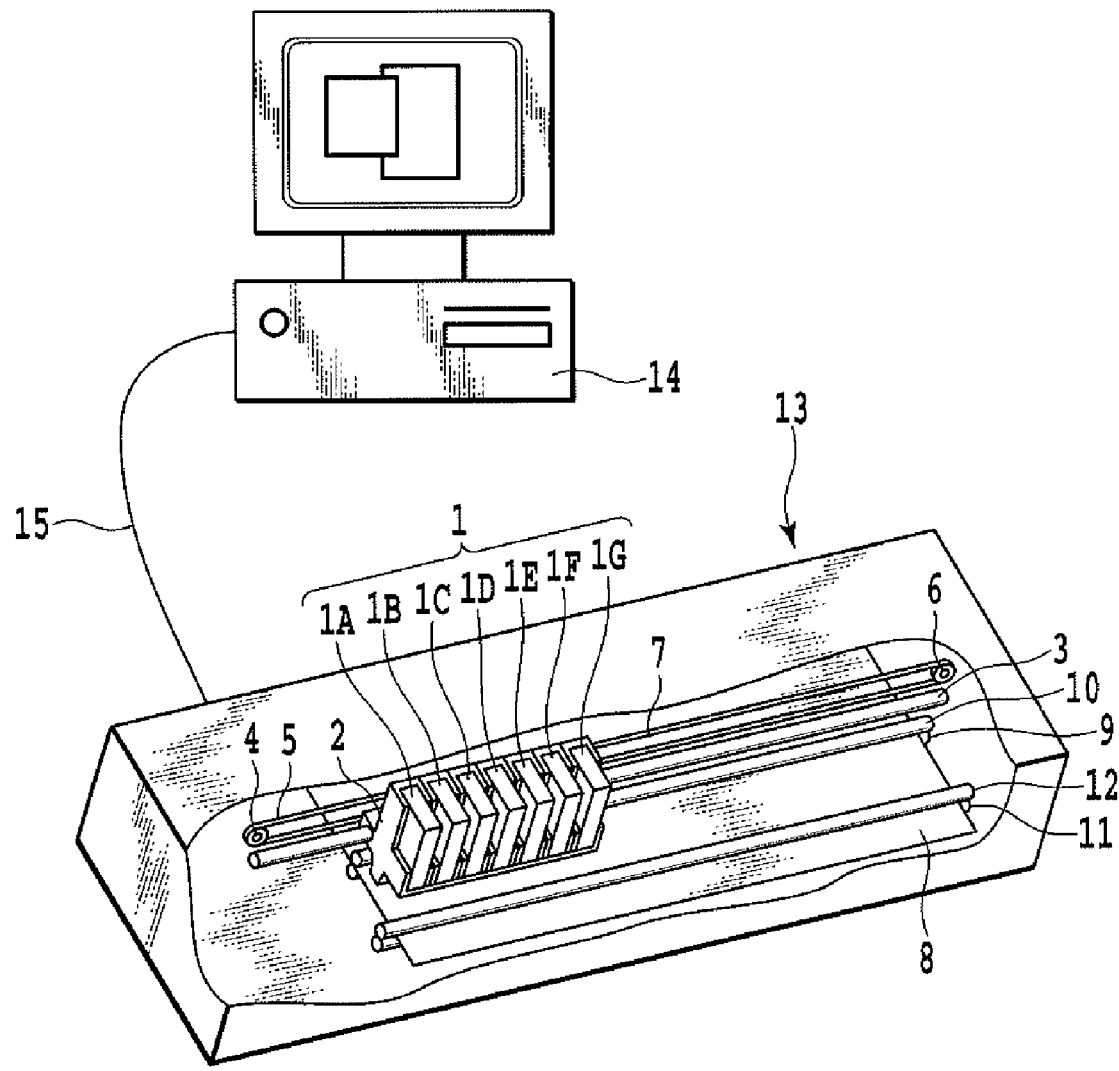
FIG. 21 is a schematic, perspective view showing an arrangement of a printing system by an ink jet printer and a host computer in an embodiment of the present invention.

FIG. 21 is a diagram showing a schematic configuration of a printing system having an ink jet printer and a host computer in an embodiment of the present invention. In FIG. 21, an ink jet printer 13 is provided with a plurality (seven colors) of head cartridges (printing portion) 1A, 1B, 1C, 1D, 1E, 1F and 1G detachably mounted on a carriage 2. It should be noted that in a case of showing the entirety of the plurality of the printing portions 1A to 1G or any one thereof, it is simply shown with the printing portion (print head or head cartridge) 1.

Each cartridge 1 includes an ink tank portion in the upper side and a print head portion (ink eject portion) in the lower side to form the structure of uniting the print head portion and the ink tank. It should be noted that needless to say, the printing portion and the ink tank may be mutually detached. Each printing portion 1 positions a carriage 2 and is mounted to be replaceable. Each printing portion 1 is provided with a connector (not shown) for receiving a signal driving the print head portion. On the other hand, the carriage 2 is provided with a connector holder (electrical connector) for transmitting a drive signal or the like through the connector to each printing portion 1. And each printing portion 1 on the carriage 2 and a control circuit in the side of the device body are connected by a flexible cable for flowing signal pulse current or temperature-modulating current.

The head cartridge 1A has the ink tank portion accommodating ink of K, each of the head cartridges 1B, 1C and 1D has the ink tank portion accommodating ink of C, M and Y respectively, and each of the head cartridges 1E, 1F and 1G has the ink tank portion accommodating ink of R, G and B respectively. In addition, eject ports for discharging the ink are formed in a certain array on a face (in an example shown in the figure, a face directed downwards (not shown)) of each print head portion opposing the print medium 8, making it possible to eject the ink accommodated in each ink tank.

The carriage 2 extends in a main scan direction to be guided and supported in such a manner as to reciprocally move along a guide shaft 3 located in the device body. In addition, the carriage 2 is driven through a motor pulley 5, a driven pulley 6 and a timing belt 7 by a main scan motor 4, and moves such that the position and the speed are controlled. The print medium 8 such as a sheet or a plastic sheet is held between two sets of carrying rollers 9, 10 and 11, 12 and is carried (paper feeding) through a position (printing portion) opposing a eject port face of the print head 1 by rotation of the carrying rollers. It should be noted that the print medium 8 has the back face which is supported by a platen (not shown) so that a flat printing face is formed in the printing portion. In this case, each head cartridge 1 mounted on the carriage 2 is held so that the eject port face extends from the carriage 1 to the downward to be held in parallel with the print medium 8 between the two sets of the carrying rollers.

The ink jet printer 13 formed by uniting them is connected through a cable 15 to the host computer 14 and is controlled by a printer driver installed within the host computer 14.

Figure 22:
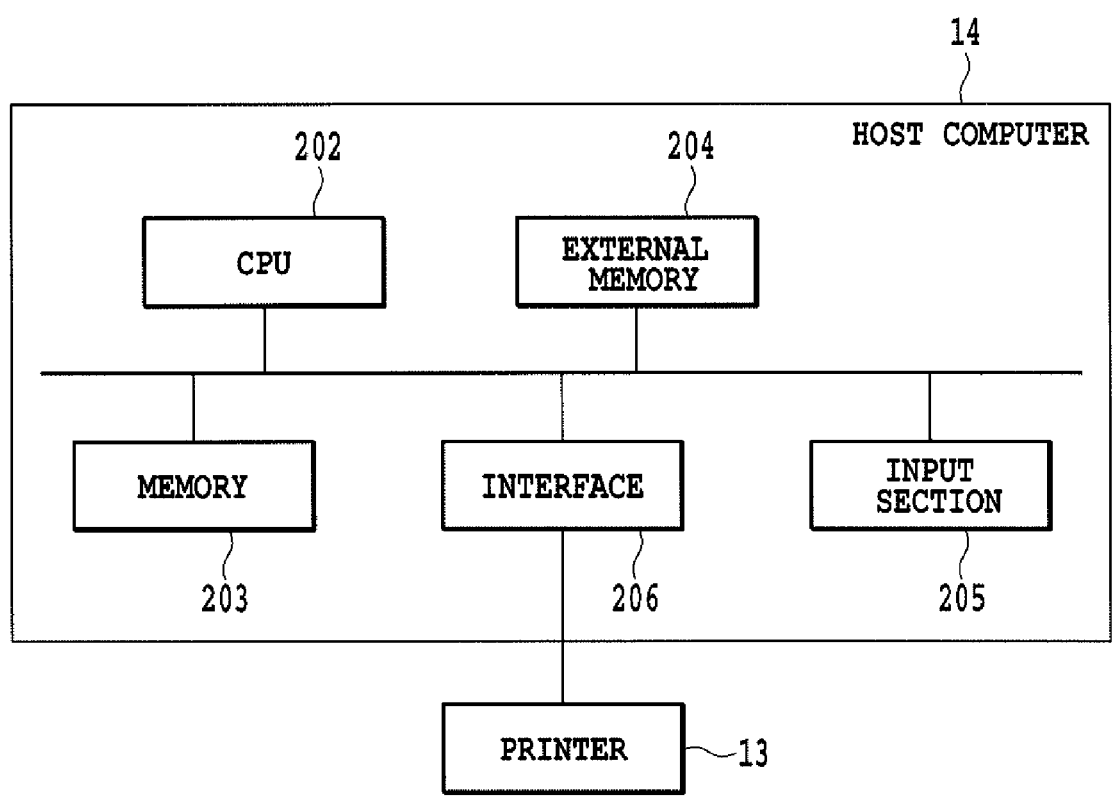
FIG. 22 is a block diagram showing major functions of the host computer shown in FIG. 21.

FIG. 22 is a block diagram showing mainly an arrangement of the host computer in the printing system shown in FIG. 21.

The host computer 14 is provided with a CPU 202, a memory 203 such as a RAM or a ROM and an external memory device 204 such as a hard disc. Further, the host computer 14 is provided with an input section 205 to which an input device such as a key board or a mouse is connected and an interface 206 to which peripheral devices such as a printer are to be connected. The respective sections are connected with each other through a system bus. The CPU 202 executes a program stored in the memory 203, thereby executing an image processing to be described later in FIG. 23. This program is stored in an external memory device 204 or the like and is supplied from the external memory device 204 to the memory 203 as needed.

The host computer 14 is connected through the interface 206 to the printer 13 to feed an image data image-processed to the printer 13, making the printer 13 perform a printing action.

Figure 23:
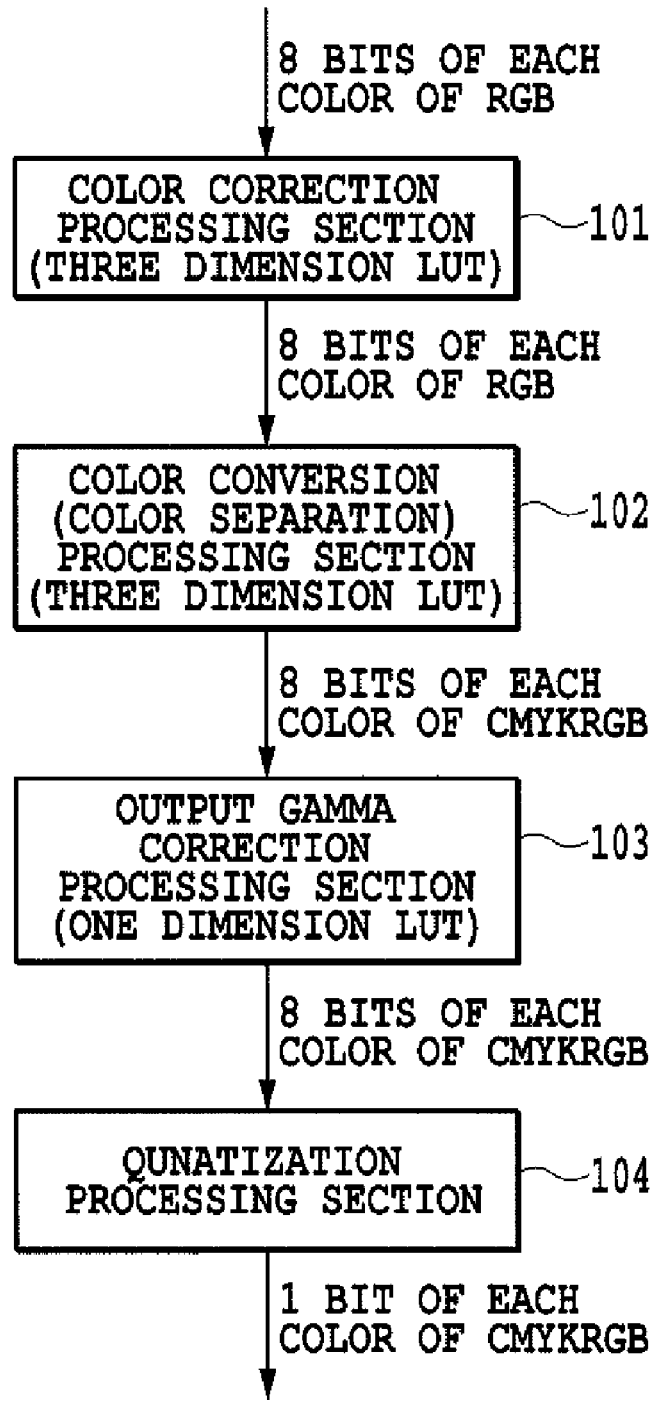
FIG. 23 is a block diagram showing an image processing executed in a host computer shown in FIG. 22.

FIG. 23 is a block diagram showing main functions of an image processing executed by the host computer 14 and shows the processing to execute conversion of an input image data of 8 bits (256 gradation levels) of each of colors R, G and B and output the print data of one bit of each of colors C, M, Y, K, R, G and B. It should be noted that this processing is realized as a printer driver acting on the host computer 14.

The image data of 8 bits of each of colors R, G and B as the input data is, at a color correction processing section 101, corrected to be the image data of 8 bits of each of colors R, G and B having colors of a color gamut which the printer can reproduce. This processing is executed by using a three-dimension look-up table (LUT) together with the interpolation calculation. More specially for example, for producing a desired color reproduction such as color reproduction by a RGB monitor, a gamut mapping technology is used to perform color matching for adapting the color reproduction region of the printer 13 to an appropriate color target on an uniform color space such as $L^* a^* b^*$. The known technology may be used as this gamut mapping technology. It should be noted that the color correction processing is not necessarily required to use a table and the color correction processing may be executed by an appropriate linear or non-linear color correction function.

Next, a color conversion processing section 102 executes color separation processing to be described later in FIG. 25 or the like where the RGB image data is converted into an image data of 8 bits of each of colors C, M, Y, K, R, G and B. This processing is also executed by using the three-dimension LUT together with the interpolation calculation. This processing causes a combination of color signals C, M, Y, K, R, G and B of ink at the time of reproducing an image represented by the color signal RGB with a printer to be determined.

An output gamma correction section 103 executes an output gamma correction for image data of 8 bits of each of colors C, M, Y, K, R, G and B obtained by the color conversion processing, by using a one dimensional LUT. The output gamma correction, in many cases, guarantees a linear relation between an image data of 8 bits of each of colors C, M, Y, K, R, G and B inputted by correcting a relation between the printing dot number per unit area which does not become linear and output characteristics (reflection density or the like) and output characteristics of an image to be formed.

Further, the image data of 8 bits of each of colors C, M, Y, K, R, G and B is quantized in accordance with the printing mechanism of the printer 13 at a quantization processing section 104. For example, if the printer 13 is a binary printer, the image data of 8 bits is quantized to the data of one bit (binary value) of each of colors C, M, Y, K, R, G and B. This quantization method can use a known error diffusion method or dither method. It should be noted that this quantization processing performs, for example, quantization to four level values larger than a binary value, and in a printer, a dot pattern expansion may be made based upon the data of the four level values to finally obtain a binary data for driving the print head.

Regarding Coloring Material of Ink

Next, coloring materials of ink of yellow, magenta, cyan and black as basic colors and ink of red, green and blue as particular colors, which can be preferably used in the embodiment, are as follows.

Any of pigment and dyestuff can be used as coloring materials used in ink of basic colors (three basic colors of yellow, magenta and cyan, and besides, black).

Among others, the pigment has the characteristics to be easily flocculated between pigment particles. For this reason, in the pigment, as described later, the chroma tends to be reduced in a case of the color mixture, and the color separation method of the present invention can be more effectively applied to the pigment. In addition, in general since in a pigment, a coloring material insoluble in an ink solvent forms particles to be involved in coloring, an absorption spectrum is widened and the chroma of the basic color ink tends to be lower as compared to that of dyestuff, also due to mixing of reflection light and scattered light. Since the chroma of the basic color ink thus tends to be lower, the technique of maintaining the chroma can be more effectively applied by using the particular color ink of the present invention together with the basic colors.

Coloring Characteristics of C, Y and G Ink

Figure 24:
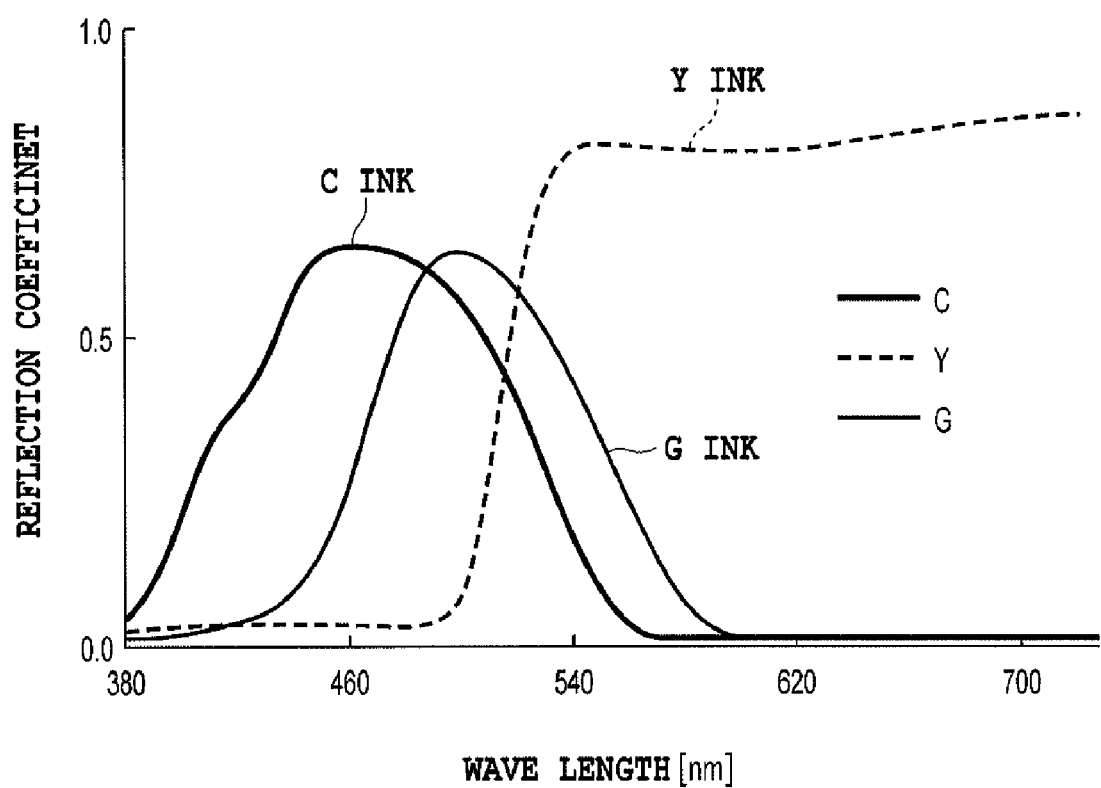
FIG. 24 is a diagram showing coloring characteristics of ink used in an embodiment.

FIG. 24 is a reflection spectrum showing coloring characteristics of each of a basic color C ink, a basic color Y ink and a particular color G ink. The basic color C ink has a relatively high reflection coefficient even in a blue region of a short wave length in addition to a cyan component. In addition, the particular color G ink has the spectrum form similar to that of the basic color C ink, having a peak closer to the green color and a narrower reflection zone. The basic color Y ink has a high reflection coefficient in yellow and red regions and a low reflection coefficient in the regions from green, cyan to blue.

As described above, the basic color C ink has coloring closer to a blue color and the particular color has high chroma and many portions overlapped in the zone of the basic color C ink and the green color. In addition, the basic color Y ink has a few portions overlapped in the zone of the basic color C ink and the green color.

Ink Composition

Detailed examples of coloring materials in the basic color C ink and the particular color G ink in the embodiment include the following and ones adapted for the above condition can be selected.

(Aqueous Medium)

Aqueous ink of the present invention includes a blended solvent of water and a soluble organic solvent. Examples of soluble organic solvents can selectively include the following. More specially, for example, it includes: alkyl alcohol of carbon numbers 1 to 4 such as methyl alcohol, ethyl alcohol, n-propyl alcohol, isopropyl alcohol, n-buthyl alcohol, sec-buthyl alcohol and tert-buthyl alcohol; amides such as dimethylforamide and dimethylacetoamide; ketone such as acetone and diaceton alcohol or ketone alcohol; ether such as tetrahydrofuran and dioxane; polyalkylene glycol such as polyethylene glycol and polypropylene glycol; alkylene glycol in which 2 to 6 carbon atoms are included in alkylene group such as ethylene glycol, propylene glycol, buthylene glycol, triethylene glycol, 1,2,6-hexane triol, thiodi glycol, hexylene glycol, diethylene glycol; lower alkyletheracetate such as polyethylene glycol monomethyletheracetate; glycerin; lower alkylether of multiple alcohol such as ethyleneglycolmonomethyl (or ethyl) ether, diethyleneglycolmethyl (or ethyl) ether and triethyleneglycolmonomethyl (or ethyl) ether; N-methyl-2-pyrrolidone, 2-pyrrolidone, and 1, 3-dimethyl-2imidazolydinone. In addition an example of water preferably includes deionized water.

The content of a soluble organic solvent in the soluble ink of the present invention is not particularly limited and it is desired to preferably set the content within a range of 3 to 50% by mass to the total ink mass. In addition, it is preferable that an amount of water contained in the ink is within a range of 50 to 95% by mass to the total ink mass.

(Coloring Material)

Next, a coloring material of the present invention will be explained. A coloring material constituting aqueous ink of the present invention is not particularly limited as long as the coloring material can be used as aqueous ink. More specially the coloring material may include a soluble dyestuff containing an anionic group, a pigment of a resin dispersion type using a dispersant (resin dispersion type pigment), a pigment of a self-dispersion type introducing a hydrophile group on a surface of a pigment particle (self-dispersion type pigment), a pigment modified by chemically bonding an organic group containing polymer molecules on a surface of the pigment particle (resin bonding type self-dispersion pigment), and a pigment such as a micro capsule type pigment which can be dispersed by increasing dispersibility of an insoluble coloring material itself without use of a dispersant or the like. A ratio of a coloring material to a total ink amount is 0.1 to 15% by mass, more preferably 1 to 10% by mass. Hereinafter, the dyestuff and pigment which can be used in the present invention will be explained.

(Pigment)

The pigment which can be used in an aqueous ink of the present invention is not particularly limited and examples of the pigment may include any of the following.

A carbon black is suitable for a pigment used in black color ink. For example, the carbon black such as furnace black, lamp black, acetylene black and channel black can be used. More specially for example, examples of the carbon black can include Raven7000, Raven5750, Raven5250, Raven5000ULTRA, Raven3500, Raven2000, Raven1500, Raven1250, Raven1200, Raven1190ULTRA-II, Raven 1170, Raven1255 (the above made by Columbia Co.), Black Pearls L, Regal400R, Regal330R, Regal660R, Mogul L, Monarch700, Monarch800, Monarch880, Monarch900, Monarch1000, Monarch1100, Monarch1300, Monarch1400, Monarch2000, Valcan XC-72R (the above made by Cabot Co.), Color Black FW1, Color Black FW2, Color Black FW2V, Color Black FW18, Color Black FW200, Color Black S150, Color Black S160, Color Black S170, Printex35, Printex U, Printex V, Printex140U, Printex140V, Special Black6, Special black5, Special Black4A, Special black4 (the above made by Degssa Co.) and commercially available products such as No. 25, No. 33, No. 40, No. 47, No. 52, No. 900, No. 2300, MCF-88, MA600, MA7, MA8 and MA100 (the above made by Mitsubishi Chemistry Co.). In addition, a carbon black modified newly for the present invention may be used. However, the present invention is not limited to these, and may use a conventional known carbon black. In addition, the present invention is not limited to the carbon black, but may use a magnetic substance particle such as magnetite and ferrite or a black pigment such as titanium black.

More specially, examples of an organic pigment may include an insoluble azo pigment such as toluidine reds, toluidine maroons, hansa yellows, benzidine yellows and pyrazolone reds, a soluble azo pigment such as ritol reds, heliobordeaux, pigment scarlett, and permanent reds 2B, a derivative from an architecture dyestuff such as alizaline, indanthrone and thioindigo maroons, a phthalocyanine pigment such as phthalocyan blues and phthalocyan greens, a quinacridone pigment such as quinacridone reds and quinacridone magenta, perylene pigment such as perylene reds and perylene scarletts, an isoindolynone pigment such as isoindolynone yellows and isoindolynone oranges, an imidazole pigment such as benzimidazorone yellows, benzimidazorone oranges and benzimidazorone reds, a pylansron pigment such as pylansron reds and pylansron oranges, an indigoid pigment, a condensation azo pigment, a thioindigoid pigment, a diketopyrrolopyrrole pigment, flabansron yellows, acylamide yellows, quinophtharon yellows, nickel azo yellows, copper azomethylene yellows, perynon oranges, anthrone oranges, dianthrakynonele reds and dioxazine violets. Needless to say, the pigment is not limited to these, but may include other organic pigments.

When the organic pigments which may be used are shown in a color index number, for example, C.I pigment yellows are shown by 12, 13, 14, 17, 20, 24, 74, 83, 86, 93, 97, 109, 110, 117, 120, 125, 128, 137, 138, 147, 148, 150, 151, 153, 154, 166, 168, 180, 185, C.I. pigment oranges are shown by 16, 36, 43, 51, 55, 59, 61, 71, C.I. pigment reds are shown by 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, C.I. pigment violets are shown by 19, 23, 29, 30, 37, 40, 50, C.I. pigment blues are shown by 15, 15:1, 15:3, 15:4, 15:6, 22, 60, 64, C.I. pigment greens are shown by 7, 36 and C.I. pigment browns are shown by 23, 25, and 26.

In addition, any of soluble resins may be used as a dispersant for dispersing a pigment into ink, but it is preferable that a dispersant has an averaging molecule weight in a range of 1000 to 30000, more preferably 3000 to 15000. Preferred examples of such dispersants include a block copolymer composed of at least two monomers (at least one of them is a hydrophile monomer) selected from including a styrene, a styrene derivative, a vinyl naphthalene, a vinyl naphthalene derivative and aliphatic alcohol ester of $\alpha$, $\beta$ ethylene unsaturated carboxylic acid acrylic acids, acrylic acid derivatives, maleic acids, maleic acid derivatives, itaconic acids, itaconic acid derivatives, fumaric acids, fumaric acid derivatives, acetic vinyl, vinylpyrrolidone, acrylamide, and the derivatives, or a random copolymer, a graft copolymer, or salt thereof. Or a natural resin such as rosin, shellac and amylum may be preferably used as the dispersant. These resins are soluble in an aqueous solution where a base is dissolved and alkali soluble resins. It should be noted that it is preferable that soluble resins used as the pigment dispersants are contained in a range of 1 to 5% by mass to the total ink mass.

(Other Component)

An aqueous ink in the present invention, for maintaining moisturing, may use a moisturizing solid content such as urea, urea derivative, trimechylolpropane and trimechylolethane as ink components in addition to the above components. In general, the content of the moisturizing solid content in the ink is preferably in a range of 0.1 to 20.0% by mass, more preferably 3.0 to 10.0% by mass.

In addition, ink for an ink jet printing apparatus of the present invention may contain various additives such as a ph adjuster, an antirust, an antiseptic, an antimold agent, an antioxidant, a reduction prevention agent and an evaporation accelerator as needed in addition to the above-mentioned components.

Color Separation Method

Creation of a color separation table of a three-dimension LUT form used in a color conversion processing section 102 (FIG. 23) will be made as follows. First, lattice points in LUT of a cube shown in FIG. 2 are defined. In the embodiment, the lattice points of LUT are defined by, for example the upper 4 bits among inputted 8-bit data of each of R, G and B. In this case, lattice points of 24×24×24 in the cube shown in FIG. 2 are defined in accordance with RGB signals. In addition, the lower 4-bit data among inputted 8-bit data of each of R, G and B are used as weighing data (ratio of internal division) in the interpolation calculation. Here, the lattice point White in FIG. 2 is a point (lattice point) where a set of color signals (R, G and B) are specified by (255, 255, 255). Likewise, magenta is a point specified by (255, 0, 255), and yellow is a point specified by (255, 255, 0). Further, red is a point specified by (255, 0, 0). Green is a point specified by (0, 255, 0). Blue is a point specified by (0, 0, 255). Black is a point specified by (0, 0 and 0).

In the cube in FIG. 2 where such lattice points are defined, the lattice point, for which an ink amount (value of 8 bits of each of Y, M, C, K, R, G and B) is to be determined by the color separation method in the embodiment, is selected. More specifically, the color separation processing is executed with respect to lattice points on each of a W-C (B, M, R, Y, and G) line and a C (B, M, R, Y and G) -k line, each of C-B, C-G, B-M, M-R, R-Y and Y-G lines, and a W-K line, respectively, to determine the ink amount. Combinations of ink amounts of respective color as the lattice point data are made to correspond to the lattice points to be stored as a table data.

Further, an ink amount of the lattice point other than points on the above lines in the cube is determined based on the lattice point data of each line defined as described above, by using an interpolation. An example of this method may use an interpolation technique disclosed in Japanese Patent Laid-Open No. 2002-033930. Thus obtained lattice point data other than points on the lines are, likewise, made correspond to the lattice points to be stored.

Figure 25:
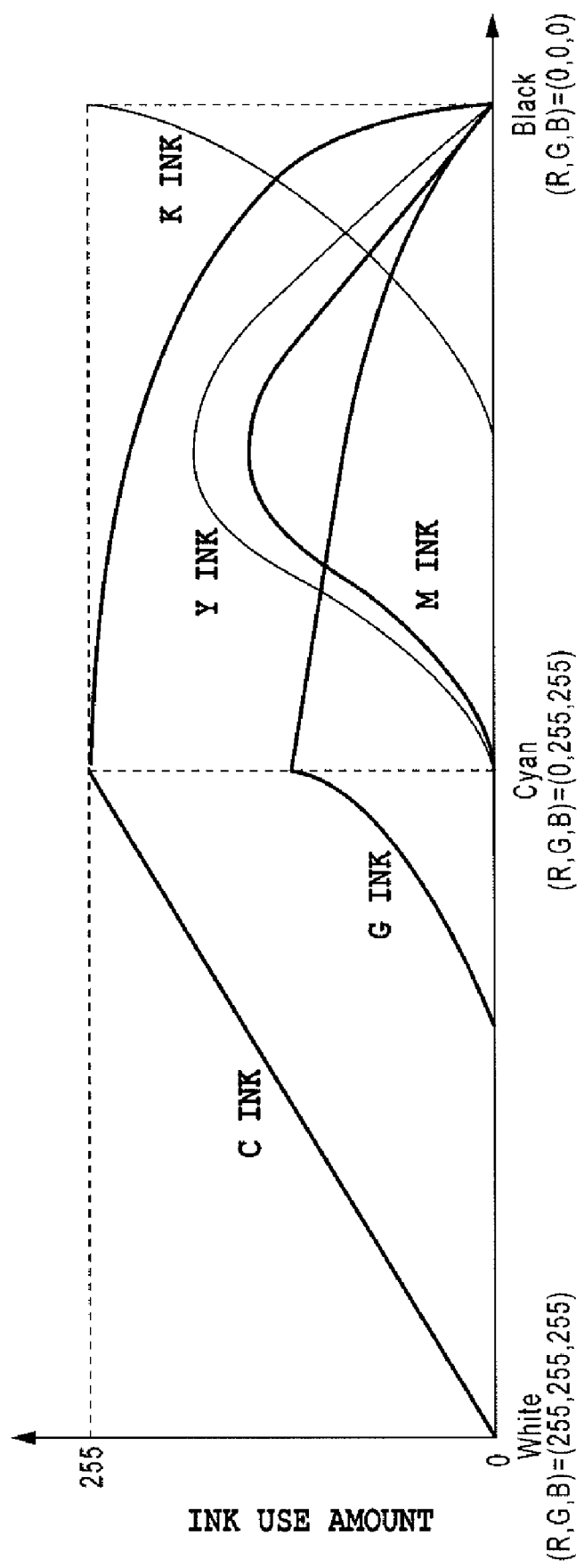
FIG. 25 is a diagram schematically showing a color separation of a W-C line and a C-K line to tone a basic color ink C by using particular color ink G in an embodiment of the present invention.

In the embodiment of the present invention, the lattice point data of the lattice points on W-C line 41 shown in FIG. 2 for reproducing the device primary color are determined as the color separation data, which realizes a color expression by each color ink use amount shown in FIG. 25. More specifically, C ink monotonically increases from W (White) point toward C (Cyan) point. In addition, particular color G ink for toning is used to be monotonically increased from the halfway in the course from W point to C point, and the basic color C ink and the particular color G ink are mixed at C point. In a case of thus reproducing the color of C (Cyan) point where the ejection amount per unit area of C ink is maximized, although the basic color C ink only is usually used, the basic color C ink and the particular color G ink are used in the embodiment. This makes the region of C image of the maximum density expressed by the color mixture of the basic color C ink and the particular color G ink.

In addition, as shown in FIG. 25, G ink gradually decreases from C point toward K point and becomes 0 at K (black)

point. Along with it, K ink starts to be used from the halfway and becomes maximized at K point. It should be noted that a use method of G ink on this line is not limited to this.

Further, M ink and Y ink are used as complementary color components to a basic color component C and the adjustment component G, in a region between C and K. It should be noted that, as the complementary color components, instead of M and Y, a single color of a particular color R may be used or the particular color R and either one of M or Y for toning the particular color R may be used. In addition, the above complementary color components may be selectively used according to lightness regions. For example, since in the vicinity of C point, there exists a sufficient ink ejection amount and care is required to be paid to the granular feeling, M and Y are used as complementary colors, and since at a dark portion, there exists no extra ink ejection amount and care is not required to be paid to the granular feeling, the particular color R may be used as a complementary color component. In addition, in a case of a system using gray ink, the gray ink may be used instead of the above-mentioned complementary color component as needed. Needless to say, an application of the present invention is not limited by the color separation of the G-K line.

It should be noted that the lattice points on W-C line 41 in the lateral axis in FIG. 25 are to be actually shown at discrete positions. Accordingly, an ink amount corresponding to the lattice point is to be shown as a discrete position by itself, but for explanation simplification, the ink amount is shown to continuously change.

Figure 26:
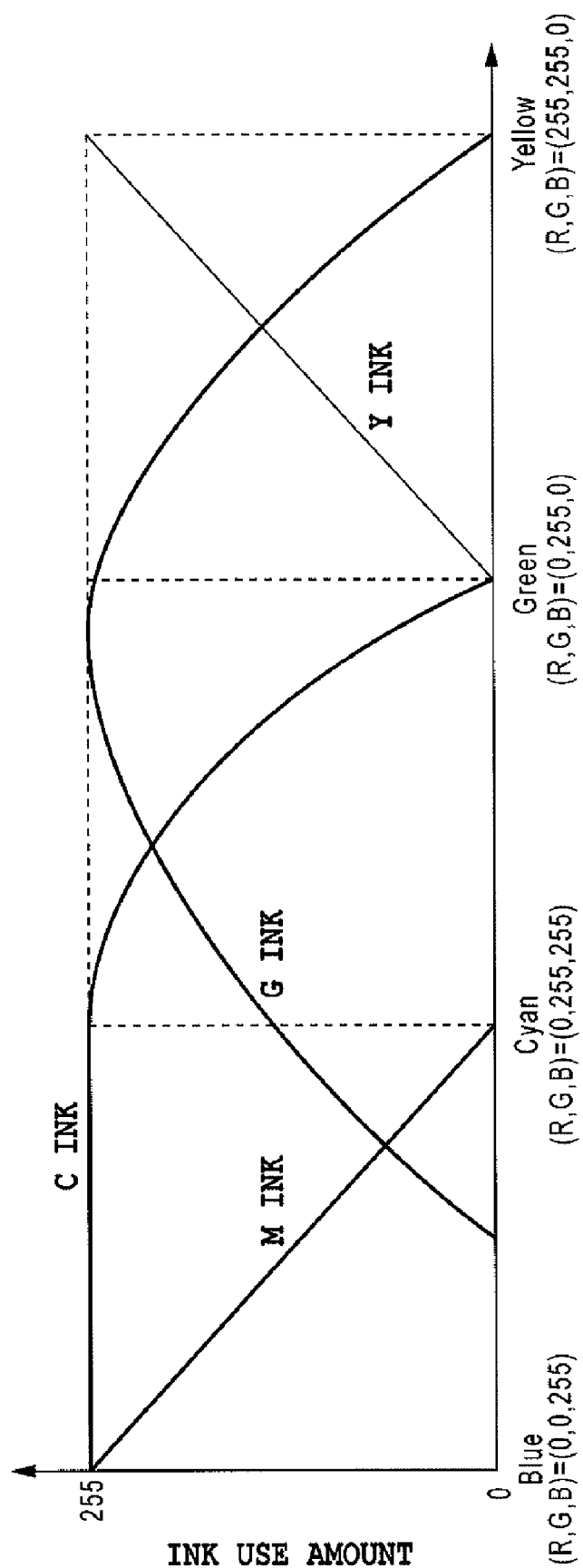
FIG. 26 is a diagram schematically showing a color separation of a B-C-G-K line on the color separation table shown in FIG. 25.

The color separation of the lattice points on B-C-G line and of the lattice points on G-Y line shown in FIG. 2 are that shown in FIG. 26. More specifically, C ink is constant from B point to C point, monotonically decreases from C point to G point, and becomes 0 at G point. In addition, M ink monotonically decreases from B point to C point and becomes 0 at C point. The particular color G ink used for toning monotonically increase from the halfway between B point and C point via C point to G point and is maximized at G point.

Further, G ink monotonically decreases from G point toward Y point. In addition, Y ink monotonically increases between G point and Y point. In this color separation, as shown in FIG. 25, C point has the color mixture of the basic color C ink and the particular color G ink. It should be noted that between G point and Y point, G point is to be reproduced by the particular color G ink only, but for the toning, may be reproduced by two colors, i.e., the particular color G ink and the basic color C ink, or the particular color G ink and the basic color Y ink. In addition, even if the particular color G ink is used to the applicable maximum amount, there may be a case that the particular color G ink does not reach the receptible ink amount of the paper (ink ejection amount). In this case, in addition to the particular color G ink, the basic color C ink and the basic color Y ink may be further added. This allows color reproduction with higher chroma. It is a matter of course that the present invention is not limited by the color separation in the line between G point and Y point.

Figure 10:
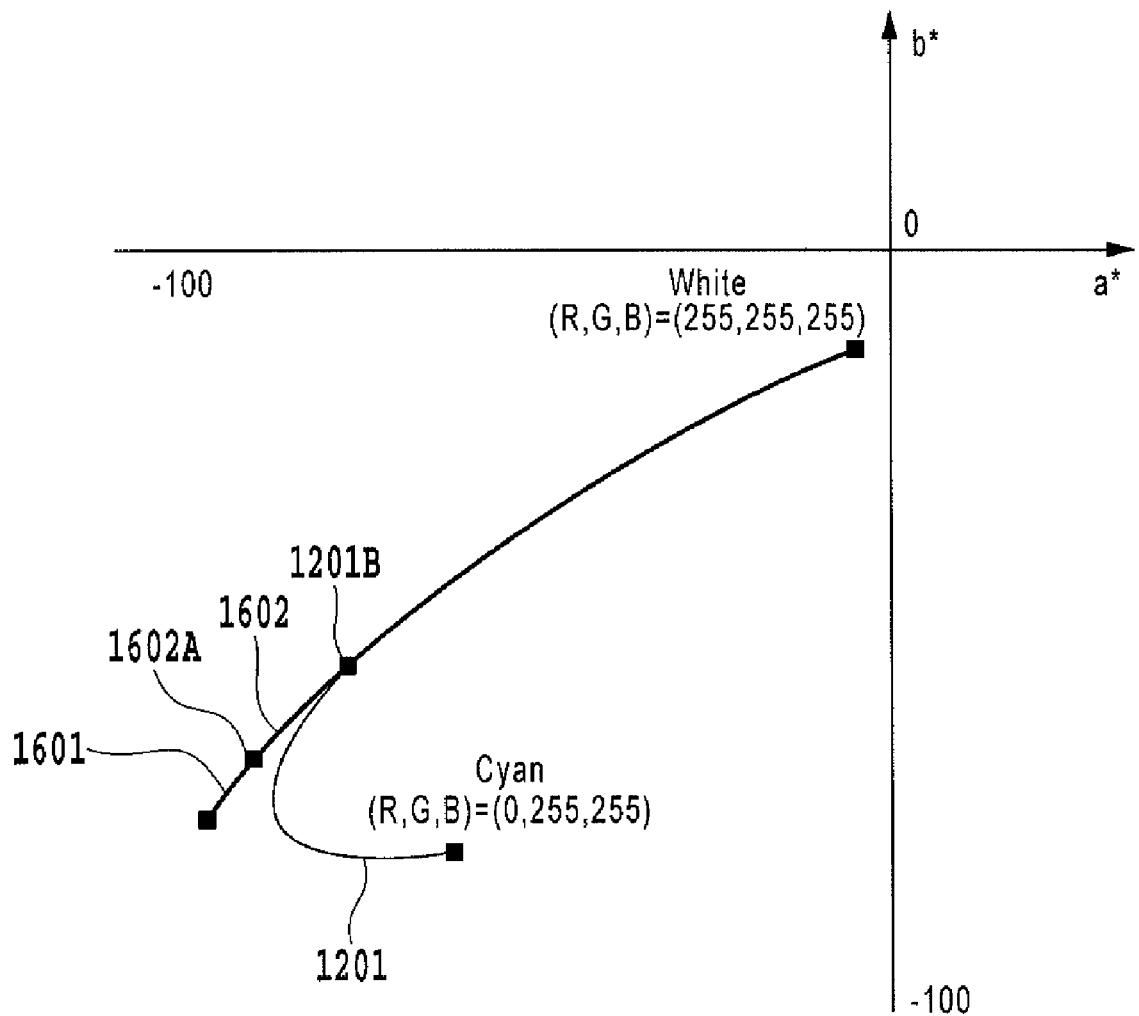
FIG. 10 is a diagram showing, on an a* b* plane, color reproduction by each of the color separation in the conventional example in a W-C line on the color separation table and the color separation in an embodiment of the present invention.
Figure 11:
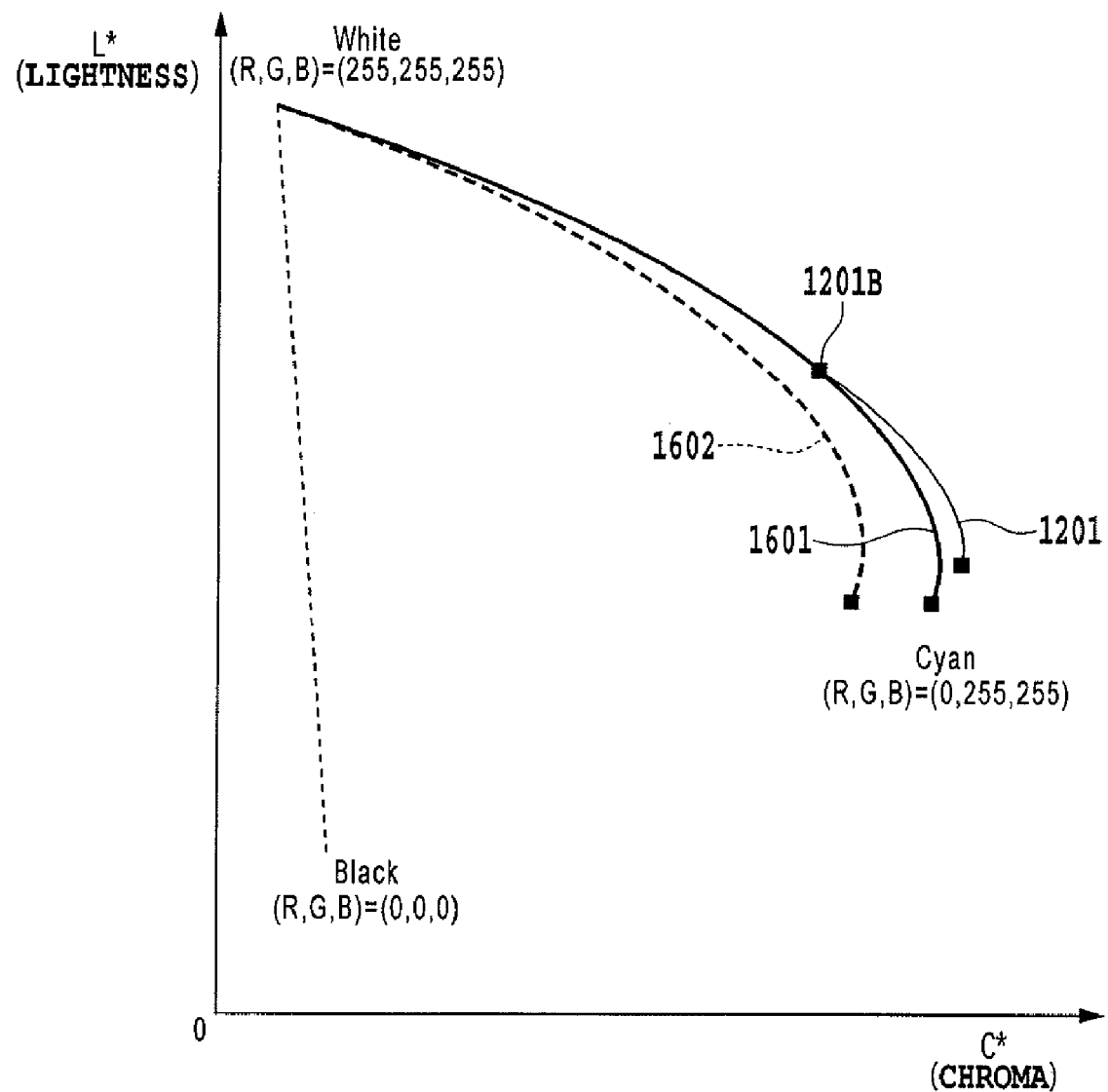
FIG. 11 is a diagram showing, on a C* L* plane, color reproduction by each of the color separation in the conventional example in a W-C line on the color separation table and the color separation in an embodiment of the present invention.

When a printer performs printing based upon the lattice point data obtained by the above-mentioned color separation, the color reproduction is shown as a color reproduction line 1601 in FIG. 10 or in FIG. 11. For reproducing a device primary color C between W and C, the particular color G ink in addition to the basic color C ink is used (FIG. 25). This allows, as shown FIG. 10, the hue shift occurring at the high chroma portion in a case (line 1201) of printing the single color of C ink to be decreased. In addition, the line 1601 in the embodiment, as shown in FIG. 11, can realize the coloring with extremely high chroma as compared to the reproduction line 1602 in a case of performing the toning by the basic color Y described in the column of the "Related Art" and can realize the chroma equal to that of line 1201 in a case of using the single color of C ink. According to the color separation of the embodiment, the hue shift due to the basic color C ink can be decreased and reduction of chroma due to the toning can be controlled.

As described above, in a case where the coloring of the basic color C ink is closer to a blue color in reflection coefficient characteristics, the particular color G ink, which reproduces high chroma and has large portion where the reproduction region of the G ink is overlapped with that of C ink in a green range, is used at a high density portion of the device primary color C. Here, "high density portion" may include at least the highest density region, but preferably denotes the highest density region, as well as the density region in the vicinity thereof. As a result, control of the hue shift and the high chroma both as described above can be realized.

Also with respect to line W-M and line W-Y relating to device primary colors M and Y respectively, in a case where the ink system in the embodiment causes the hue shift when M ink and Y ink are respectively used as single coloring materials, the color separation similar to that shown in FIG. 25 is made. For example, the basic color M ink and the particular color R ink, and the basic color Y ink and the particular color G ink may be used, in accordance with the direction where the hue is shifted.

Figure 27:
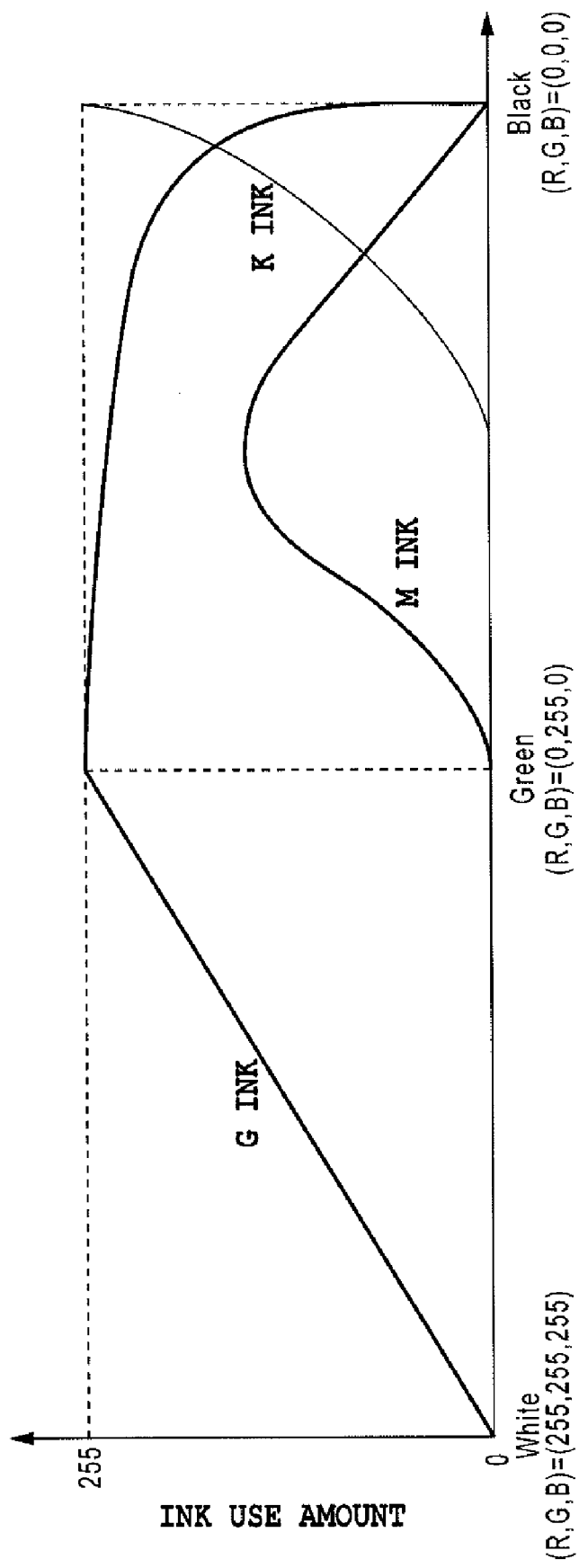
FIG. 27 is a diagram schematically showing a color separation of a W-G-K line on the color separation table shown in FIG. 25.

FIG. 27 is a diagram showing a color separation of line other than the above-mentioned lines, which is influenced by using of the particular color G ink for the line W-C of the device primary color C according to this embodiment. This figure shows the color separation of W-G-K line, in which G ink monotonically increases from W point toward G point and is maximized at G point. In addition, G ink is maintained to be nearly constant between G point and a point close to K point, and decreases immediately before K point and becomes 0 at K point. In this G-K line, M ink increases toward K point and thereafter, decreases and becomes 0 at K point. Further, K ink is used from the halfway and is maximized at K point. It should be noted that in this example, the color at G point is reproduced by the particular color G ink only, but may be reproduced by two colors for toning, i.e., the particular color G ink and the basic color C ink or the particular color G ink and the basic color Y ink. In addition, although the particular color G ink is used to the applicable maximum amount, the amount may not reach the receptible ink amount of a print sheet (ink ejection amount). In this case, in addition to the particular color G ink, the basic color C ink and the basic color Y ink may be further added. This allows color reproduction with higher chroma. In addition, a single color of basic color M is used as a complementary color component of the particular color G ink, but the basic colors M and Y or the like may be used. The present invention is not limited by the color separation in the line between G point and K point.

Coloring Mechanism Used in the Embodiment

Hereinafter, a coloring mechanism which the color separation method of the embodiment described above uses as the background will be explained by comparing the coloring characteristics in a case of performing printing in accordance with following five conditions with each other.

EXAMPLE 1

Printing by a single color of basic color C ink (hereinafter, conventional example)

EXAMPLE 2

Printing of a color mixture by basic color C ink and basic color Y ink (comparative example)

EXAMPLE 3

Printing of a color mixture by basic color C ink and particular color G ink (the present embodiment)

EXAMPLE 4

Printing of blended ink CY by basic color C ink and basic color Y ink (comparative example)

EXAMPLE 5

Printing of blended ink CG by basic color C ink and particular color G ink (comparative example)

Here, besides the color mixture printing, the printing by blended ink (comparative example 5) is added and this is because in a case of printing the color mixture, the formation process of ink on the print medium or an influence due to a dot arrangement is clarified. It should be noted that "printing" result herein is based upon many times of scanning by a print head and the bidirectional printing. For example, in a case of mixing first ink and second ink, two kinds of printings are arranged uniformly in an equal ratio on the print medium, that is, the one kind that the first ink is printed later (upper side), and the other kind that the second ink is printed later (upper side).

First, a dot formation state on the print medium print medium is confirmed based upon a micrograph.

Micrograph of a Printing State of Dots on a Print Medium

Hereinafter, the printing state on a print medium by each printing method is explained by using a micrograph. It should be noted that the density on the micrograph corresponds to the printing density of each ink and a slight lightness adjustment is made for each micrograph for ensuring visibility of the printing state. Accordingly, it is possible to confirm the printing state of dots from this micrograph, but the density by each printing method can not estimated by comparison in density between micrographs.

Figure 3:
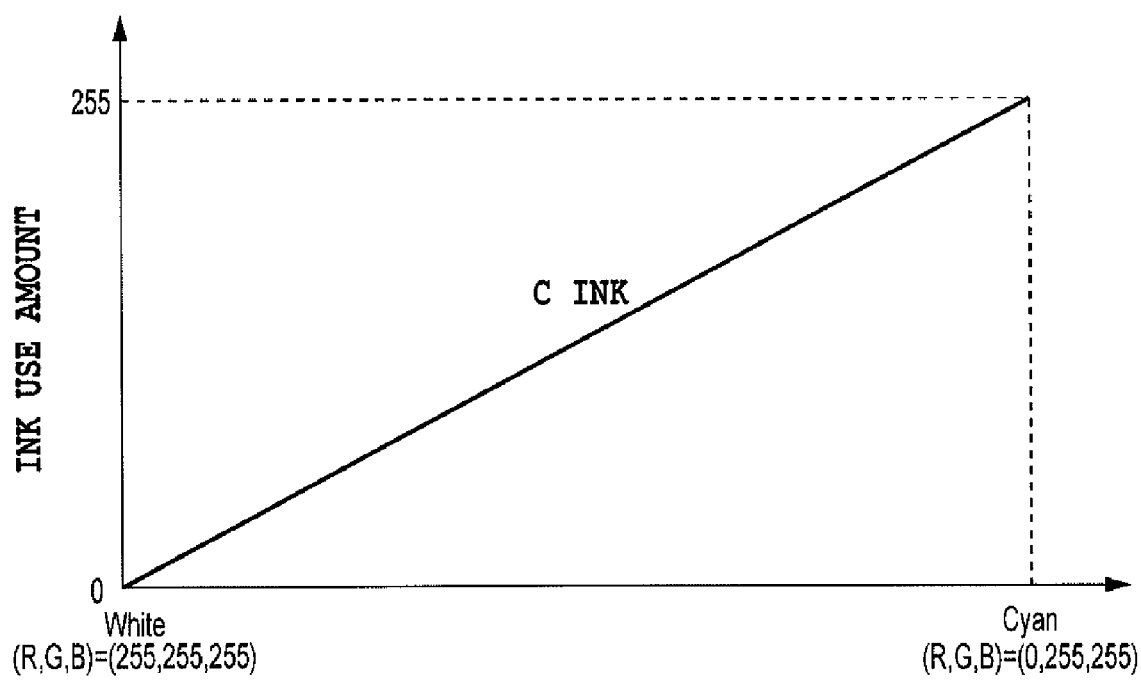
FIG. 3 is a diagram schematically showing a color separation table for reproducing a W-C line in a single color of C ink in the conventional example.
Figure 4:
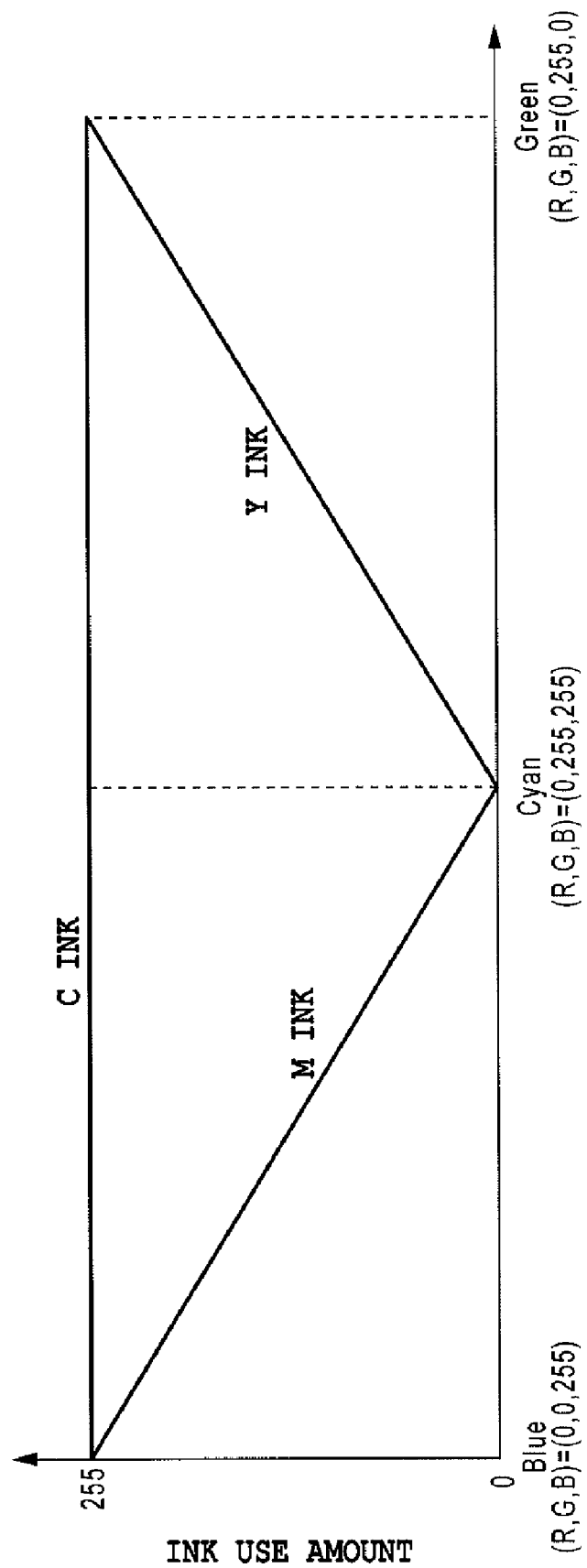
FIG. 4 is a diagram schematically showing a color separation of a B-C-G line in the conventional color separation table shown in FIG. 3.
Figure 5:
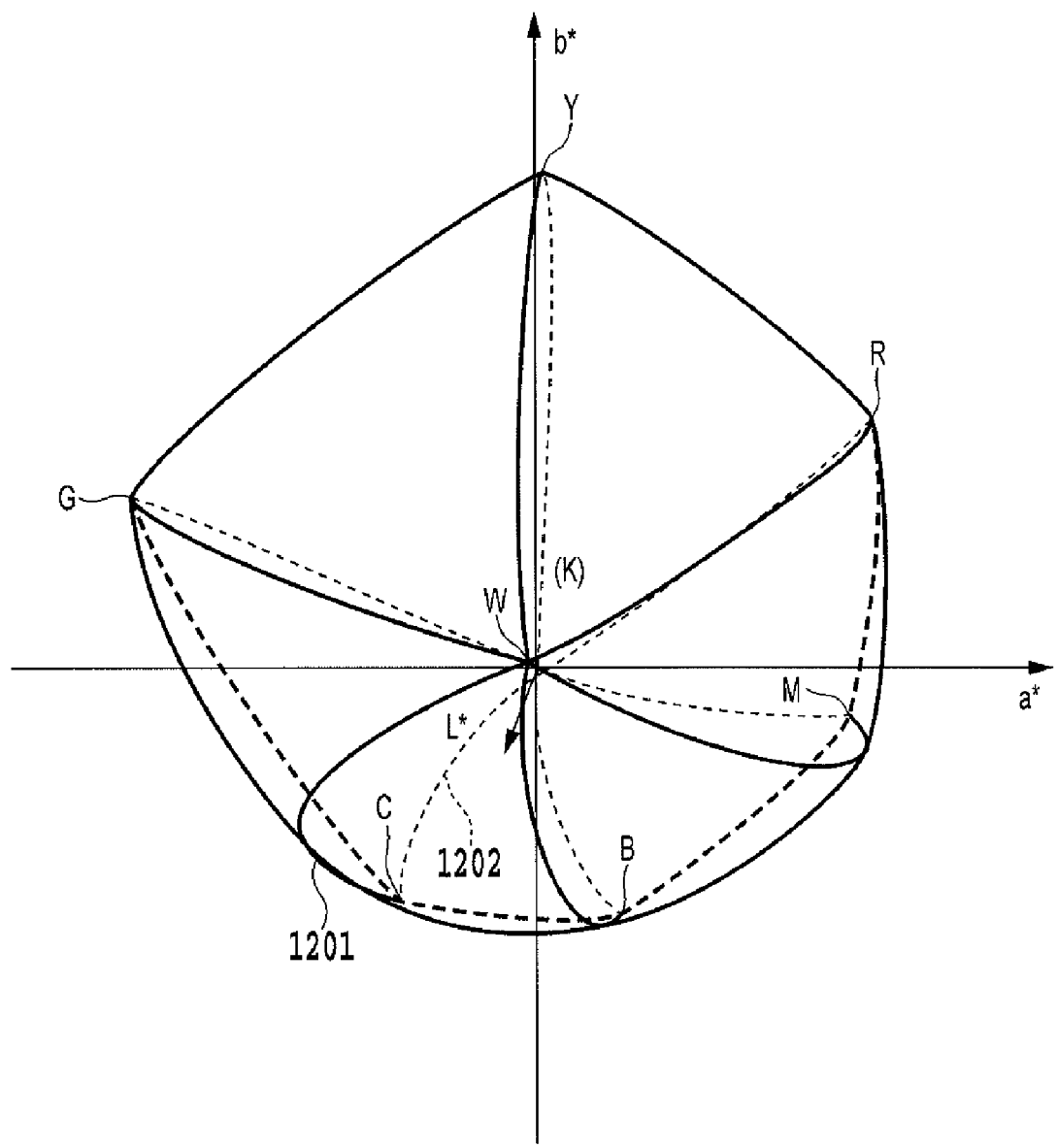
FIG. 5 is a diagram schematically showing a color reproduction region in a printer by the conventional color separation table shown in FIG. 3.
Figure 6:
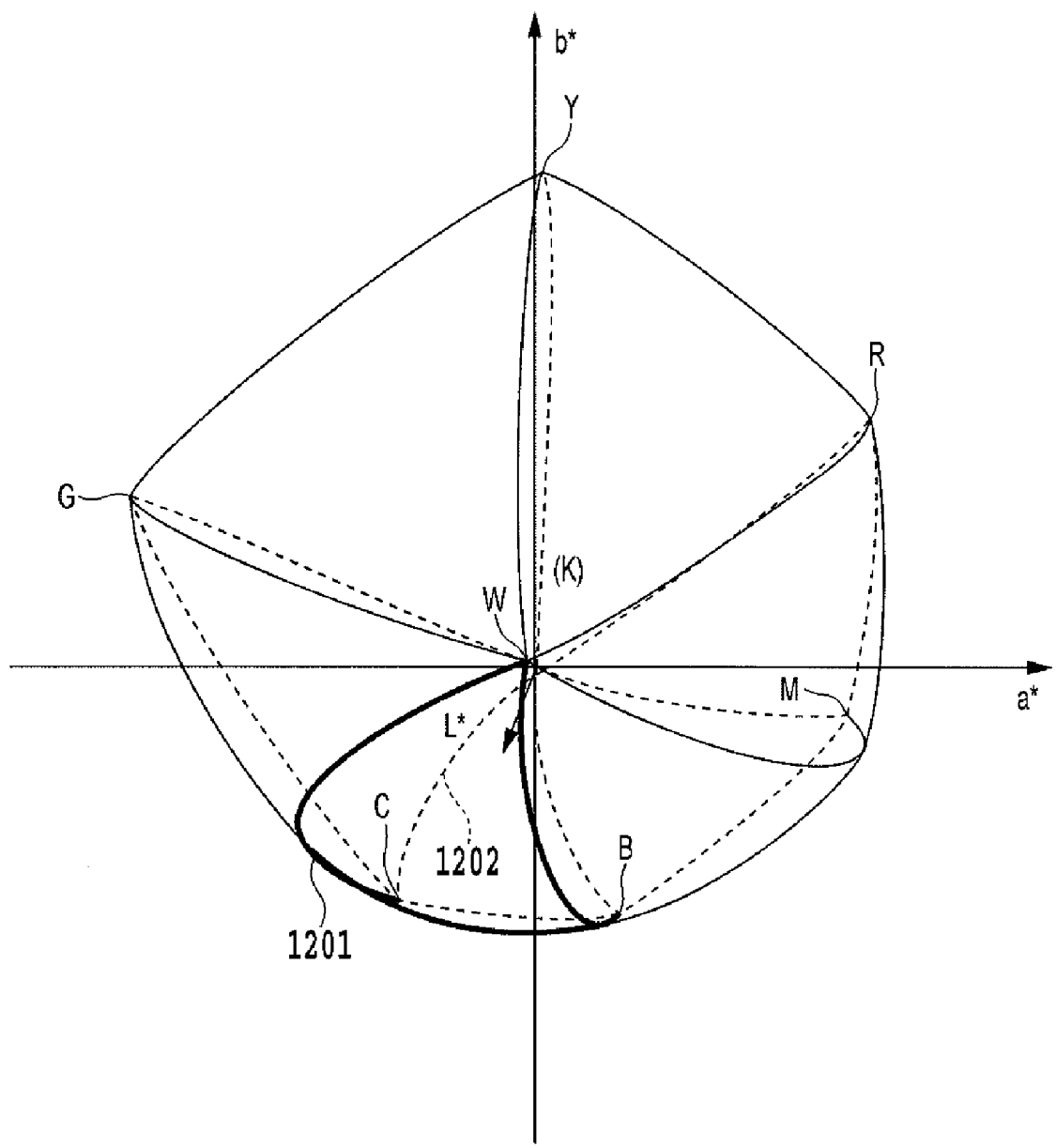
FIG. 6 is a diagram emphatically showing a W-C-B plane in the color reproduction region in FIG. 5.
Figure 7:
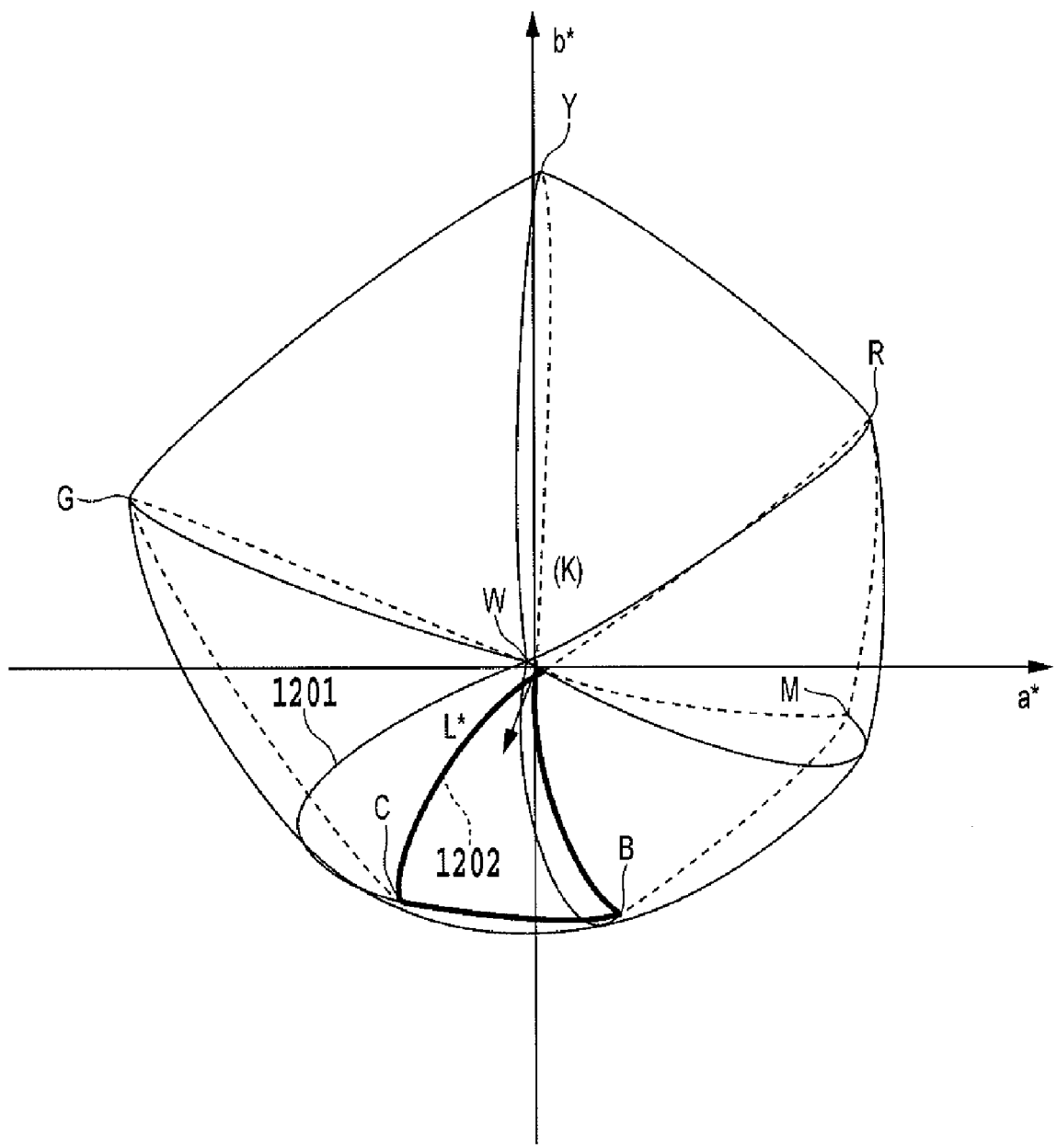
FIG. 7 is a diagram emphatically showing a C-B-K plane in the color reproduction region in FIG. 5.
Figure 8:
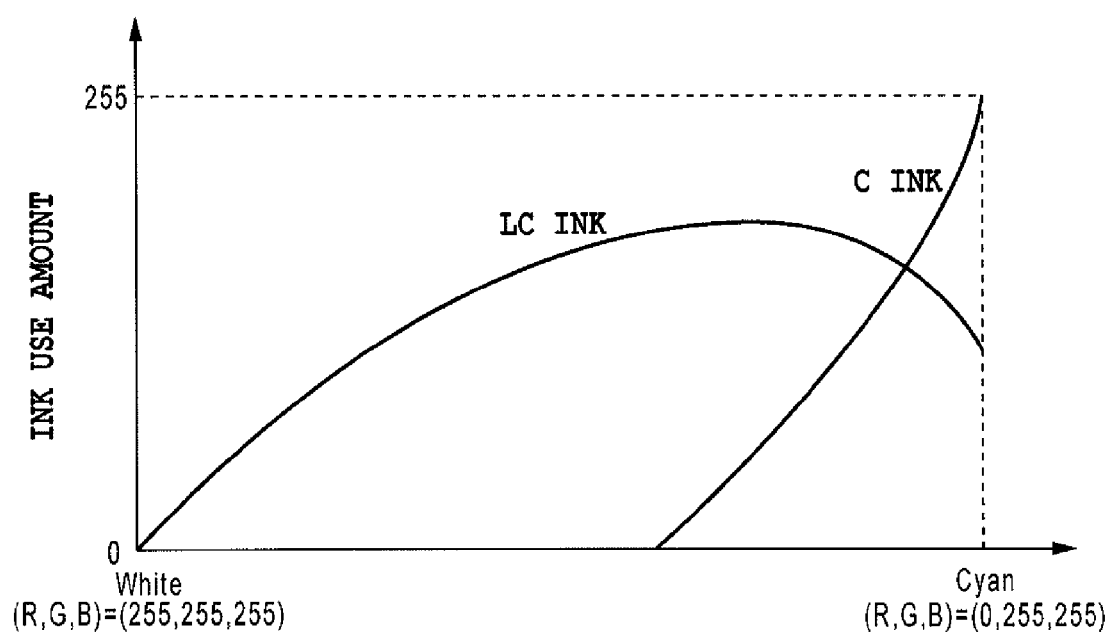
FIG. 8 is a diagram schematically showing a color separation of a W-C line in a case of constituting a device primary color in another conventional example by using both of C and LC of the same system color.
Figure 9:
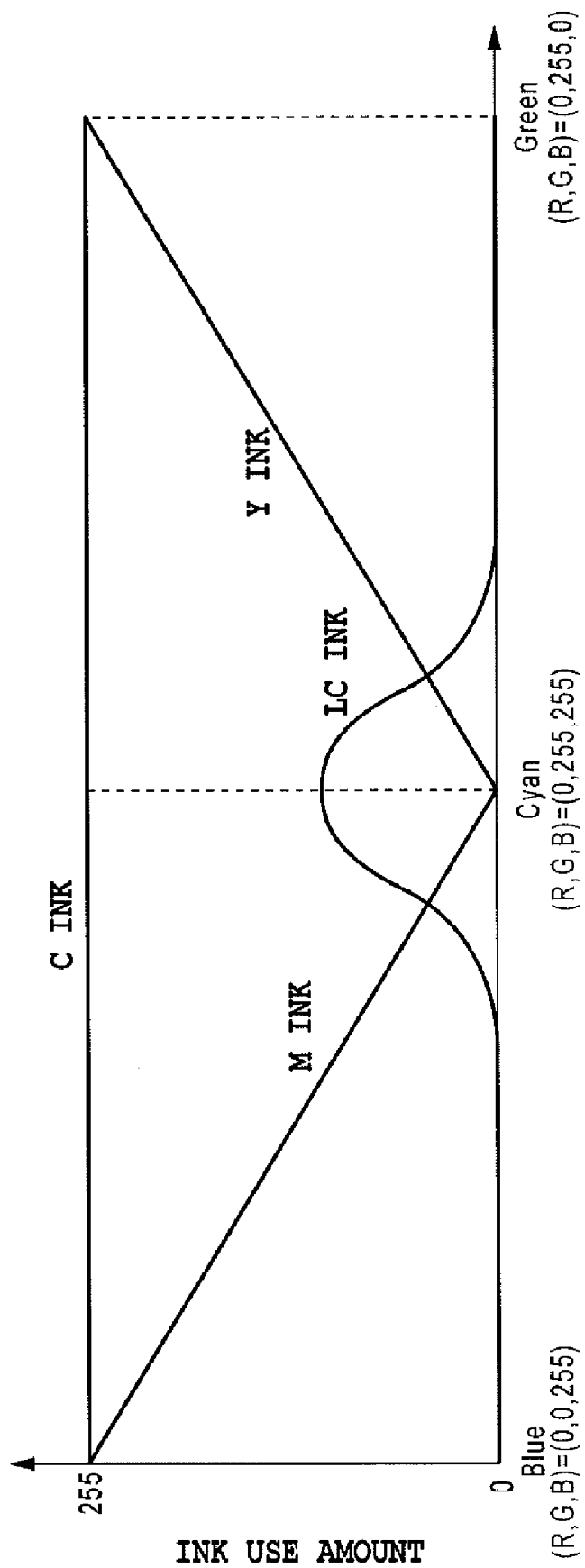
FIG. 9 is a diagram schematically showing a color separation of a B-C-G line in the color separation table shown in FIG. 8.
Figure 28:
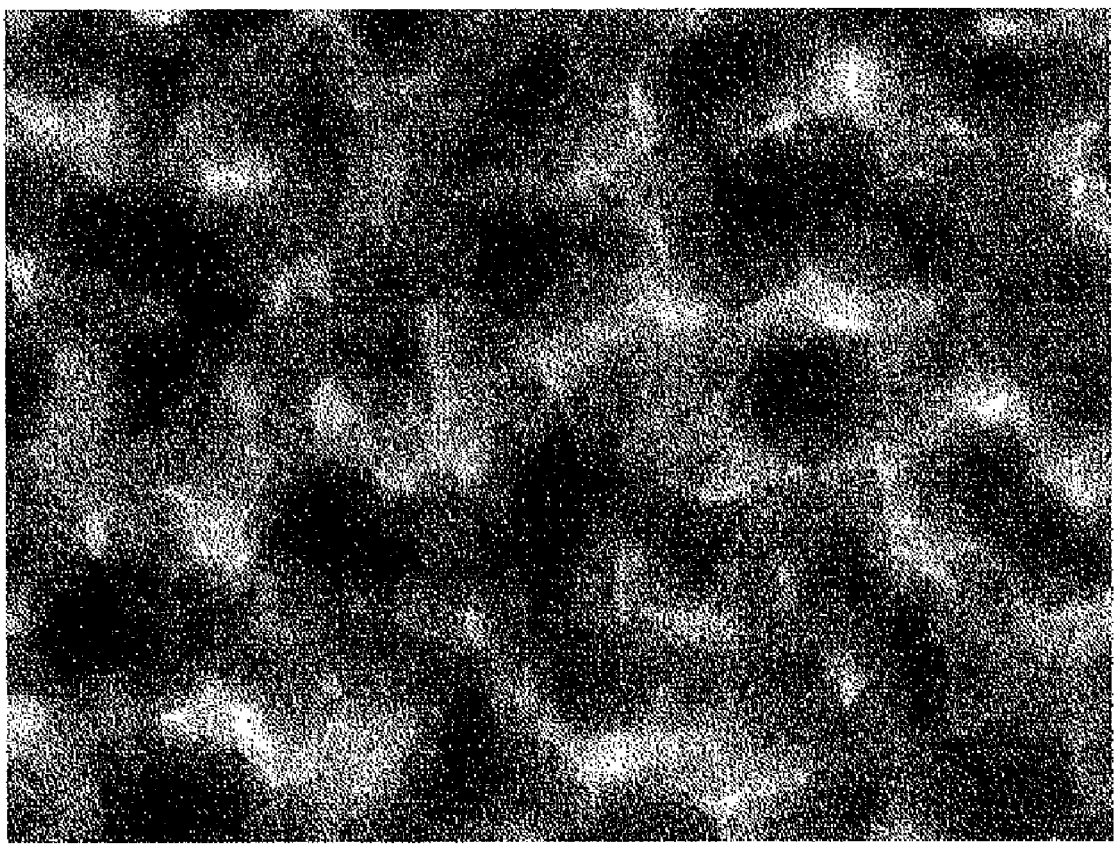
FIG. 28 is a view showing a micrograph of a printing state in a case of printing on a print medium in a single color of C ink.

FIG. 28 shows the micrograph of the printing state in a case of applying a C ink amount at C point shown in FIG. 3 or the like on a print medium in a single color of C ink (Example 1). In the micrograph, a white portion shows the ground of the print medium and the printing density is higher on a blacker portion. As seen from FIG. 28, C ink is printed in such a manner that the nearly entire surface of the print medium is covered with C ink, the ground of the print medium remains in a part thereof and the dots are overlapped in a part thereof.

Figure 29:
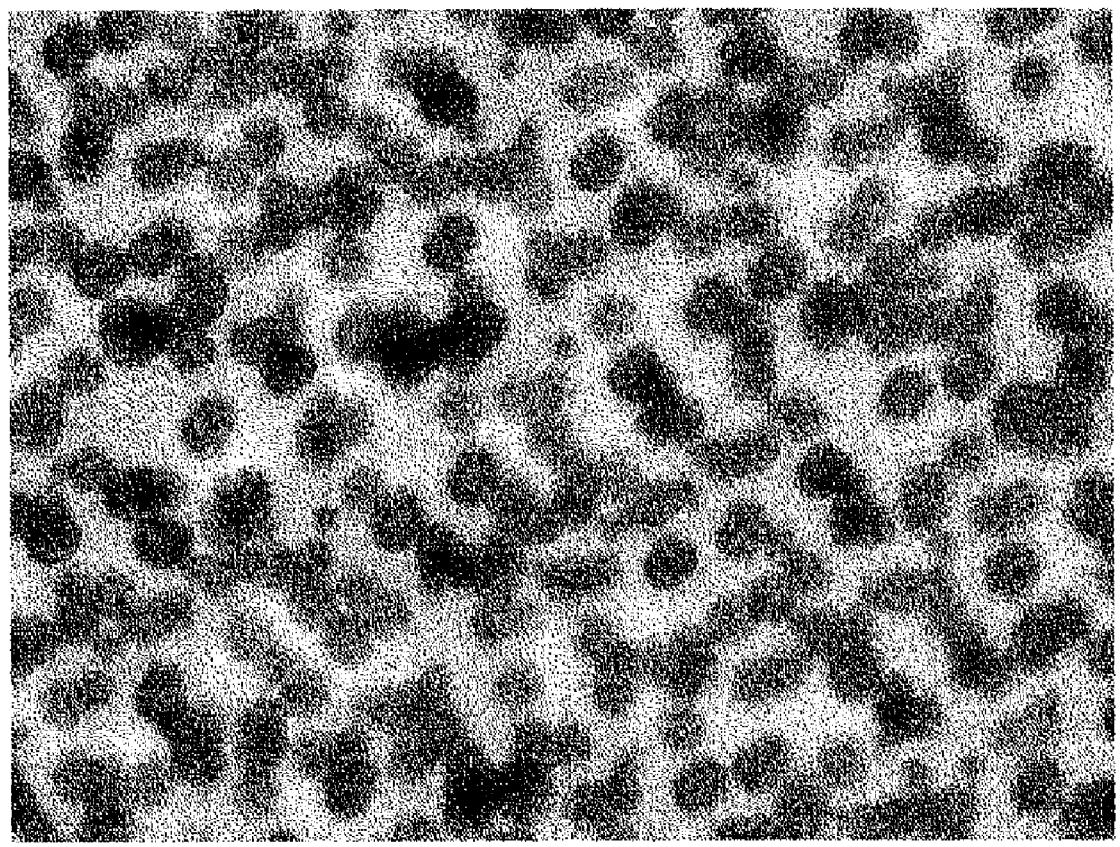
FIG. 29 is a view showing a micrograph of a printing state in a case of printing on a print medium in a single color of G ink.

FIG. 29 shows the micrograph of the printing state in a case of applying an ink amount of the particular color G at C point shown in FIG. 25 on a print medium in a single color of G ink. As seen from FIG. 29, the nearly half surface of the print medium is uniformly covered with G ink and the ground of the print medium remains as it is on the nearly other half surface. In addition, it is found out that G dots are printed without nearly overlapping with each other. It should be noted that it is found out that from FIG. 29, G dots are formed as a nearly perfect circle on the print medium.

Figure 12:
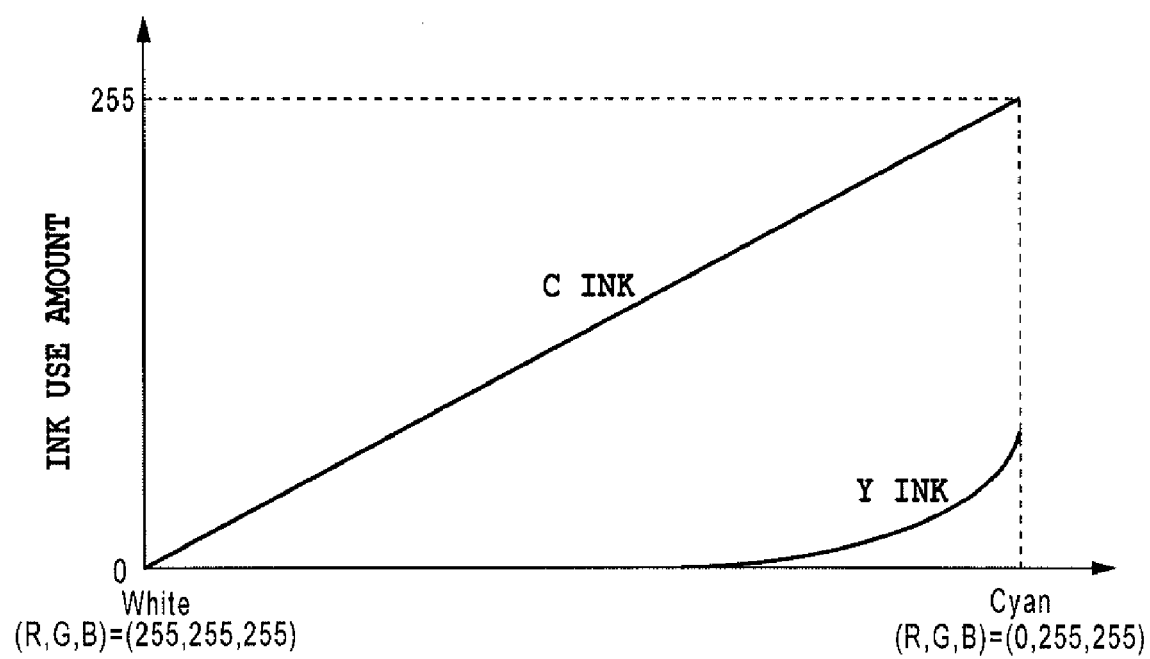
FIG. 12 is a diagram schematically showing a color separation of a W-C line to tone a basic color ink C by using the other basic color ink Y.
Figure 13:
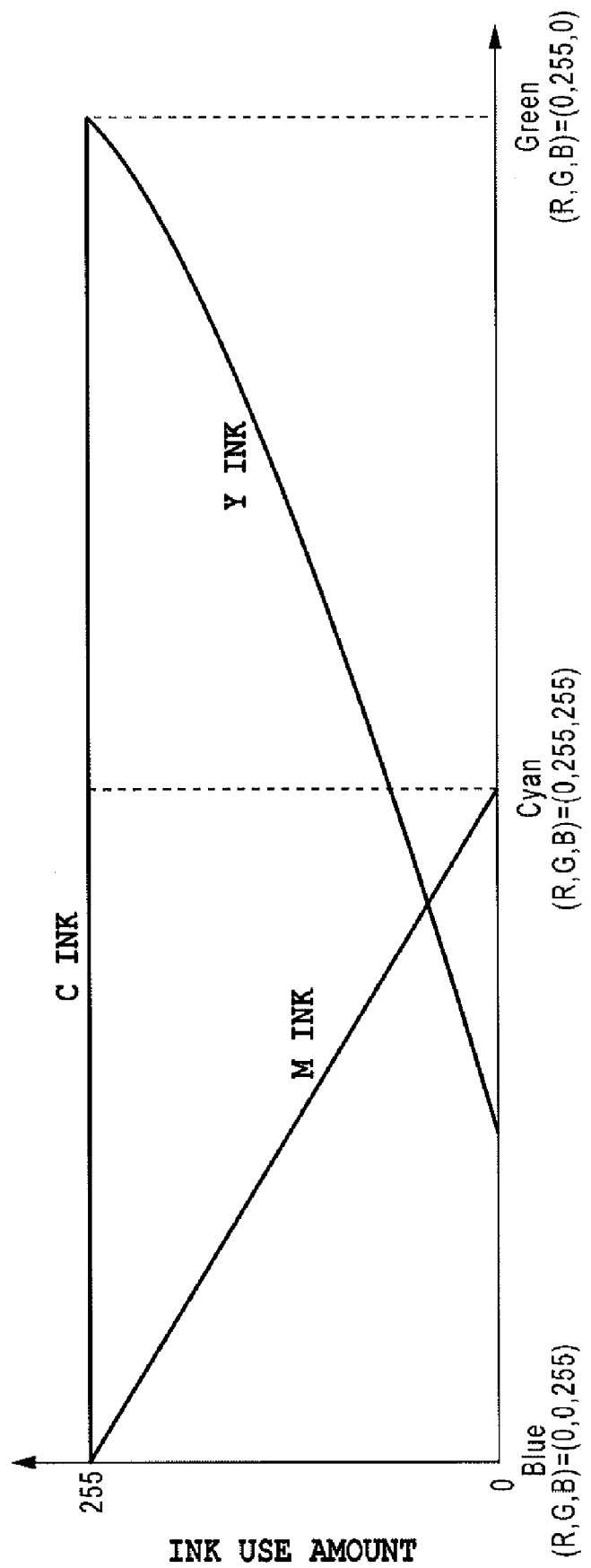
FIG. 13 is a diagram schematically showing a color separation of a B-C-G line on the color separation table shown in FIG. 12.
Figure 30:
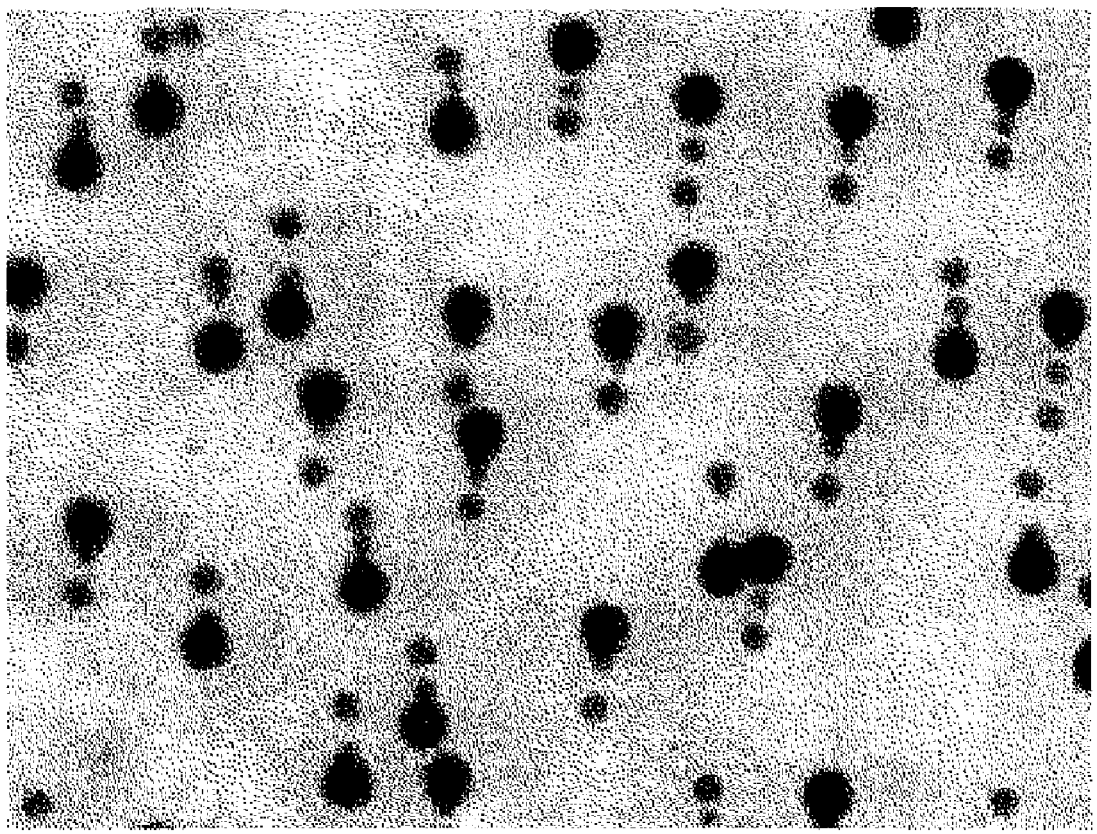
FIG. 30 is a view showing a micrograph of a printing state in a case of printing on a print medium in a single color of Y ink.

FIG. 30 shows the micrograph of the printing state in a case of applying an ink amount of the basic color Y at C point shown in FIG. 12 on a print medium in a single color of Y ink. As seen from FIG. 30, the ground of the print medium remains as it is on almost all of the regions, and Y dots are scattered and do not overlap with each other. It should be noted that it is found out from FIG. 30 that Y dot is composed of a main droplet printed as a large tear-drop-shaped dot having high density and a satellite dot formed as one to two droplets of small dots in a small circle neighboring to the main droplet (sub drop printed separately from the main drop in the flying process).

Figure 31:
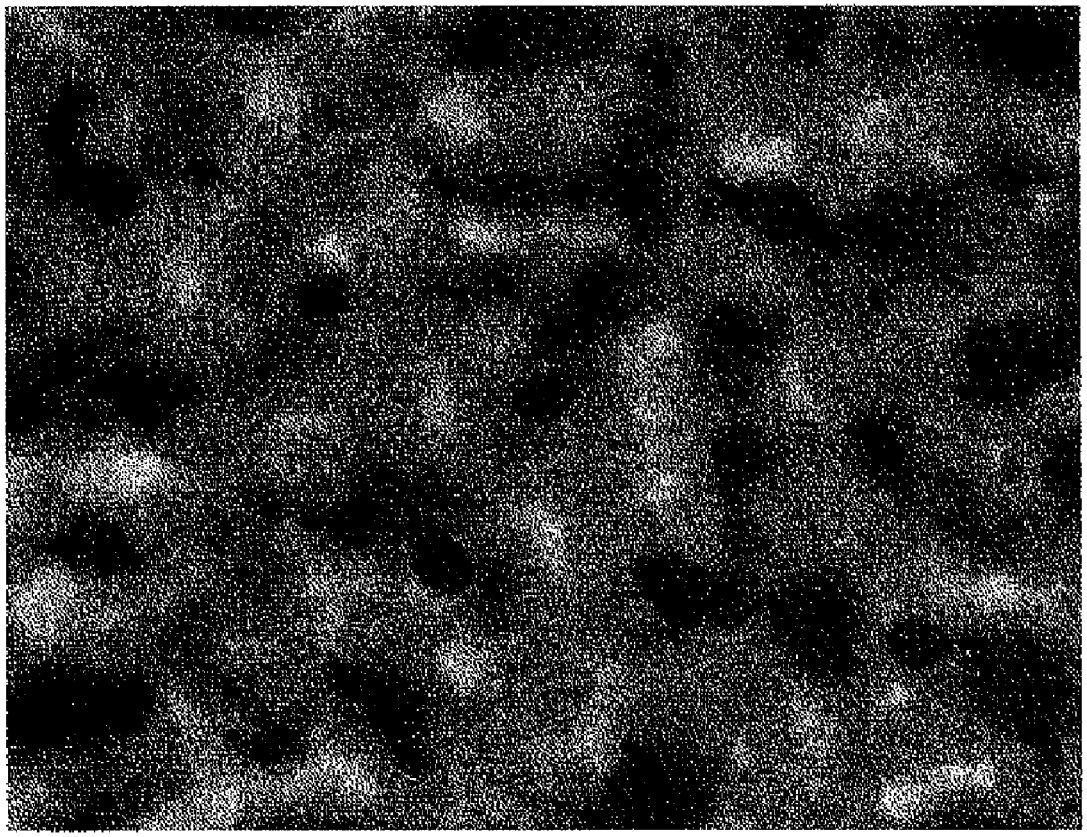
FIG. 31 is a view showing a micrograph of a printing state in a case of printing on a print medium by using a color separation table to tone a basic color C ink with a basic color Y ink.

FIG. 31 shows the micrograph of the printing state in a case of applying the basic color C ink at C point shown in FIG. 12 on a print medium by using a color separation table (Example 2) that executes toning by using basic color Y ink. As seen from FIG. 31, the printing state on almost all of the regions is equal to that in the case of printing a single color of C ink as in FIG. 28, but a part thereof is printed in blacker than in the case of printing the single color of C ink as in FIG. 28. It is estimated from FIGS. 28 and 30 that these printed black portions are regions where the respective ink droplets of the basic color C and the basic color Y ink are overlapped. Further, it is found out from FIG. 31 that in this method, the region where the density is relatively low and the region where the density is relatively high are printed to be separated from each other.

Figure 32:
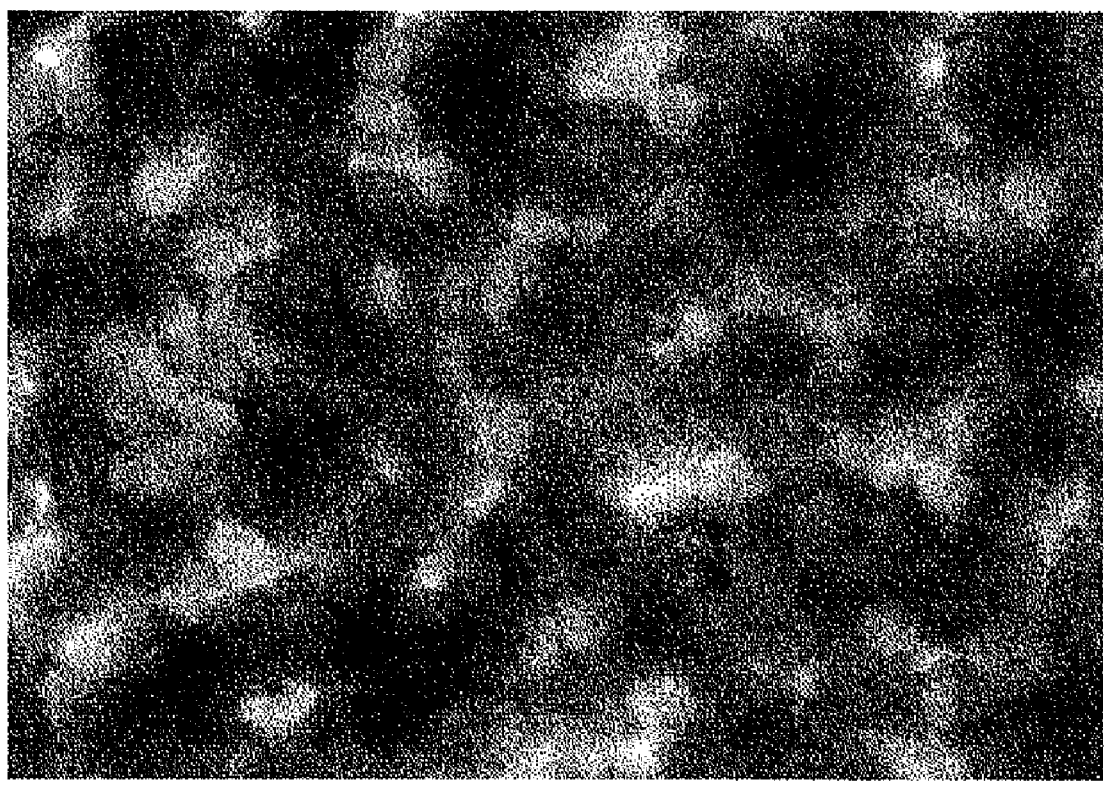
FIG. 32 is a view showing a micrograph of a printing state in a case of printing on a print medium by using a color separation table in an embodiment of the present invention to tone a basic color C ink with a particular color G ink.

FIG. 32 shows the micrograph of the printing state in a case of applying the basic color C ink at C point shown in FIG. 25 on a print medium by using a color separation table of the embodiment (Example 3) that executes toning by using particular color G ink. As seen from comparison of FIG. 28 and FIG. 29, and FIG. 32, a bright perfect circle in the figure is where the particular color G ink is printed uniformly on the print medium and is printed in relatively mixed state with dots with basic color C ink.

Figure 33:
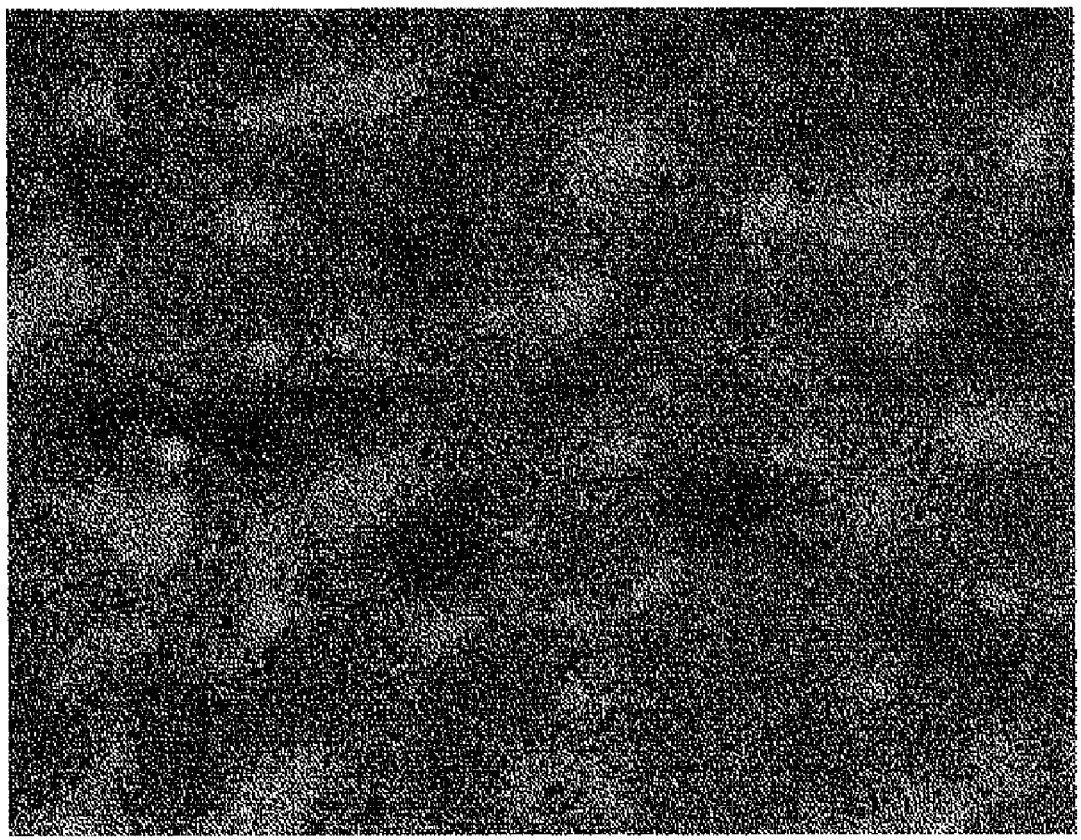
FIG. 33 is a view showing a micrograph of a printing state in a case of printing on a print medium by using a blended ink CY formed by blending a basic color C ink and a basic color Y ink at an equal ratio.

FIG. 33 shows the micrograph of the printing state in a case of performing printing on a print medium by using blended ink CY (Example 4) formed by blending the basic color C ink and the basic color Y ink in at respective equal ratios to that of the basic color C ink and the basic color Y ink at C point shown in FIG. 12. It is found out that in FIG. 33, the overlapped printed region which is specific in FIG. 31 disappears and the entire print medium is uniformly printed. According to the printing with the blended ink, the region by the basic color C ink and the region by the blended ink of the basic color C ink and the basic color Y ink are printed without separation. Accordingly, from comparison between the printing states shown in FIGS. 33 and 31, it is estimated that the separated region in the case of using the color separation table of Example 2 that executes the toning the basic color C ink with the basic color Y ink includes the region by printing the single color of C ink and the region by printing the color mixture of C ink and Y ink.

Figure 34:
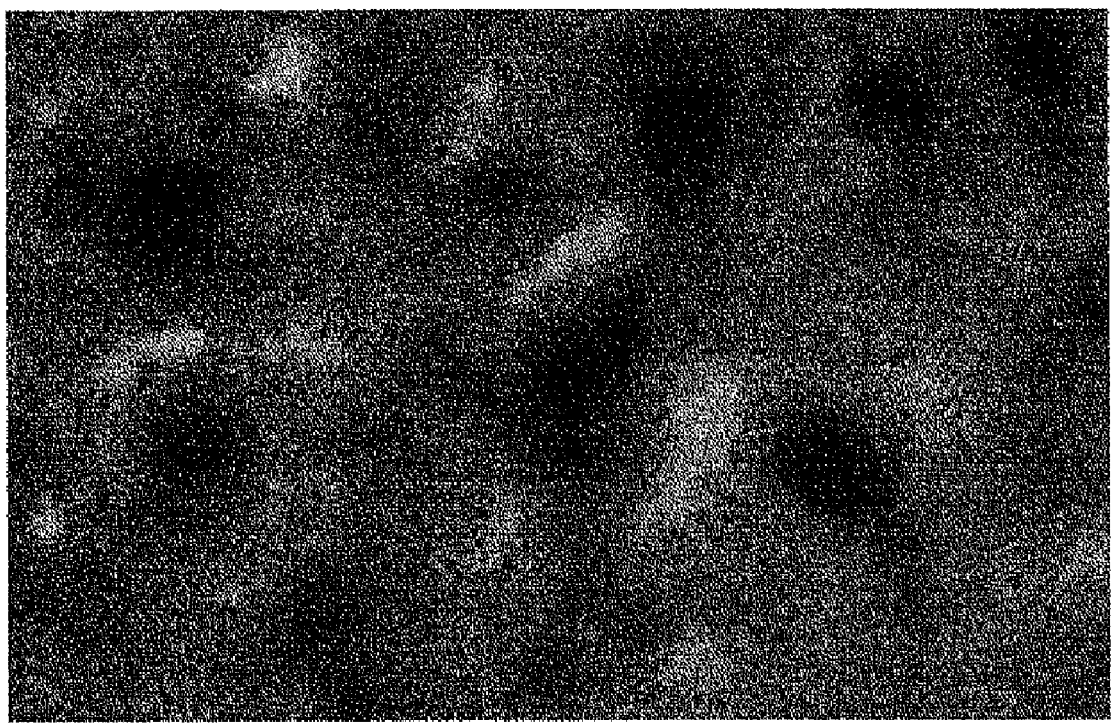
FIG. 34 is a view showing a micrograph of a printing state in a case of printing on a print medium by using a blended ink CG formed by blending a basic color C ink and a particular color G ink at an equal ratio.

FIG. 34 shows the micrograph of the printing state in a case of performing printing on a print medium by using blended ink CG (Example 5) formed by blending the basic color C ink and the particular color G ink at the respective equal ratios to that of the basic color C ink and the particular color G ink at C point shown in FIG. 12. It is found out that in FIG. 34, the slight bright perfect circle in FIG. 32 disappears and the entire print medium is printed more uniformly. However, a difference between the color mixture printing state and the printing state by the blended ink is smaller than the difference between the cases shown in FIG. 31 and FIG. 33, which use the basic color C ink and the basic color Y ink. Accordingly, it is found out that in a case of blending and printing the basic color C ink with the particular color G ink, separation of the region is reduced as compared to the case of blending and printing the basic color C ink and the basic color Y ink.

From the above, in the case of color mixture printing by the C ink and Y ink, the printing state is separated into the regions printed with the single color of C ink, which occupy almost all of the region, and the regions color mixture printing with two kinds of ink, which are sparsely scattered. On the other hand, in the case of color mixture printing by C ink and G ink, the regions printed with two kinds of ink is broad and is mixed with the regions printed with the single color of C ink without separation.

Color Reproduction (Coloring) on a* b* Plane

Next, the coloring in each case is confirmed.

Figure 35:
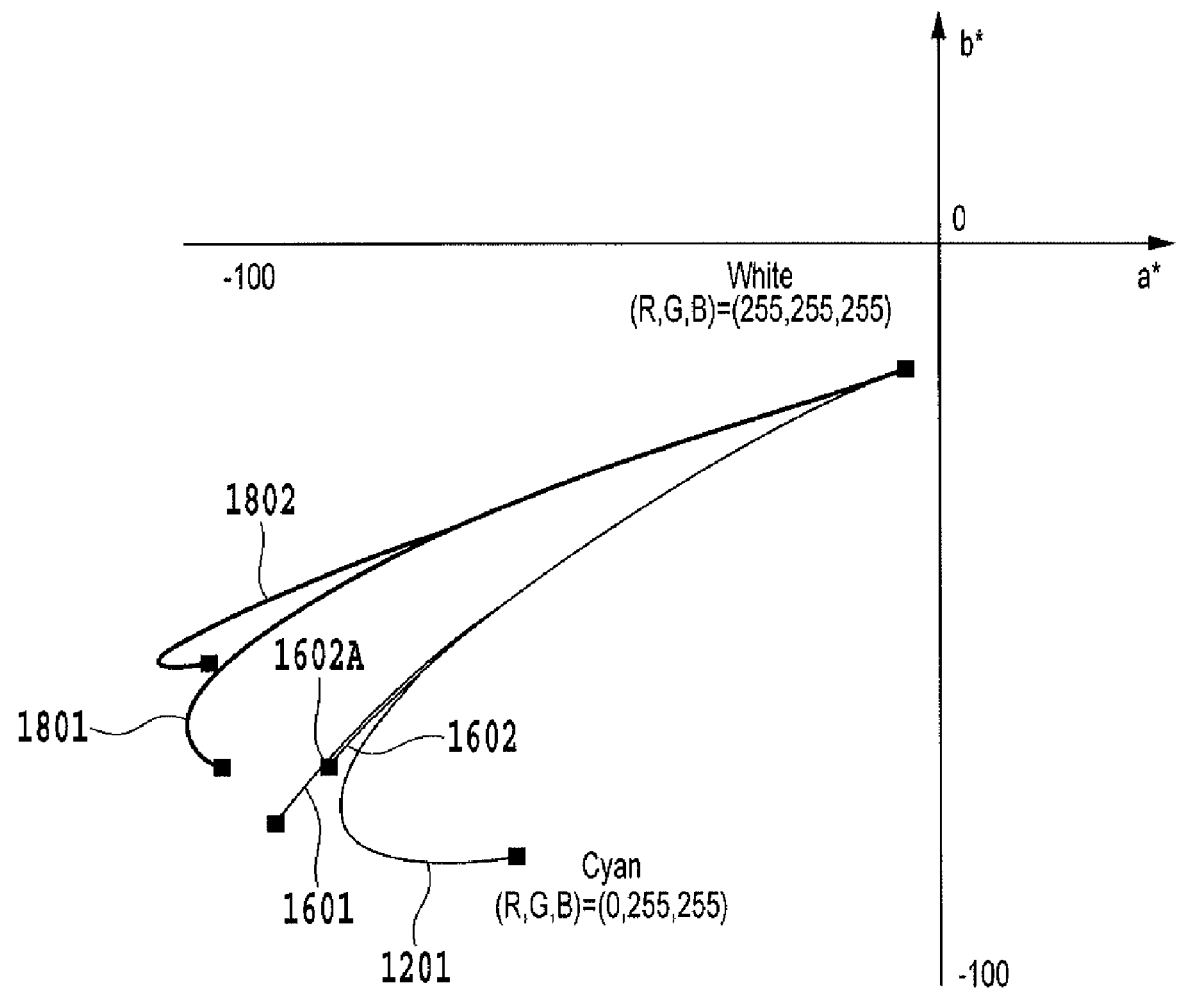
FIG. 35 is a diagram showing color reproduction in a printing state corresponding to examples 1 to 5, on an a* b* plane.

FIG. 35 is a diagram showing color reproductions on an a* b* plane by printing each of Examples 1 to 5. Here, the printing with the single color of the basic color C ink in Example 1 (reproduction line 1201) and the printing with the color mixture of the basic color C ink and the basic color Y ink in Example 2 (reproduction line 1602) are as described previously. In addition, the printing with the color mixture of the basic color C ink and the particular color G ink according to the embodiment of Example 3 (reproduction line 1601) are also as described previously.

Color reproduction by printing with the blended ink CY in Example 4 is shown as reproduction line 1802. By blending y ink with C ink, the hue by the blended ink CY becomes largely closer to a yellow color. Further, by comparing the case by the blended ink CY in Example 4 with the result line 1602 of color mixture printing by C ink and Y ink in Example 2, though the mixing ratio in Examples 2 and the blending ratio in Examples 4 are the same as each other, the hue adjustment effect by the blended ink is extremely larger than by the color mixture printing. In addition, in the reproduction line 1802 by the blended ink CY, although it is not so much as in the printing of the single color of C ink, the hue shift occurs at the high chroma portion. From this respect, it is found out that it is difficult to improve color reproduction characteristics by adding a component corresponding to the basic color Y ink to the basic color C ink.

On the other hand, color reproduction by printing with the blended ink CG in Example 5 is shown as reproduction line 1801. It is found out that by blending G ink with C ink so that toning is executed, the hue becomes slightly closer to a yellow color. Further, by comparing the case of the blended ink CG in Example 5 with the result 1601 of the color mixture printing by C ink and G ink according to the embodiment in Example 3, when the mixing ratio in Examples 3 and the blending ratio in Example 5 are the same as each other, the hue adjustment effect in Example 5 is not so much different as compared to the color mixture printing in Example 3.

In addition, it is found out that in the reproduction line 1801 shown in FIG. 35 by the blended ink CG of the basic color C ink and the particular color G ink, although it is not so much as in the printing of the single color of C ink, the hue shift occurs at the high chroma portion. Accordingly, it is difficult to improve color reproduction characteristics by adding a component corresponding to the particular color G ink to the basic color C ink. As described above, both of the hue shift control and the maintenance of chroma can not achieved at the same time without use of the color separation table for considering the color reproduction characteristics in both of the basic color C ink and the particular color G ink as in the case of the embodiment.

As described above, in the case of color mixture printing by C ink and Y ink, the hue adjustment effect is lower than the case of the blended ink. On the other hand, it is found out that in the case of color mixture printing by C ink and G ink, a difference in the hue adjustment effect between the case of color mixture printing and the case of blended ink is relatively small.

Color Reproduction (Chroma) on C* L* Plane

Figure 36:
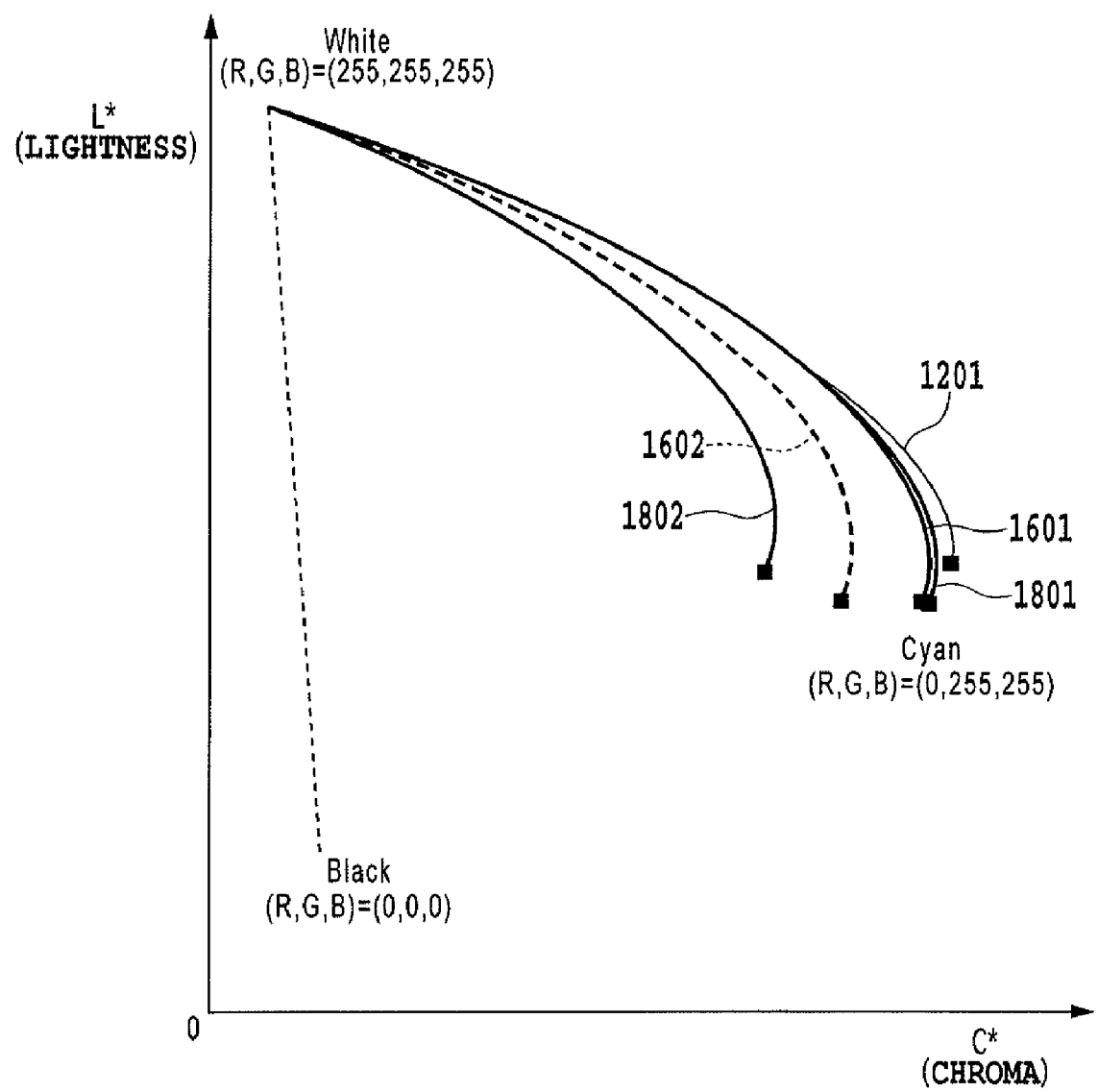
FIG. 36 is a diagram showing color reproduction in a printing state corresponding to examples 1 to 5, on a C* L* plane.

FIG. 36 is a diagram showing color reproduction on a C* L* plane by respective printing in Examples 1 to 5. Here, the printing (reproduction line 1201) by the single color of the basic color C ink in Example 1 and the printing (reproduction line 1602) by the color mixture of the basic color C ink and the basic color Y ink in Example 2 are as described previously. Also, the printing (reproduction line 1601) by the color mixture of the basic color C ink and the particular color G ink in Example 3 is as described previously.

Color reproduction by printing using the blended ink CY in Example 4 is shown as reproduction line 1802 in FIG. 36. In a case of a blended ink CY formed by blending C ink with Y ink for toning, the chroma is largely reduced. Further, in comparison of the case of the blended ink CY in Example 4 with the result 1602 by color mixture printing by C ink and Y ink in Example 2, even if the blending ratio and the mixing ratio are the same in Examples 2 and 4, the chroma by the blended ink is extremely reduced as compared to the case by the color mixture printing.

Color reproduction by printing using the blended ink CG in Example 5 is shown as reproduction line 1801 in FIG. 36. In comparison of the case of the blended ink CG in Example 5 with the result by color mixture printing by C ink and G ink of the embodiment in Example 3, when the blending ratio and the mixing ratio are the same in Examples 3 and 5, the chroma in Example 5 is not so much different as compared to the color mixture printing in Examples 3.

As described above, in the case of color mixture printing by C ink and Y ink, the chroma is higher than in the case of the blended ink. On the other hand, it is found out that in the case of color mixture printing by C ink and G ink, a difference in the chroma between the case of the color mixture printing and the case of the blended ink is relatively small.

Spectrum

Figure 37:
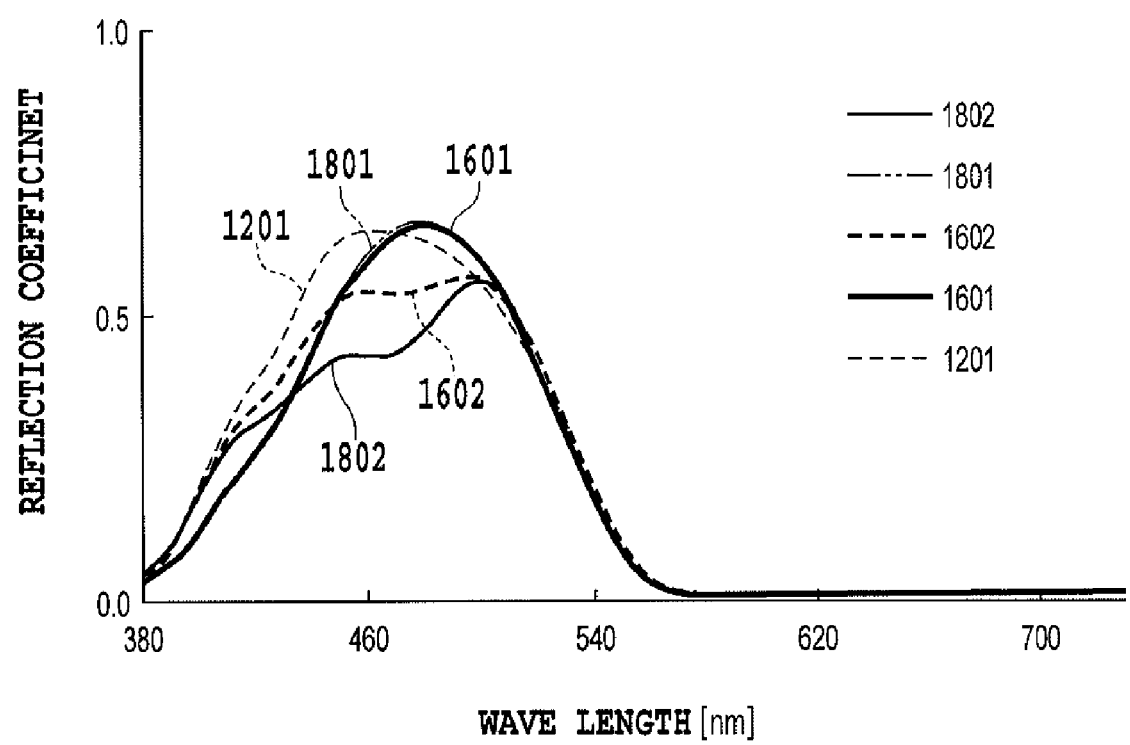
FIG. 37 is a diagram showing a reflectance spectrum of a printing state corresponding to examples 1 to 5.

FIG. 37 is a diagram showing reflection coefficient spectra of the respective printing results of Examples 1 to 5. As shown in FIG. 37, in a case of printing by a single color of C ink in Example 1, the spectrum becomes closer to a blue color like a curve 1201. In printing by the color mixture of C ink and Y ink in Example 2, the spectrum becomes closer to a green color like a curve 1602. In this case, the reflection ratio is low in the vicinity of 480 nm (light absorption ratio is high), and as a result, it is found out that the effect of decreasing the hue shift is achieved, but the chroma is reduced. In addition, in printing by the color mixture of C ink and G ink in Example 3 according to the embodiment, the hue only becomes closer to a green color like a curve 1601 and the chroma (reflection coefficient) is maintained to be nearly the same as the case of the printing by a single color of C ink (curve 1201).

Further, in the printing by the blended CY ink of C ink and Y ink in Example 4, like curve 1802, the hue becomes closer to a green color, but the chroma is further reduced as compared to curve 1602 as the result of printing by the color mixture of C ink and Y ink. However, in the printing by the blended ink CG of C ink and G ink in Example 5, the color reproduction characteristics with respect to the chroma are nearly the same as at the case of the color mixture printing by C ink and G ink, like curve 1801.

As described above, in the case of color mixture printing by C ink and Y ink, the hue adjustment effect is lower and the chroma is high than at the blended ink. On the other hand, in the case of color mixture printing by C ink and G ink, a difference in the hue adjustment effect and a difference in the chroma between the case of color mixture printing and the case of blended ink are relatively small.

Mechanism of Coloring

It can be estimated that a coloring mechanism as follows exists from both of the observation result with respect to the dot printing state described above and the measuring result of the color reproduction.

Since in the case of color mixture printing by C ink and Y ink, the dot number of Y ink for toning is small and agglomeration is made by blending C ink and Y ink, the print area of the print medium is separated into the region formed of a single color of C ink occupying almost all of the area and the region formed of both of C ink and Y ink sparsely diffused. When the print area formed of these two kinds of regions is observed in a macro way, following is founded. That is, it is required to perform a color adjustment by using a larger number of Y ink than in a case where Y ink is diffused provisionally, so as to obtain a sufficient color adjustment effect. In this case, it is predicted that the chroma tends to decrease more easily by using a large number of Y ink. Further, since the spectrum becomes largely different between C ink and Y ink, for the hue adjustment, even the reflection in the wave length region of the desired hue results in being controlled, thereby furthermore accelerating reduction of the chroma due to the color mixture of the both.

On the other hand, since in the case of color mixture printing by C ink and G ink, the dot number of G ink applied for toning is relatively large and the diffusion effect of G ink is generated on a print medium where C ink is arranged, the toning can be made by using a sufficient G ink amount required. In addition, it is predicted that the spectrum of C ink is similar to that of G ink and the color adjustment allows preservation of reflection in the wave length region of a desired hue.

In addition, it can be said that a relation that each of the basic color ink has the spectrum zone which is largely different from each other or is easily agglomerated because of a large difference in physical properties of a coloring material or a solvent is general. Further, it can be said that a relation that the spectrum zones are overlapped between the basic color ink and the particular color ink having a close color neighboring to the basic color or they are easily diffused from each other because of similarity in physical properties of a coloring material or a solvent is general.

As described above, the present invention appropriately combines ink characteristics due to these properties to perform color separation that executes toning of a basic color with a particular color, and differs in a basic mechanism from conventional toning in color separation using basic colors.

Modification of Embodiment

Modifications of the above-mentioned embodiments will be hereinafter explained and only points different from the above-mentioned embodiment will be explained. The following explanation clarifies that any one of modifications has an advantage of the present invention that chroma at a high duty portion of a basic color is maintained, while a hue shift (curving) is decreased.

Modification 1

A first modification relates to color separation where care is paid to a granular feeling in a highlight portion in W-C line 41 shown in FIG. 2.

Figure 38:
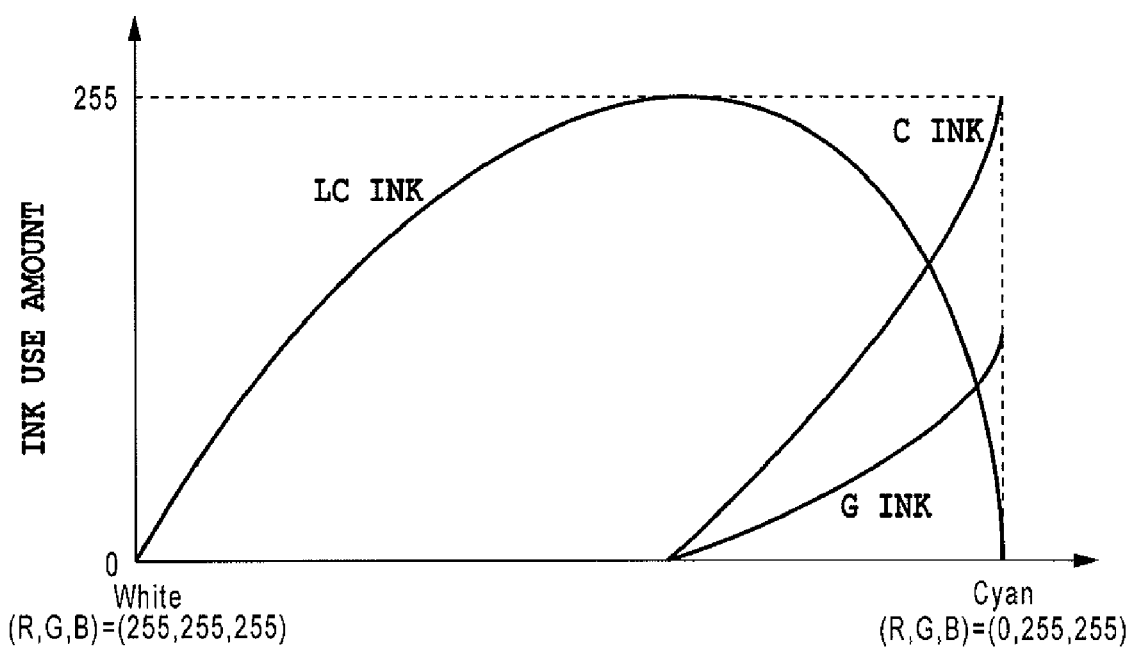
FIG. 38 is a diagram schematically showing color separation of a W-C line in consideration of a granular feeling of a highlight portion according to a modification 1 in an embodiment of the present invention.

FIG. 38 is a diagram showing each color ink use amount (lattice point data) in each lattice point on W-C line 41. Different from the color separation shown in FIG. 25 according to the above described embodiment, dark and light colors are switched between a basic color C ink and a quasi-basic color LC ink. With this way, the granular feeling in the highlight portion is improved. It should be noted that in FIG. 38 a starting point (lattice point) of using a dark ink C is the same as that of using a particular color ink G, but needless to say, the modification is not limited to this. For example, C ink is first used and thereafter G ink is used, or vice versa depending on a size relation of LC ink, C ink and G ink or a relation of each position in which the hue shifts in color reproduction by C ink and LC ink start. Use order of ink can be thus changed as needed.

Modification 2

A second modification relates to color separation where care is paid to a hue adjustment for a highlight portion in W-C line 41 in FIG. 2.

Figure 39:
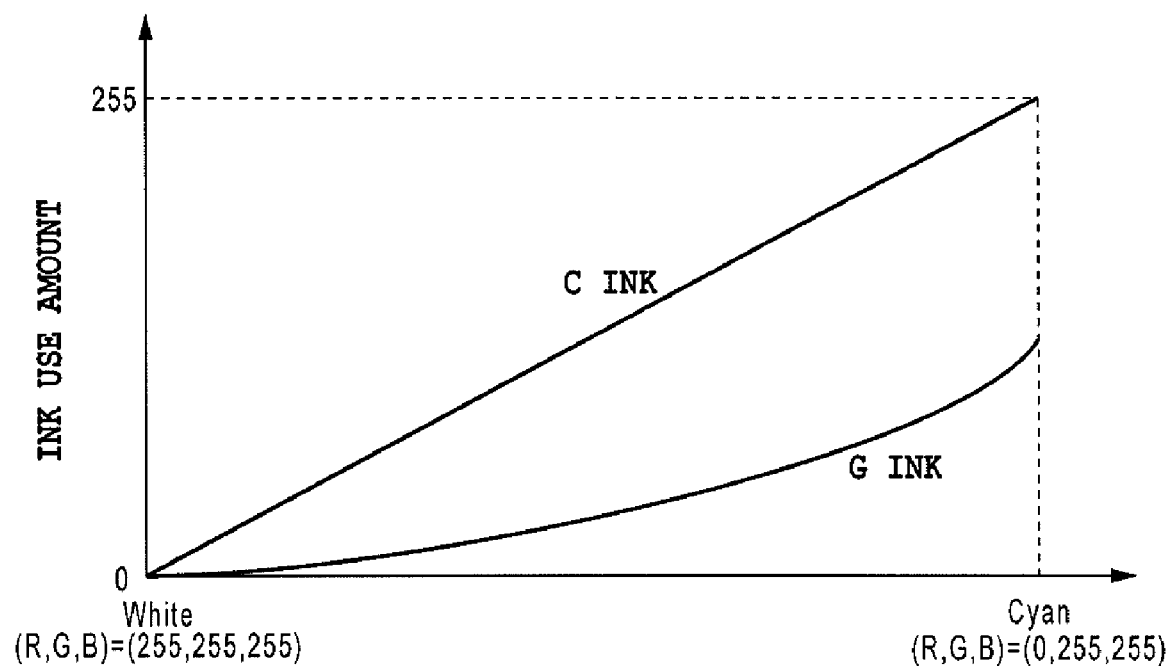
FIG. 39 is a diagram schematically showing color separation of a W-C line in consideration of a hue adjustment at a highlight portion according to a modification 2 in an embodiment of the present invention.

FIG. 39 is a diagram showing each color ink use amount (lattice point data) in each lattice point on W-C line 41. Different from the color separation shown in FIG. 25 according to the above described embodiment, a particular color G ink added for toning a basic color C ink is used from a highlight portion. With this way, not only the hue shift (curving) of the high duty portion of the basic color C ink is improved, but also the hue can be adjusted arbitrarily, while the chroma of the W-C line 41 is maintained. Further, when in addition to this configuration, care is paid to the granular feeling, the basic color C ink may be switched into the basic color C ink as a dark color and a quasi-basic color LC ink as a light color in FIG. 39 in consideration of the granular feeling of the basic color. Alternately, the color mixture of a slight number of a quasi-basic color LC ink and a basic color Y ink may be used in a highlight portion in consideration of the granular feeling of the particular color G ink. Even in a case where the color mixture of a slight number of the quasi-basic color LC and the basic color Y is used at the highlight portion, by toning the high duty portion of the basic color C ink with the particular color G ink, the chroma is not largely reduced as the entirety of the W-C line 41.

Modification 3

A third modification relates to color separation where care is paid to a hue adjustment of a highlight portion in W-C line 41 in FIG. 2.

Figure 40:
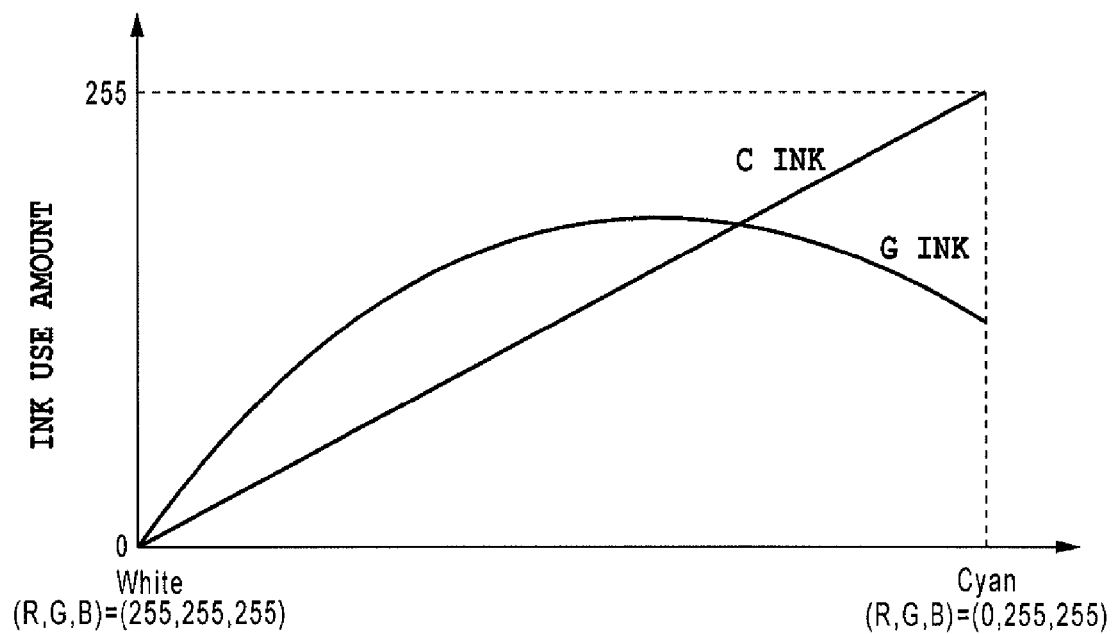
FIG. 40 is a diagram schematically showing color separation of a W-C line in consideration of a hue adjustment at a highlight portion according to a modification 3 in an embodiment of the present invention.

FIG. 40 is a diagram showing each color ink use amount (lattice point data) in each lattice point on W-C line 41. Different from the color separation shown in FIG. 25 according to the above described embodiment, a particular color G ink added for toning a basic color C ink is used in a large amount from a highlight portion. With this way, even if the basic color C ink by which the hue is shifted toward a blue color largely from the highlight portion is used, the toning can be made appropriately without reduction of the chroma. It should be noted that the following configurations are the same as the above modification. A basic color C ink as a dark color and a quasi-basic color LC as a light color are used to be switched instead of the basic color C ink in consideration of the granular feeling. Or the color mixture of a slight number of a quasi-basic color LC ink and a basic color Y ink may be used to be limited in a highlight portion instead of the particular color G ink in consideration of the granular feeling.

Modification 4

A fourth modification relates to color separation where care is paid to uneven gloss by a bronze or a false gradation sequence due to an abrupt change of an ink ejection amount in reproduction on W-C line 41 in FIG. 2.

Figure 41:
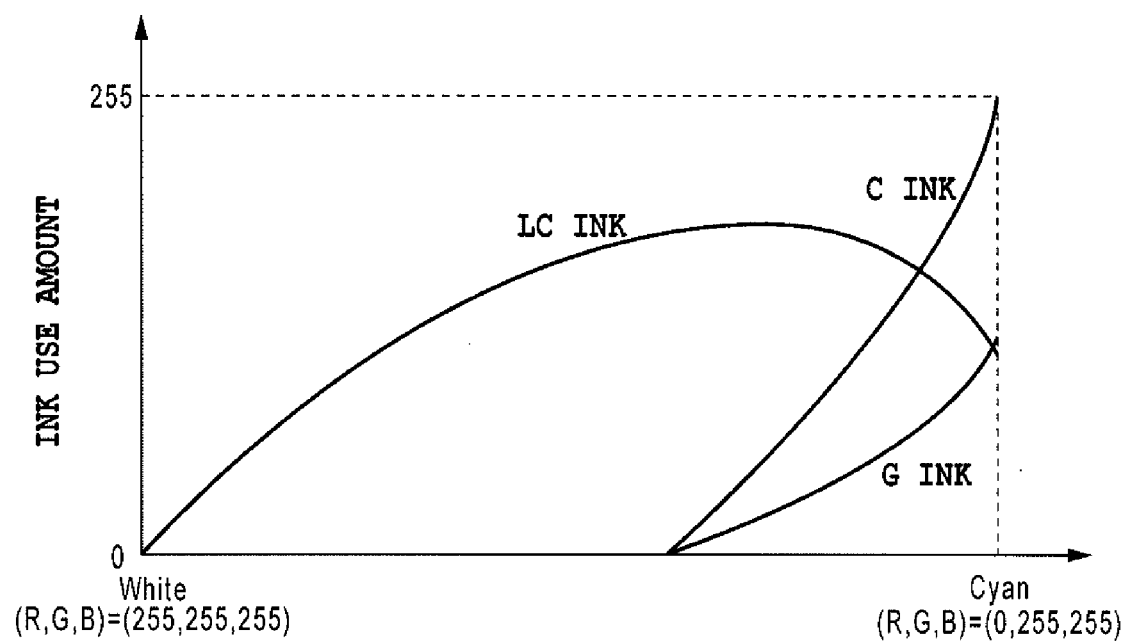
FIG. 41 is a diagram schematically showing color separation of a W-C line in consideration of a false gradation sequence by irregular luster generated by a bronze and an abrupt increase/decrease of an ink ejection amount according to a modification 4 in an embodiment of the present invention.

FIG. 41 is a diagram showing each color ink use amount (lattice point data) in each lattice point on W-C line 41. The fourth embodiment has the following point which is different from the color separation shown in FIG. 25 according to the above described embodiment. That is, a basic color C ink as a dark color and a quasi-basic color LC ink as a light color are used to be switched and the color of C point is formed by a basic color C ink, a quasi-basic color LC ink and a particular color G ink for toning. This configuration controls uneven bronze (gloss) due to a difference in the degree of bronze between the basic color C ink and the quasi-basic color LC ink or an abrupt change of an ejection amount on a line from W point to C point, preventing a false gradation sequence.

Modification 5

A fifth modification relates to a case of color mixing of particular color ink for the reason other than coloring characteristics, for example, for reduction of the uneven bronze, or for a case where reaction liquids are contained in a particular color ink where both are reacted for fixation when blended together. For example, the modification 5 relates to color separation in a case where a basic color Y ink is applied to the whole region, for the reason other than such coloring characteristics, on W-C line 41 in FIG. 2.

Figure 42:
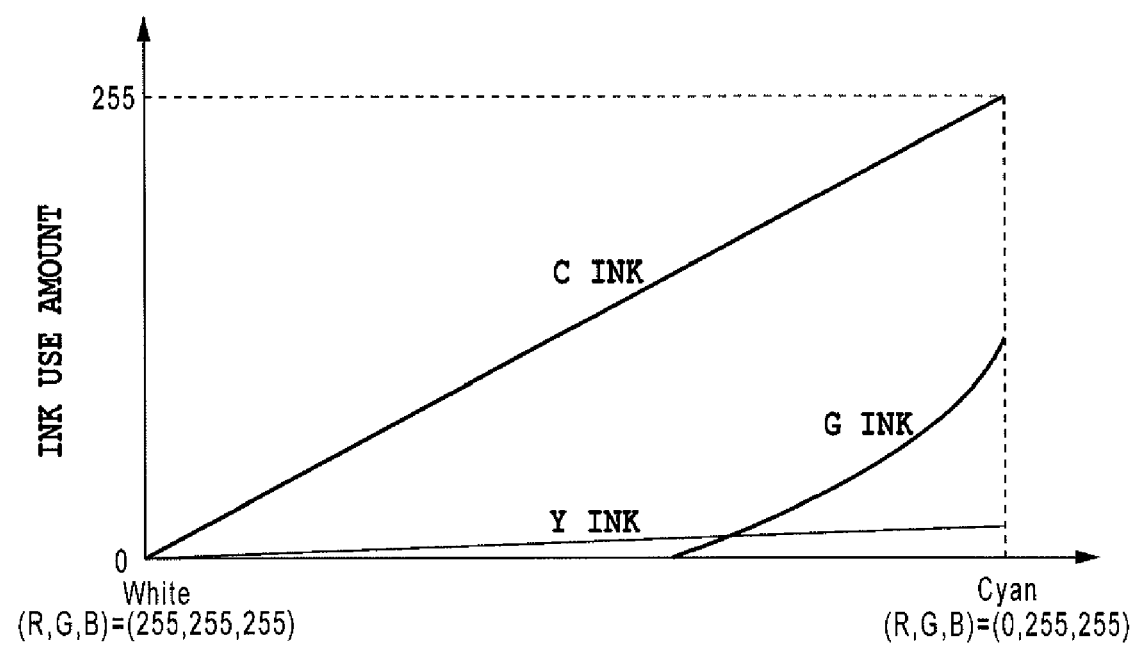
FIG. 42 is a diagram schematically showing color separation of a W-C line in a case of blending ink of particular colors by the reason other than coloring characteristics according to a modification 5 in an embodiment of the present invention.

FIG. 42 is a diagram showing each color ink use amount (lattice point data) in each lattice point on W-C line 41. The fifth embodiment has the following point which is different from the color separation shown in FIG. 25 according to the above described embodiment. That is, a basic color Y ink is added in the whole region from a highlight portion to a high duty portion. In such a case, due to the coloring characteristics of the basic color Y ink, the chroma is reduced when the basic color Y ink is added in a large amount. Therefore, a required minimum amount of the basic color Y ink is used for obtaining the effect other than the above coloring characteristics. Then, the toning by the particular color G ink can be also used for controlling the hue shift at the high duty portion of the basic color C ink. With this way, the problem other than the coloring characteristics is avoided by adding the other ink, while the problem on color reproduction can be improved by the toning effect by the particular color G ink.

Modification 6

A sixth modification relates to color separation where care is paid to a hue adjustment of a highlight portion of W-C line 41 in FIG. 2. Here, the sixth modification is made on a precondition that a basic color C ink has color reproduction characteristics that the hue becomes closer to a green color at a highlight portion and that the hue is shifted closer to a blue color at a high chroma portion.

Figure 43:
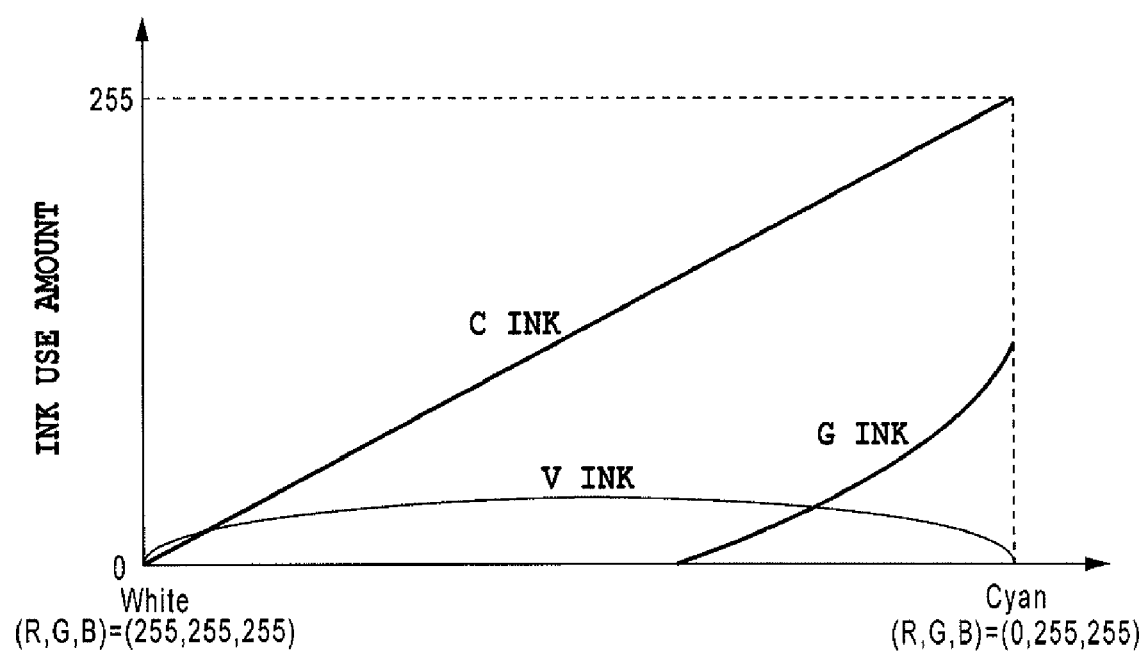
FIG. 43 is a diagram schematically showing color separation of a W-C line in a case of considering a hue adjustment at a highlight portion and using the other particular color also as toning according to a modification 6 in an embodiment of the present invention.

FIG. 43 is a diagram showing each color ink use amount (lattice point data) in each lattice point on W-C line 41. The sixth modification has the following point which is different from the color separation shown in FIG. 25. That is, a particular color V ink is added for toning a highlight portion of a basic color C closer to a blue color. In addition, the hue shift closer to the blue color at a high chroma portion is controlled by a particular color G ink. The present invention basically has a main object of controlling the hue shift of the basic color at the high duty portion. From this respect, the other color adjustment can be thus made at the highlight portion as needed and needless to say, the other color adjustment can be made together with carrying out the present invention.

Modification 7

A seventh modification relates to color separation in a case where a basic color C ink has the characteristics that the hue is shifted not closer to a blue color as described at the high duty portion so far, but closer to a green color.

Figure 44:
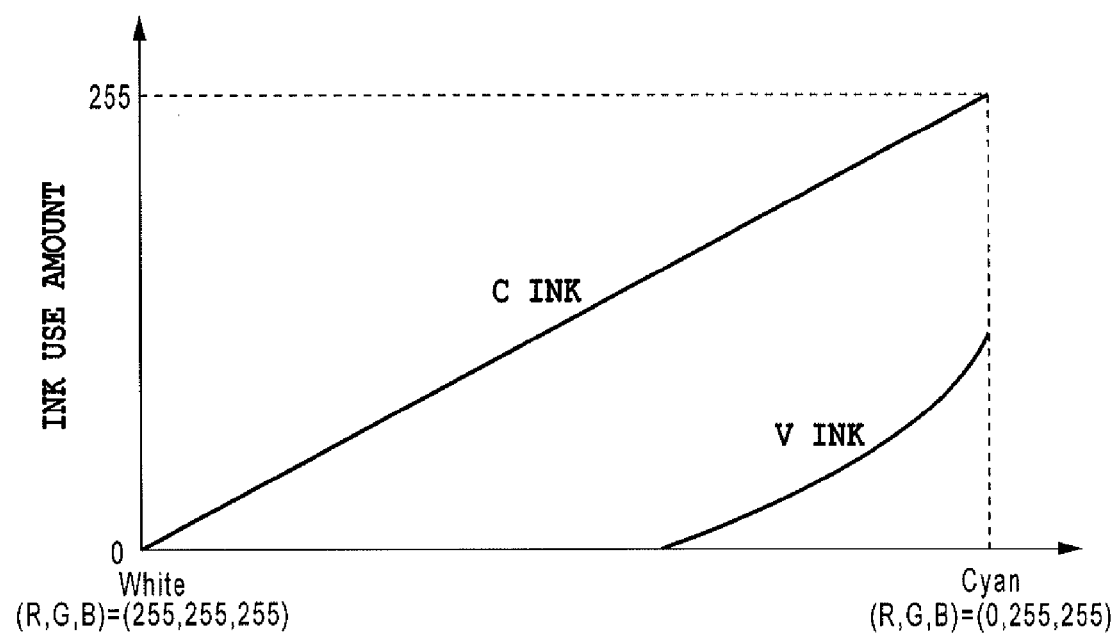
FIG. 44 is a diagram schematically showing color separation of a W-C line in a case of the characteristics that a basic color C ink is hue-shifted closer to a green color at a high duty portion according to a modification 7 in an embodiment of the present invention.

FIG. 44 is a diagram showing each color ink use amount (lattice point data) in each lattice point on W-C line 41. The following point of the seventh modification is different from the color separation shown in FIG. 25 according to the above described embodiment. That is, for toning a basic color C ink, not a particular color G ink, but a particular color V ink in which the hue is neighboring to that of the basic color C and which has the coloring characteristics closer to a blue color is added.

Modification 8

An eighth modification relates to color separation in a device primary color reproduced with a basic color M ink.

Figure 1:
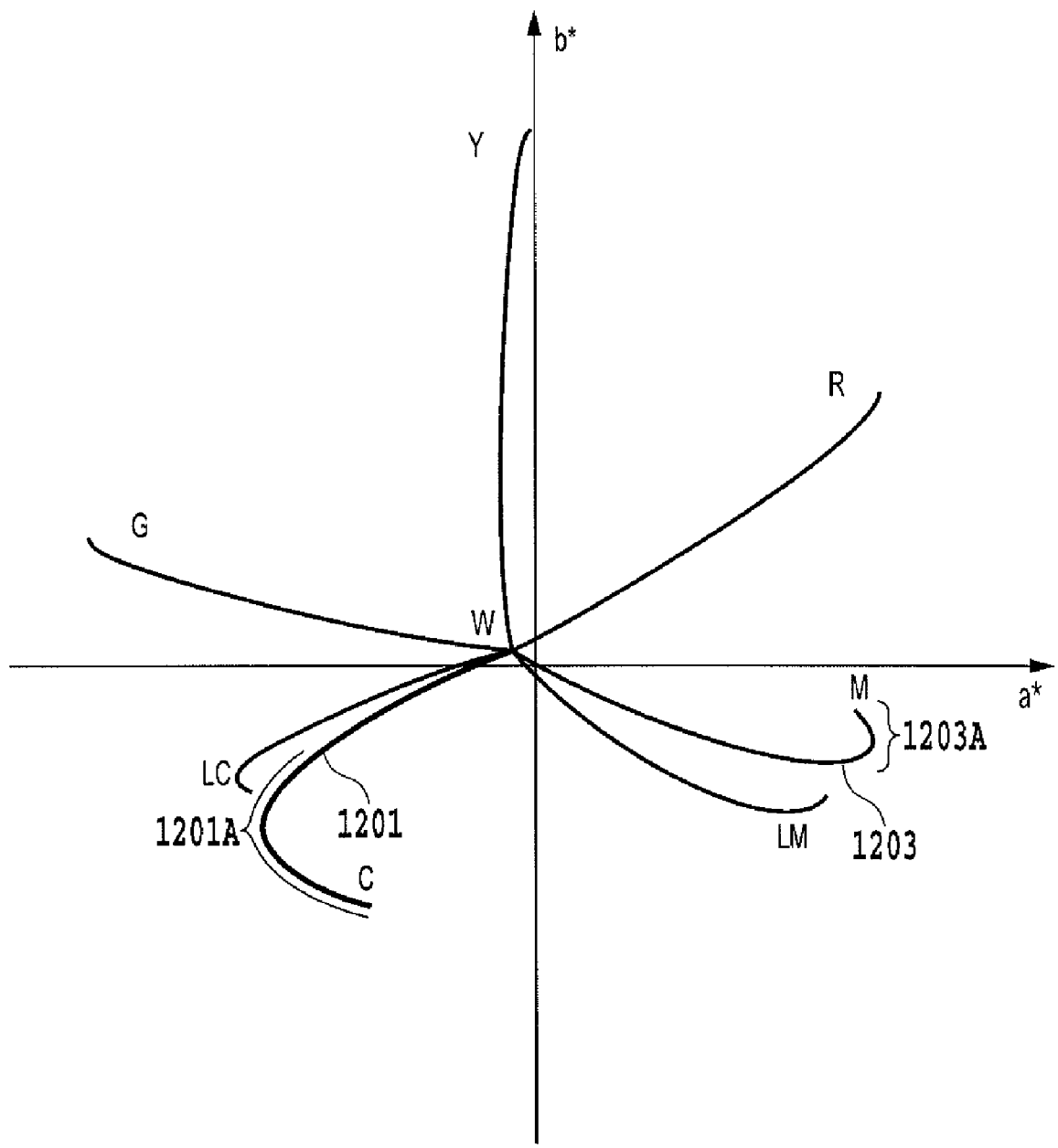
FIG. 1 is a diagram showing a change in color in accordance with an ink applying amount at the time of printing an ink single color on an a* b* plane in a CIE-L* a* b* color space.
Figure 45:
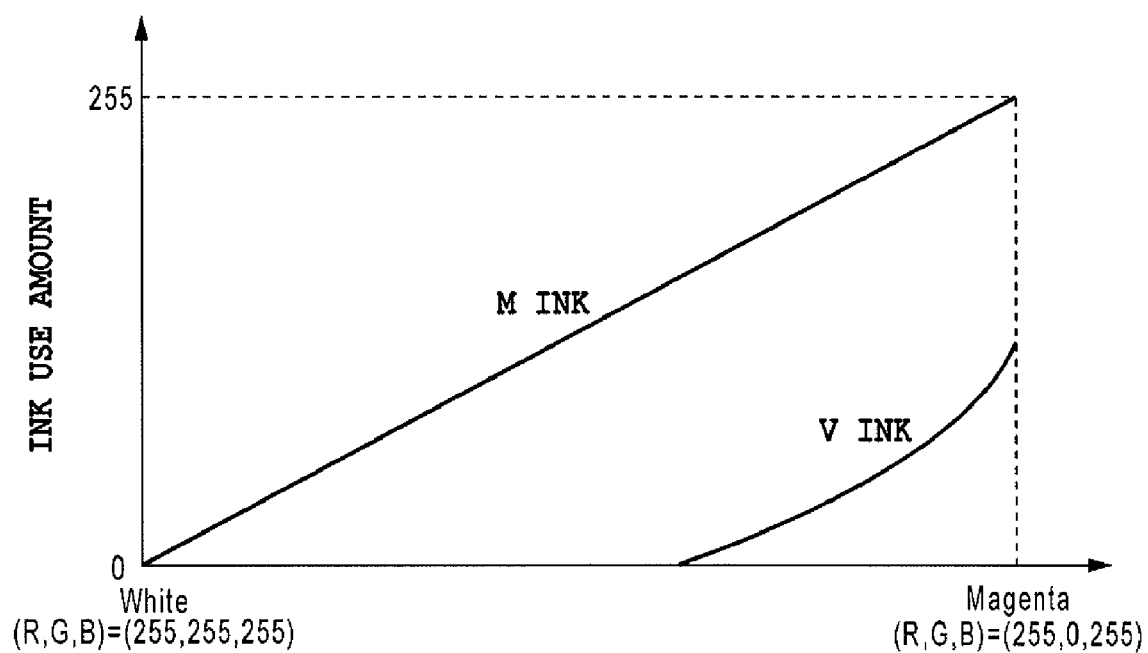
FIG. 45 is a diagram schematically showing color separation of a W-M line in a case of using both of a basic color M ink and a particular color V ink as a device primary color M according to a modification 8 in an embodiment of the present invention.

FIG. 45 is a diagram showing each color ink use amount (lattice point data) in each lattice point on W-M line 41. In the example shown in FIG. 1, a color reproduction line by a basic color M ink cases a hue shift (curving) toward a red color at a high duty portion. Therefore, a particular color V ink having a hue closer to a blue color is added to the high duty portion of the basic color M ink for toning, as shown in FIG. 45. In a case of thus expressing a color at M point where a ejection amount per unit area of M ink is maximized, only the basic color M ink is usually used, but in Modification 8, the basic color M ink and the particular color V ink are used. In consequence, the region of M image of the maximum density is expressed by the color mixture of the basic color M ink and the particular color V ink.

In the embodiments and the modifications as described above, with regard to the device primary color, the basic color corresponding to the device primary color is toned with a particular color neighboring to the basic color. The combination of the ink colors is not limited to the combination of the basic color C ink and the particular color G ink described above. For example, the combination of the basic color M ink and the particular color V ink may be used as in the case of Modification 8. An example of a combination of a basic color ink and a particular color may include the following: basic color C and particular color B; basic color C and particular color V; basic color M and particular color R; basic color M and particular color O; basic color Y and particular color G; basic color Y and particular color R; basic color Y and particular color O.

Thus the present invention examines shift of a hue occurring in the coloring characteristics with respect to a basic color recording material reproducing a device primary color to determine a particular color recording material to be used, in accordance with the direction of the hue shift. That is, among particular color recording materials for reproducing the hue between the basic color recording material and the other basic color recording material having the hue neighboring to that of the basic color recording material, a particular color recording material for controlling (compensating for) the hue shift is selected in accordance with the hue shift direction. In addition, the present invention defines a range of the device primary color using the particular color recording material or an amount of the particular color recording material, in accordance with amount of the hue shift generated or an amount of controlling it. As a result, the present invention can control the shift of the hue and also achieve the high chroma.

Other Embodiment

The embodiments and the modifications described above execute the color separation processing by a host computer, but are not limited to this. For example, the color separation processing may be executed by a printing apparatus such as a printer or a multi-function machine having a printing function and other functions.

In addition, the embodiments and the modifications described above execute the color separation processing by using a table, but are not limited to this. For example, the conversion relation by a table may be realized by calculation.

Further Embodiment

The present invention is put into practice by executing program codes of software such as those shown in FIG. 23, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-148730, filed May 29, 2006, which is hereby incorporated by reference herein in its entirety.

What is claimed is:

1. A printing apparatus for printing an image on a print medium by using an applying unit capable of applying basic color recording materials corresponding to three primary colors and a particular color recording material having a hue different from those of the basic color recording materials, wherein a color to be expressed with a maximum amount of one of the basic color recording materials that is applied to a unit area of the print medium, is reproduced by using the one of the basic color recording materials and the particular color recording material having a hue between a hue of the one of the basic color recording materials and a hue of another one of the basic color recording materials.

2. A printing apparatus as claimed in claim 1, wherein the basic color recording materials are recording materials of cyan, magenta and yellow respectively, the one of the basic color recording materials is a recording material of cyan, the other one of the basic color recording materials is a recording material of yellow, and the particular color recording material is a recording material of green.

3. An image processing apparatus for determining amounts of recording materials to be applied to a unit area of a print medium for reproducing colors capable of expressed by using an applying unit capable of applying basic color recording materials corresponding to three primary colors and a particular color recording material having a hue different from those of the basic color recording materials, said apparatus comprising:
an amount determining component for determining an amount of one of the basic color recording materials and an amount of the particular color recording material so that a color to be expressed with a maximum amount of the one of the basic color recording materials is reproduced by using the one of the basic color recording materials and the particular color recording material having the hue between a hue of the one of the basic color recording materials and a hue of an another one of the basic color recording materials.

4. An image processing apparatus as claimed in claim 3, wherein the basic color recording materials are recording materials of cyan, magenta and yellow respectively, the one of the basic color recording materials is a recording material of cyan, the other one of the basic color recording materials is a recording material of yellow, and the particular color recording material is a recording material of green.

5. An image processing apparatus for determining amounts of recording materials to be applied to a unit area of a print medium for reproducing a color specified by color signals, said apparatus comprising:
an amount determining component for determining an amount of one of basic color recording materials corresponding to three primary colors respectively and an amount of a particular color recording material so that
a predetermined primary color specified by the color signals is reproduced by using the one of the basic color recording materials and the particular color recording material having a hue between a hue of the one of the basic color recording materials and a hue of an another one of the basic color recording materials, and
a hue shift to a hue of the basic color recoding material other than the one of and the another one of the basic color recoding materials, which is to be caused when using the one of the basic color recording material alone for reproducing the predetermined primary color, is decreased.

6. An image processing apparatus as claimed in claim 5, wherein said amount determining component executes the determining processing by using a table, and the table stores the amounts of the one of the basic color recording materials and the particular color recording material, which reproduce the predetermined primary color, as lattice point data, correspondingly to lattice points that are defined by the color signals specifying the predetermined primary color.

7. An image processing apparatus as claimed in claim 5, wherein the predetermined primary color is each of colors on a portion on a line that is formed by joining plural colors specified by the color signals.

8. An image processing apparatus as claimed in claim 5, wherein the predetermined primary color is each of colors on a portion on a line that is formed by joining plural colors specified by the color signals, and
said amount determining component further determines an amount of light color recording material that has lower concentration than the one of the basic color recording materials so that plural colors of the line are reproduced by using the light color material.

9. An image processing apparatus as claimed in claim 5, wherein the predetermined primary color is each of colors on a portion on a line that is formed by joining plural colors specified by the color signals, and
said amount determining component further determines an amount of another one of the basic color recording materials so that plural colors of the line are reproduced by using that other one of the basic color recording materials.

10. An image processing apparatus as claimed in claim 5, wherein the predetermined primary color is each of colors on a portion on a line that is formed by joining plural colors specified by the color signals, and
said amount determining component further determines an amount of other particular color recording material so that plural colors of the line are reproduced by using the other particular color recording material.

11. An image processing apparatus as claimed in claim 5, wherein the one of the basic color recording materials is a recording material of cyan,
another one of the basic color recording materials is a recording material of yellow, and
the particular color recording material is a recording material of green.

12. An image processing method for determining amounts of recording materials to be applied to a unit area of a print medium for reproducing colors expressed by using an applying unit for applying basic color recording materials corresponding to three primary colors and a particular color recording material having a hue different from those of the basic color recording materials, said method comprising:
using a processor to perform:
a determining step of determining an amount of one of the basic color recording materials and an amount of the particular color recording material so that a color to be expressed with a maximum amount of the one of the basic color recording materials is reproduced by using the one of the basic color recording materials and the particular color recording material having the hue between a hue of the one of the basic color recording materials and a hue of another one of the basic color recording materials.

13. A computer-readable storage medium storing a computer-executable program for causing a computer to perform an image processing method for determining amounts of recording materials to be applied to a unit area of a print medium for reproducing colors expressed by using an applying unit for applying basic color recording materials corresponding to three primary colors and a particular color recording material having a hue different from those of the basic color recording materials, said method comprising:
a determining step of determining an amount of one of the basic color recording materials and an amount of the particular color recording material so that a color to be expressed with a maximum amount of the one of the basic color recording materials is reproduced by using the one of the basic color recording materials and the particular color recording material having the hue between a hue of the one of the basic color recording materials and a hue of another one of the basic color recording materials.

* * * * *